(12) United States Patent
Rocklitz

(10) Patent No.: US 9,084,957 B2
(45) Date of Patent: *Jul. 21, 2015

(54) PLEATED FILTRATION MEDIA, MEDIA PACKS, FILTER ELEMENTS, AND METHODS FOR FILTERING FLUIDS

(75) Inventor: Gary J. Rocklitz, Burnsville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 478 days.

This patent is subject to a terminal disclaimer.

(21) Appl. No.: 12/508,944

(22) Filed: Jul. 24, 2009

(65) Prior Publication Data

US 2010/0078379 A1 Apr. 1, 2010

Related U.S. Application Data

(60) Provisional application No. 61/083,785, filed on Jul. 25, 2008.

(51) Int. Cl.
| | | |
|---|---|---|
| B01D 29/07 | (2006.01) | |
| B01D 39/14 | (2006.01) | |
| B01D 46/52 | (2006.01) | |
| B01D 25/26 | (2006.01) | |
| B01D 29/00 | (2006.01) | |

(52) U.S. Cl.
CPC ............. *B01D 46/526* (2013.01); *B01D 25/26* (2013.01); *B01D 46/522* (2013.01); *B01D 46/523* (2013.01); *B01D 46/525* (2013.01)

(58) Field of Classification Search
CPC .... B01D 25/26; B01D 46/526; B01D 46/523; B01D 46/522; B01D 46/525; B01D 29/21

USPC ........... 210/493.1, 493.5, 493.3; 55/521, 497, 55/DIG. 12
See application file for complete search history.

(56) References Cited

U.S. PATENT DOCUMENTS

| | | |
|---|---|---|
| 2,058,669 A | 10/1936 | Dollinger |
| 2,514,505 A | 7/1950 | Morton |
| 2,514,506 A | 7/1950 | Mueller |

(Continued)

FOREIGN PATENT DOCUMENTS

| | | |
|---|---|---|
| CA | 557255 | 5/1958 |
| CN | 1902384 | 1/2007 |

(Continued)

OTHER PUBLICATIONS

"File History", for co-pending U.S. Appl. No. 13/013,631, "Pleated Filtration Media Having Tapered Flutes," Filed on Jun. 10, 2005 (153 pages).

(Continued)

*Primary Examiner* — Nam Nguyen
*Assistant Examiner* — Madeline Gonzalez
(74) *Attorney, Agent, or Firm* — Pauly, Devries Smith & Deffner, LLC

(57) ABSTRACT

Pleated filtration media, media packs, filter elements, and methods for filtering fluid are provided which contain three dimensional flutes in the media surface, the flutes configured to improve filter performance. In certain embodiments the flutes have defined peaks that reduce masking between adjacent pleats, the flutes have ridges along their length to modify flute cross sectional geometry, and/or the flutes provide for volume asymmetry across the media.

20 Claims, 35 Drawing Sheets

(56) References Cited

U.S. PATENT DOCUMENTS

| | | | |
|---|---|---|---|
| 2,599,604 A | 6/1952 | Bauer et al. | |
| 2,908,350 A | 10/1959 | Buckman | |
| 2,960,145 A | 11/1960 | Ruegenberg | |
| 2,980,208 A | 4/1961 | Neumann | |
| 3,025,963 A | 3/1962 | Bauer | |
| 3,058,594 A | 10/1962 | Hultgren | |
| 3,062,378 A | 11/1962 | Briggs | |
| 3,077,148 A | 2/1963 | Mumby | |
| 3,146,197 A | 8/1964 | Getzin | |
| 3,198,336 A | 8/1965 | Hyslop | |
| 3,372,533 A | 3/1968 | Rummel | |
| 3,531,920 A | 10/1970 | Hart | |
| 3,799,354 A | 3/1974 | Buckman et al. | |
| 3,807,150 A | 4/1974 | Maracle | |
| 3,948,712 A | 4/1976 | Stannard | |
| 4,102,792 A | 7/1978 | Harris | |
| 4,154,688 A | 5/1979 | Pall | |
| 4,268,290 A * | 5/1981 | Barrington | 55/521 |
| 4,290,889 A | 9/1981 | Erickson | |
| 4,310,419 A | 1/1982 | Nara et al. | |
| 4,389,315 A | 6/1983 | Crocket | |
| 4,410,316 A | 10/1983 | Yoke | |
| 4,410,427 A | 10/1983 | Wydeven | |
| 4,439,321 A | 3/1984 | Taki et al. | |
| 4,452,619 A | 6/1984 | Wright et al. | |
| 4,488,966 A | 12/1984 | Schaeffer | |
| 4,537,812 A | 8/1985 | Elbers | |
| 4,589,983 A | 5/1986 | Wydevan | |
| 4,615,804 A | 10/1986 | Wright | |
| 4,617,072 A | 10/1986 | Merz | |
| 4,652,286 A | 3/1987 | Kusuda et al. | |
| 4,732,678 A | 3/1988 | Humbert, Jr. | |
| 4,735,720 A | 4/1988 | Kersting | |
| 4,766,453 A | 8/1988 | Shiokama et al. | |
| 4,925,561 A | 5/1990 | Ishii et al. | |
| 5,002,666 A | 3/1991 | Matsumoto et al. | |
| 5,049,326 A | 9/1991 | Matsumoto et al. | |
| 5,066,400 A | 11/1991 | Rocklitz et al. | |
| 5,080,790 A | 1/1992 | Widmann | |
| 5,089,202 A | 2/1992 | Lippold | |
| 5,128,039 A | 7/1992 | Gabrielson | |
| 5,240,540 A | 8/1993 | Matsumoto et al. | |
| 5,262,899 A | 11/1993 | Iizuka | |
| 5,274,413 A | 12/1993 | Nomura et al. | |
| 5,290,447 A | 3/1994 | Lippold | |
| 5,435,870 A | 7/1995 | Takagaki et al. | |
| 5,562,825 A | 10/1996 | Yamada et al. | |
| 5,591,329 A | 1/1997 | Davidson | |
| 5,613,992 A | 3/1997 | Engel | |
| 5,766,289 A | 6/1998 | Haggard | |
| 5,772,883 A | 6/1998 | Rothman et al. | |
| D396,098 S | 7/1998 | Gillingham | |
| 5,792,247 A | 8/1998 | Gillingham et al. | |
| D398,046 S | 9/1998 | Gillingham | |
| 5,804,014 A | 9/1998 | Kahler | |
| 5,804,073 A | 9/1998 | Horst | |
| D399,944 S | 10/1998 | Gillingham | |
| 5,820,646 A | 10/1998 | Gillingham et al. | |
| 5,851,250 A | 12/1998 | Sugie et al. | |
| 5,871,641 A | 2/1999 | Davidson | |
| 5,882,288 A | 3/1999 | Paul et al. | |
| 5,888,262 A | 3/1999 | Kähler | |
| 5,895,574 A | 4/1999 | Friedmann et al. | |
| 5,902,364 A | 5/1999 | Tokar et al. | |
| 5,970,609 A | 10/1999 | Shioda | |
| 6,039,778 A | 3/2000 | Coulonvaux | |
| 6,048,298 A | 4/2000 | Paul et al. | |
| D428,128 S | 7/2000 | Gillingham | |
| 6,089,761 A | 7/2000 | Sakurai | |
| 6,179,890 B1 | 1/2001 | Ramos | |
| D437,401 S | 2/2001 | Ramos | |
| 6,190,432 B1 | 2/2001 | Gieseke et al. | |
| 6,202,038 B1 | 3/2001 | Wegerich et al. | |
| 6,210,469 B1 | 4/2001 | Tokar | |
| 6,235,195 B1 | 5/2001 | Tokar | |
| 6,238,561 B1 | 5/2001 | Liu et al. | |
| 6,348,084 B1 | 2/2002 | Gieseke | |
| 6,348,085 B1 | 2/2002 | Tokar | |
| 6,350,291 B1 | 2/2002 | Gieseke | |
| 6,350,296 B1 | 2/2002 | Warner | |
| 6,402,800 B1 | 6/2002 | Rey | |
| 6,517,598 B2 | 2/2003 | Anderson | |
| 6,544,310 B2 | 4/2003 | Badeau et al. | |
| 6,554,503 B2 | 4/2003 | Imanari et al. | |
| 6,582,490 B2 | 6/2003 | Miller et al. | |
| 6,598,749 B2 | 7/2003 | Paul et al. | |
| 6,610,117 B2 | 8/2003 | Gieseke et al. | |
| 6,610,126 B2 | 8/2003 | Xu | |
| 6,620,223 B2 | 9/2003 | Bloomer | |
| 6,673,136 B2 | 1/2004 | Gillingham et al. | |
| 6,743,270 B2 | 6/2004 | Oda et al. | |
| 6,746,518 B2 | 6/2004 | Gieseke et al. | |
| 6,790,397 B2 | 9/2004 | Richerson et al. | |
| 6,848,435 B2 | 2/2005 | Kitamura et al. | |
| 6,893,282 B2 | 5/2005 | Schadhauser | |
| 6,946,012 B1 | 9/2005 | Miller | |
| 6,953,124 B2 | 10/2005 | Winter et al. | |
| 6,955,775 B2 | 10/2005 | Chung et al. | |
| 6,966,940 B2 | 11/2005 | Krisko et al. | |
| 6,986,842 B2 | 1/2006 | Bortnik et al. | |
| 7,070,642 B2 | 7/2006 | Scott et al. | |
| 7,122,068 B2 | 10/2006 | Tate et al. | |
| 7,149,153 B2 | 12/2006 | Meylan | |
| 7,213,595 B2 | 5/2007 | Capon et al. | |
| 7,235,115 B2 | 6/2007 | Duffy | |
| 7,258,719 B2 | 8/2007 | Miller et al. | |
| 7,270,693 B2 | 9/2007 | Chung et al. | |
| 7,329,326 B2 | 2/2008 | Wagner et al. | |
| 7,396,375 B2 | 7/2008 | Nepsund | |
| 7,396,376 B2 | 7/2008 | Schrage et al. | |
| 7,425,227 B1 | 9/2008 | Hutchison et al. | |
| 7,438,812 B2 | 10/2008 | Denton et al. | |
| 7,488,365 B2 | 2/2009 | Golden et al. | |
| 7,556,663 B2 | 7/2009 | Niakan | |
| 7,588,619 B2 | 9/2009 | Chilton | |
| 7,927,393 B2 | 4/2011 | Sanami | |
| 7,959,702 B2 | 6/2011 | Rocklitz et al. | |
| 7,997,425 B2 | 8/2011 | Golden et al. | |
| 8,042,694 B2 | 10/2011 | Driml et al. | |
| 8,361,183 B2 | 1/2013 | Rocklitz et al. | |
| 8,397,920 B2 | 3/2013 | Moy et al. | |
| 8,512,499 B2 | 8/2013 | Golden et al. | |
| 8,545,589 B2 | 10/2013 | Rocklitz | |
| 8,734,557 B2 | 5/2014 | Rocklitz et al. | |
| 2002/0046654 A1 | 4/2002 | Bloomer | |
| 2002/0060183 A1 | 5/2002 | Paul et al. | |
| 2002/0108359 A1 | 8/2002 | Powell | |
| 2002/0174770 A1 | 11/2002 | Badeau et al. | |
| 2003/0056479 A1 | 3/2003 | LeMaster | |
| 2003/0121845 A1 | 7/2003 | Wagner et al. | |
| 2005/0139544 A1* | 6/2005 | Choi | 210/493.1 |
| 2005/0144916 A1 | 7/2005 | Adamek et al. | |
| 2005/0166561 A1 | 8/2005 | Schrage | |
| 2005/0217226 A1 | 10/2005 | Sundet et al. | |
| 2005/0223687 A1 | 10/2005 | Miller et al. | |
| 2005/0252182 A1 | 11/2005 | Golden et al. | |
| 2006/0005518 A1 | 1/2006 | Duffy et al. | |
| 2006/0021926 A1 | 2/2006 | Woodard | |
| 2006/0042209 A1 | 3/2006 | Dallas et al. | |
| 2006/0042210 A1 | 3/2006 | Dallas et al. | |
| 2006/0091066 A1 | 5/2006 | Driml et al. | |
| 2006/0091084 A1 | 5/2006 | Merritt | |
| 2006/0151383 A1* | 7/2006 | Choi | 210/493.1 |
| 2006/0163150 A1 | 7/2006 | Golden et al. | |
| 2006/0246260 A1 | 11/2006 | Sundet et al. | |
| 2006/0272305 A1 | 12/2006 | Morgan | |
| 2007/0039296 A1 | 2/2007 | Schrage et al. | |
| 2007/0251634 A1 | 11/2007 | Choi | |
| 2008/0022643 A1 | 1/2008 | Fox et al. | |
| 2008/0209875 A1 | 9/2008 | Treier et al. | |
| 2008/0216654 A1 | 9/2008 | Wagner et al. | |
| 2008/0282890 A1* | 11/2008 | Rocklitz et al. | 95/273 |
| 2009/0102094 A1 | 4/2009 | Golden et al. | |
| 2009/0127211 A1 | 5/2009 | Rocklitz | |

(56) References Cited

U.S. PATENT DOCUMENTS

| | | |
|---|---|---|
| 2009/0211696 A1 | 8/2009 | Moe et al. |
| 2009/0302390 A1 | 12/2009 | Van Dal et al. |
| 2010/0032365 A1 | 2/2010 | Moe |
| 2010/0078379 A1 | 4/2010 | Rocklitz |
| 2011/0186504 A1 | 8/2011 | Rocklitz |
| 2011/0277431 A1 | 11/2011 | Rocklitz et al. |
| 2012/0196733 A1 | 8/2012 | Moe et al. |
| 2012/0312167 A1 | 12/2012 | Wagner et al. |
| 2013/0228077 A1 | 9/2013 | Rocklitz et al. |
| 2014/0182251 A1 | 7/2014 | Rocklitz |
| 2014/0325946 A1 | 11/2014 | Rocklitz et al. |

FOREIGN PATENT DOCUMENTS

| | | |
|---|---|---|
| DE | 3815145 | 10/1989 |
| DE | 4126126 | 2/1993 |
| DE | 19735993 | 2/1999 |
| EP | 0504038 | 9/1992 |
| EP | 0630672 | 12/1994 |
| EP | 1595590 | 11/2005 |
| EP | 1681087 | 7/2006 |
| GB | 1336841 | 11/1973 |
| GB | 2395537 | 4/2006 |
| JP | 5982919 | 5/1984 |
| JP | 6071018 | 4/1985 |
| JP | S61200116 | 9/1986 |
| JP | 01128811 | 5/1989 |
| JP | H01163410 | 6/1989 |
| JP | 1-163408 | 11/1989 |
| JP | 2-25009 | 2/1990 |
| JP | 3229230 | 10/1991 |
| JP | 8238413 | 9/1996 |
| JP | 08309138 | 11/1996 |
| JP | 2002113798 | 4/2002 |
| JP | 2002303122 | 10/2002 |
| JP | 2003166446 | 6/2003 |
| WO | WO-89/10781 | 11/1989 |
| WO | WO-9302769 | 2/1993 |
| WO | 9740918 | 11/1997 |
| WO | WO-9908771 | 2/1999 |
| WO | 03033952 | 4/2003 |
| WO | 03047722 | 6/2003 |
| WO | 2004007054 | 1/2004 |
| WO | WO-2004/039746 | 5/2004 |
| WO | WO-2004039476 | 5/2004 |
| WO | 2004082795 | 9/2004 |
| WO | 2005077487 | 8/2005 |
| WO | WO-2005/082484 | 9/2005 |
| WO | 2005123222 | 12/2005 |
| WO | 2006017790 | 2/2006 |
| WO | 2006076456 | 7/2006 |
| WO | 2006076479 | 7/2006 |
| WO | WO-2006/132717 | 12/2006 |
| WO | 2007056589 | 5/2007 |
| WO | 2007133635 | 11/2007 |
| WO | WO-2008095196 | 8/2008 |
| WO | WO 2009/003119 | 12/2008 |
| WO | WO-2009/003119 | 12/2008 |
| WO | WO-2009100067 | 8/2009 |
| WO | WO-2010011910 | 1/2010 |
| WO | 2011017352 | 2/2011 |
| WO | 2011/091432 | 7/2011 |
| WO | 2012067729 | 5/2012 |

OTHER PUBLICATIONS

"PCT International Search Report and Written Opinion", from International Application No. PCT/US2011/022446, corresponding to U.S. Appl. No. 61/298,109, mailed Apr. 5, 2011, pp. 1 15 , 15.

"PCT Notification Concerning Transmittal of International Preliminary Report on Pantentability", from International Application No. PCT/US2009/051670, corresponding to U.S. Appl. No. 12/508,944, mailed Feb. 3, 2011, pp. 1-15.

PCT International Search Report and Written Opinion, mailed Feb. 9, 2010 in corresponding PCT Application No. PCT/US2009/051670, 26 pages).

"Type 101 Automatic Corrugator," Solent Technology Deep Pleating Equipment; http://www.solentech.com/html/101_info.html, accessed Dec. 23, 2009, 1 page.

"Type 102 Computerized Pleating System," Solent Technology Deep Pleating Equipment; http://www.solentech.com/html/102_info.html, accessed Dec. 23, 2009, 1 page.

"Type 103 Box Pleater," Solent Technology Deep Pleating Equipment; http://www.solentech.com/html/103_info.html, accessed Dec. 23, 2009, 1 page.

"Type 104 Blade Pleater," Solent Technology Deep Pleating Equipment; http://www.solentech.com/html/104_info.html, accessed Dec. 23, 2009, 1 page.

"Type 106 Dedicated Pleating System," Solent Technology Deep Pleating Equipment; http://www.solentech.com/html/106_info.html, accessed Dec. 23, 2009, 1 page.

"Type 202 Computerized Pleating System," Solent Technology Deep Pleating Equipment; http://www.solentech.com/html/202_info.html, accessed Dec. 23, 2009, 1 page.

Communication Relating to the Results of the Partial International Search, received in corresponding International Application No. PCT/US2009/051670, 3 pages, dated Oct. 14, 2009.

PCT International Preliminary Report on Patentability, mailed Aug. 9, 2012, from International Application No. PCT/US2011/022446, pp. 1-12.

Communication Pursuant to Article 94(3) EPC, for European Application No. 11703321.7, PCT/US2011/022446, mailed Jun. 6, 2013, 4 pages.

Communication pursuant to Article 94(3) EPC, European Examination Report, from the European Patent Office in EP Patent Application No. 09790799.2, mailed Aug. 21, 2012, pp. 1-7.

First Office Action for Chinese Application Serial No. 200980131774.5, issued Mar. 20, 2013, 7 pages.

Non-Final Office Action for Japanese Application No. 2011-520223, mailed Jun. 4, 2013, 2 pages.

Non-Final Office Action, from U.S. Appl. No. 13/013,631, mailed Jun. 18, 2013, 36 pages.

Non-Final Office Action for U.S. Appl. No. 13/013,631, mailed Jan. 3, 2014 (18 pages).

Second Office Action for Chinese Patent Application No. 200980131774.5), mailed Jan. 24, 2014 (12 pages) including English translation.

Examiners Report from CA Application No. 2676825, mailed Sep. 11, 2013, 3 pages.

Figures 1-6 from Japanese Patent JP2-129231, dated Oct. 2002, 3 pages.

File History for co-pending U.S. Appl. No. 12/215,718, (downloaded from USPTO Website Dec. 8, 2014), 214 pages.

File History for co-pending U.S. Appl. No. 12/322,616, (downloaded from USPTO Website Dec. 16, 2014), 258 pages.

File History for co-pending U.S. Appl. No. 13/013,631, (downloaded from USPTO Website Jan. 6, 2015), 296 pages.

File History for co-pending U.S. Appl. No. 13/110,742, (downloaded from USPTO Website Dec. 8, 2014), 148 pages.

File History for co-pending U.S. Appl. No. 13/744,200, (downloaded from USPTO Website Dec. 8, 2014), 126 pages.

File History for co-pending U.S. Appl. No. 14/040,929, downloaded Jan. 16, 2015, 147 pages.

File History for related U.S. Appl. No. 12/012,785, downloaded Dec. 8, 2014, 103 pages.

File History from related European Application Serial No. 08714184.2-2113, now Issued EP Patent No. 2117672, (downloaded from EPO Register Nov. 25, 2014), 152 pages.

File History from related European Application Serial No. 08781029.7-1365, now Issued EP Patent No. 2170488, (downloaded from EPO Register Nov. 25, 2014), 134 pages.

File History from related European Application Serial No. 09708023.8, (downloaded from EPO Register Dec. 31, 2014), 40 pages.

File History from related European Application Serial No. 09790799.2, (downloaded from EPO Register Feb. 3, 2015) 148 pages.

(56) References Cited

OTHER PUBLICATIONS

File History from related European Application Serial No. 10807046.7-1356, (downloaded from EPO Register Dec. 31, 2014), 33 pages.
File History from related European Application Serial No. 11703321.7, (downloaded from EPO Register Dec. 31, 2014), 50 pages.
File History from related European Application Serial No. 12163091.7, (downloaded from EPO Register Feb. 3, 2015), 127 pages.
File History from related European Application Serial No. 12163098.2-1356, (downloaded from EPO Register Feb. 3, 2015), 132 pages.
File History from related European Application Serial No. 12163105.5-1356, (downloaded from EPO Register Feb. 3, 2015), 130 pages.
File History from related European Application Serial No. 14166293.2, (downloaded from EPO Register Feb. 3, 2015), 117 pages.
Final Rejection for Chinese Application No. 200980103965.0, mailed May 14, 2013 (14 pages) including English translation.
First Chinese Office Action Received First Office Action for Chinese Application No. 200880006683.4, mailed May 31, 2011, Including English translation, 7 pages.
First Examination Report for India Patent Application No. 3070/KOLNP/2009, mailed Aug. 7, 2014 (2 pages).
First Examiner Report from Australian Application No. 2008268271, mailed Feb 24, 2012, 2 pages.
First Office Action for Chinese Application No. 200880104082.7, mailed Aug. 9, 2013 (7 pages) with English translation.
First Office Action for Chinese Patent Application No. 201180011588.5, (with English translation) mailed Mar. 4, 2014 (30 pages).
First Office Action for Chinese Patent Application No. 201201811828, mailed Feb. 21, 2014 (16 pages) with English translation.
First Office Action for Chinese Patent Application No. 201210180467.X, mailed Jan. 28, 2014 (10 pages) with English translation.
First Office Action for Chinese Patent Application No. 201210181810.2 mailed Jan. 10, 2014 (8 pages) with English translation.
First Office Action from CN Application No. 200980103965.0, mailed Jul. 20, 2012, (pp. 1-18) Including English translation.
First Office Action from CN Application No. 201080037254.0, mailed Oct. 29, 2013, with English translation (20 pages).
First Office Action Received for Australian Application No. 2008210304, mailed Nov. 23, 2011 (2 pages).
International Preliminary Report on Patentability for International Application No. PCT/US2009/032965 mailed Aug. 19, 2010 (9 pages).
International Preliminary Report on Patentability from International Application No. PCT/US2008/068394, mailed Jan. 14, 2010 (9 pages).
International Preliminary Report on Patentability from International Application No. PCT/US2010/044286, mailed Feb. 16, 2012, 7 pages.
International Search Report and Written Opinion for International Application No. PCT/US2009/032965, mailed May 18, 2009 (13 pages).
International Search Report and Written Opinion from International Application No. PCT/US2008/052961, mailed Jun. 11, 2008 (13 pages).
International Search Report and Written Opinion from International Application No. PCT/US2008/068394, mailed Oct. 7, 2008, (11 pages).
International Search Report and Written Opinion from International Application No. PCT/US2010/044286, mailed Apr. 14, 2011, 10 pages.
Non Final Office Action for Chinese Patent Application No. 201210181810.2, mailed on Feb. 10, 2015 (13 pages) with English translation.
Office Action for JP Application No. 2012-523711, with English translation, mailed Jul. 1, 2014 (5 pages).
Response to First Office Action from JP Application No. 2010-515132, submitted Sep. 19, 2012, (11 pages) Including English translation of claim amendments.
Second Non-Final Office Action for Chinese Patent Application No. 201180011588.5, mailed Dec. 25, 2014 (9 pages) with English translation.
Second Office Action for Chinese Patent Application No. 200880104082.7, mailed Mar. 11, 2014 (49 pages) with English translation.
Second Office Action for Chinese Patent Application No. 2009801039650, mailed Oct. 29, 2014 (6 pages) including English translation.
Second Office Action for Chinese Patent Application No. 201080037254.0, mailed Nov. 15, 2014 (15 pages) with English translation.
Second Office Action for Chinese Patent Application No. 201210180467.X, mailed Nov. 2, 2014 (7 pages) with English translation.
Second Office Action for Chinese Patent Application No. 201210181182.8, mailed Dec. 9, 2014 (6 pages) with English translation.
Third Office Action for Chinese Patent Application No. 200980131774.5, mailed Jan. 16, 2015 (15 pages) with English translation.
Translation of Final Rejection for Japanese Patent Application No. 2011520223, mailed Sep. 2, 2014, 2 pages.
Translation of Mexican Office Action Received, MX Application No. MX/a/2009/008242, mailed Jun. 8, 2012, 1 page.
Translation of Office Action for Mexican Patent Application No. MX/a/2010/008530, mailed Dec. 3, 2013 (2 pages).
Translation of Office Action for Mexico Application No. MX/a/2010/008530, mailed May 28, 2013 (3 pages).
Translation of Office Action for MX Application No. MX/a/2010/008530, mailed Jul. 10, 2014 (3 pages).
Translation of Office Action from Mexican Application No. MX/a/2009/014134 mailed Apr. 19, 2012 (3 pages).
Translation of Second Office Action for Mexican Patent Application No. MX/a/2011/000965, mailed Nov. 6, 2014 (2 pages).
Office Action for Chinese Application No. 200880104082.7, mailed on Feb. 12, 2015 (6 pages) with English Translation.
Response and RCE filed in co-pending U.S. Appl. No. 12/322,616, submitted to USPTO Feb. 17, 2015, (11 pages).
Response and RCE filed in co-pending U.S. Appl. No. 13/013,631, submitted to USPTO Feb. 19, 2015, (13 pages).
Translation of Office Action for Mexican Patent Application No. MX/2010/008530, mailed on Jan. 30, 2015 (3 pages).
Examiner's Report for Canadian Patent Application No. 2691867, mailed on Jan. 30, 2015 (3 pages).
Final Rejection for Chinese Patent Application No. 201080037254.0, mailed Mar. 30, 2015 (15 pages) with English translation.
Non-Final Office Action for U.S. Appl. No. 13/388,956, mailed Mar. 13, 2015 (35 pages).

* cited by examiner

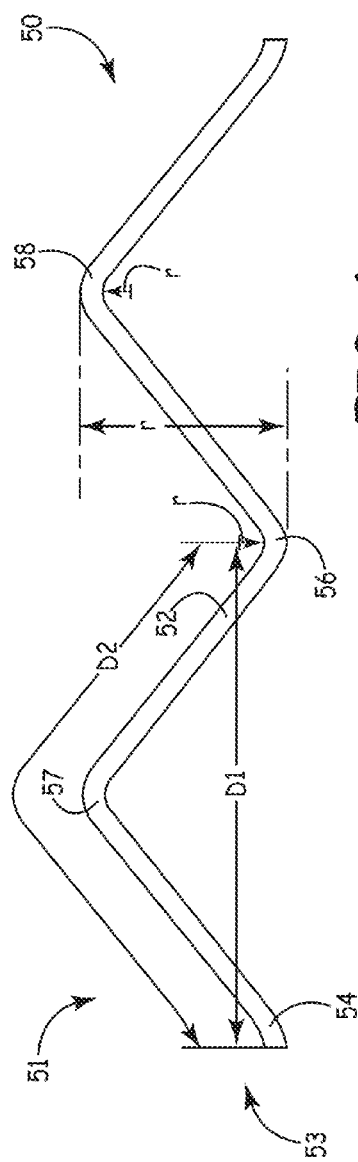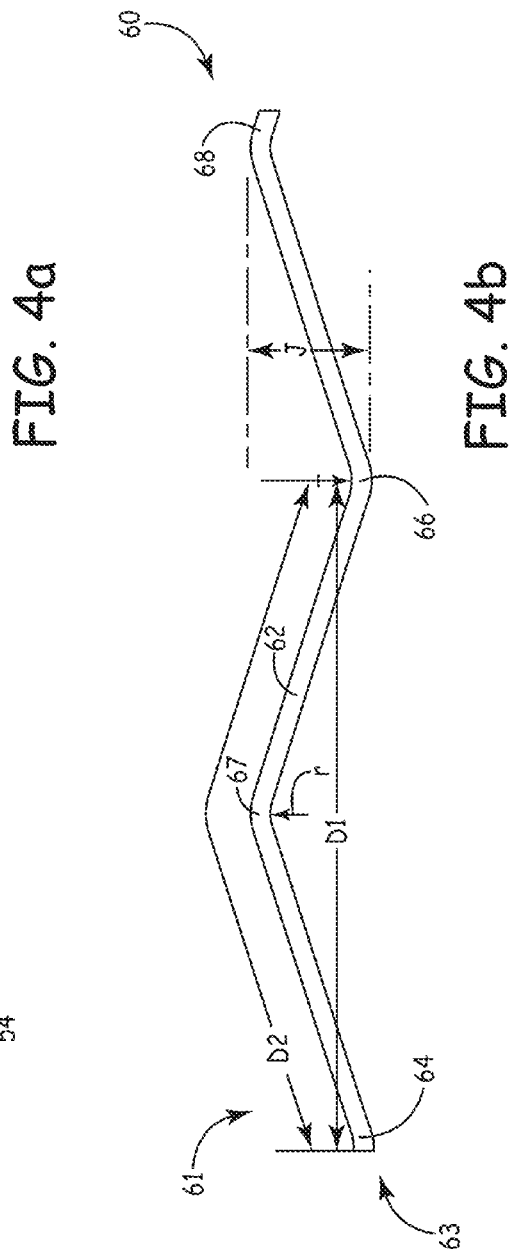

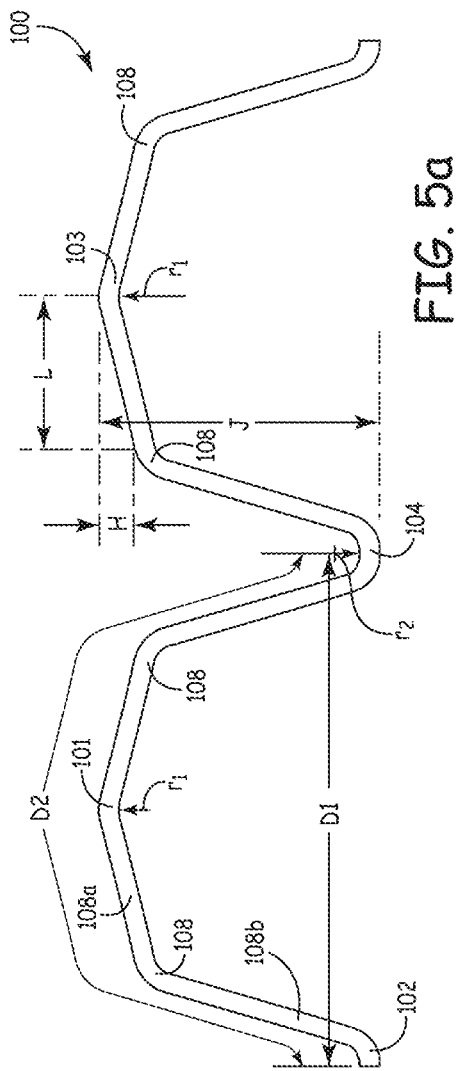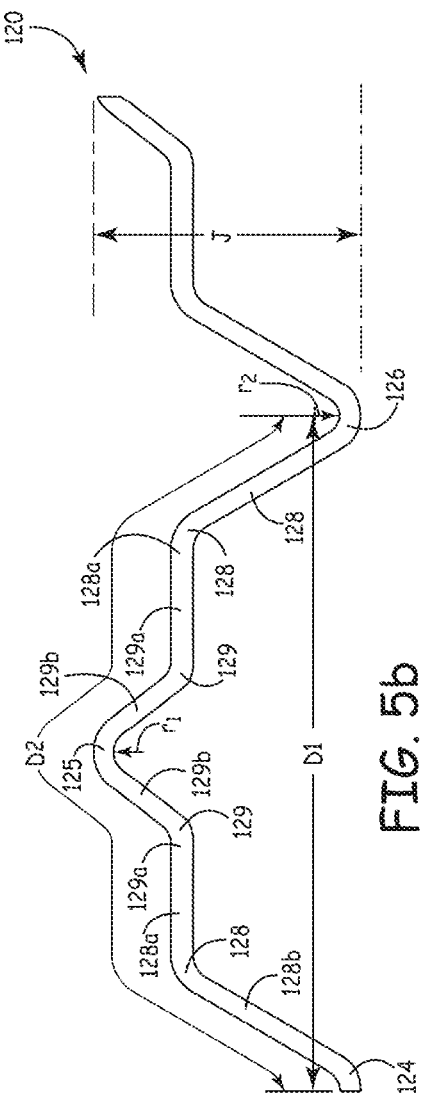

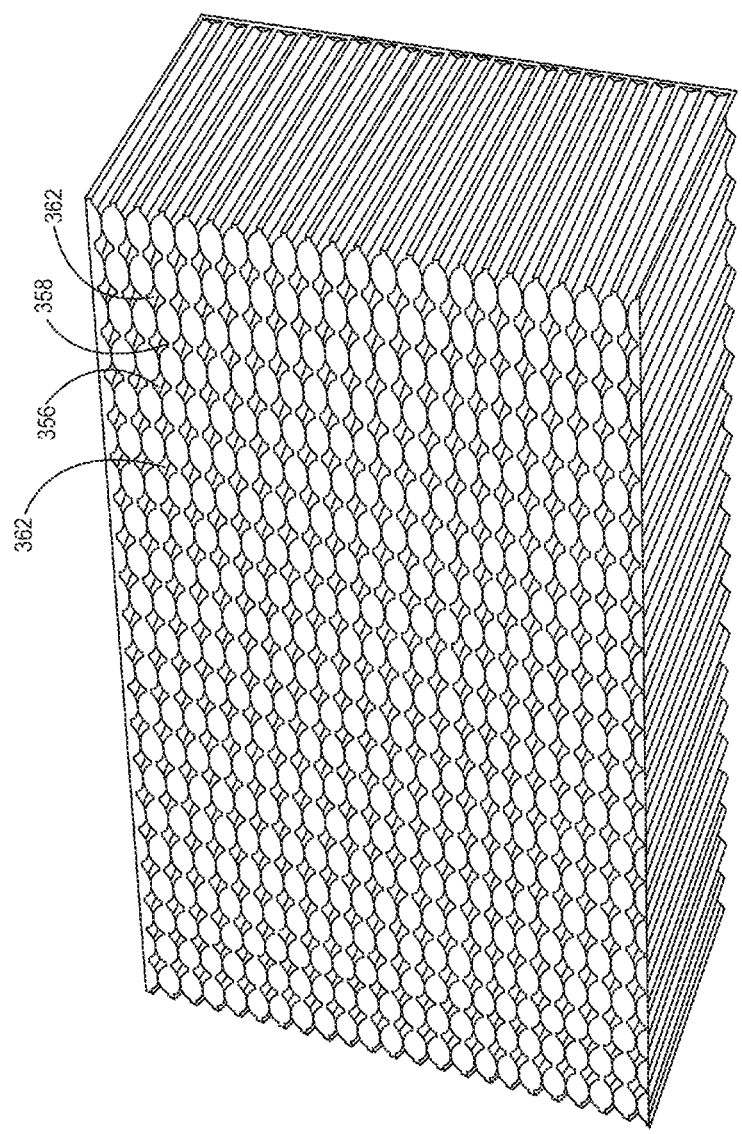

Local Effective Inner Radius

Local Effective Inner Radius

PLEATED FILTRATION MEDIA, MEDIA PACKS, FILTER ELEMENTS, AND METHODS FOR FILTERING FLUIDS

This application claims the benefit of U.S. Provisional Application No. 61/083,785, filed Jul. 25, 2008, the contents of which are herein incorporated by reference.

FIELD OF THE INVENTION

The present invention relates to pleated filtration media, pleated filtration media packs, filter elements, and methods for filtering fluids.

BACKGROUND

Fluid streams, such as air and liquid, carry contaminant material therein. In many instances, it is desired to filter some or all of the contaminant material from the fluid stream. For example, air streams to engines for motorized vehicles or for power generation equipment, air and gas streams to gas turbine systems, air and gas streams to various combustion furnaces, and air and gas streams to heat exchangers (e.g., heating and air conditioning) carry particulate contaminants that should often be filtered. Liquid streams in engine lube systems, hydraulic systems, coolant systems and fuel systems, can also carry contaminants that should be filtered. It is preferred for such systems that selected contaminant material be removed from (or have its level reduced in) the fluid. A variety of fluid filters (gas or liquid filters) have been developed for contaminant reduction. In general, however, continued improvements are sought.

SUMMARY

Pleated filtration media has been in use for many years, and is widely adopted for fluid filtration applications, including gas and liquid filtration. Pleated filtration media provides a relatively large media surface area, in a given volume, by folding the media back and forth such that a large amount of media can be arranged in a relatively small volume.

Pleated media can be assembled into numerous shapes and configurations, including panel filters and cylindrical filters. In panel filters, pleated media typically extends in a planar or panel configuration having a first face of the pleated media formed from a first set of pleat folds (also called pleat tips) and a second face of the pleated media formed from a second set of pleat folds (also called pleat tips). The first and second faces formed by the pleat folds are generally parallel. Fluid flows into the panel filter through one face and out of the panel filter through the other face.

In cylindrical filters, pleated media is generally formed into a tube, with a first face of the pleated media (formed by a first set of pleat folds) creating an interior face, and the second face of the pleated media (formed by a second set of pleat folds) forming an outside face. In the case of a cylindrical filter for air filtration, air typically flows into the filter element from the outside face to the interior face (or vice versa in what are sometimes referred to as reverse flow filters).

Pleated media packs are often formed from continuous or rolled webs of filter media, with the pleats formed transverse to the machine direction of the media. The machine direction of the media generally refers to the continuous direction of the media. The pleat folds, therefore, are generally transverse to the machine or continuous direction of the media in order to create the three-dimension network. In general, a first set of pleat folds forms a first face of the media and a second set of pleat folds forms a second face of the media.

One challenge to designing filter elements containing pleated filter media is that as the number of pleats within a given volume increases, an undesirable level of fluid flow restriction can occur with prior pleated media. This restriction occurs as the pleats become too close to each other and interfere with each other during filtration. For example, with prior pleated media constructions, pleats can be so close together that it is difficult for a fluid to enter the area between the pleats. Due to this restriction, the media is modified in some prior pleated filters to create an uneven surface with raised areas of shallow repeating arcs along the media surface. Sometimes the media is embossed to create these repeating arcs. The shallow repeating arcs can be formed by running the media through the nips of corrugation rollers. As pleats having this uneven surface become pressed toward one another, the raised areas on the media help maintain fluid flow between pleat surfaces by forming channels aiding fluid flow.

The present invention is directed, in part, to pleated filtration media and filtration media pleat packs that contain flutes extending between the pleat folds (example flutes are shown in cross section, for example, at FIGS. 5A and 5B, described below). The flutes are three dimensional structures formed in the filtration media that provide advantageous flow paths along the pleat surfaces, allow for advantageous flow of fluids through the media, and provide for efficient contaminant removal. Thus, the pleated media containing flutes is structured so as to provide improved filtration performance under certain conditions.

Advantages of pleated media containing flutes include, for example, the ability to reduce contact between media surfaces while preserving media integrity and performance; the ability to create media packs with different open areas or volumes on the upstream and downstream portions (thereby affecting performance of some media arrangements), the ability to have high pleat counts while preserving filtration performance, and/or the ability to make relatively compact, efficient, filter elements.

More specifically, in certain embodiments, fluted media made in accordance with teachings of the present invention can significantly diminish masking between layers of pleated media, while also promoting efficient flow of fluids through the media. The flutes formed in the media typically have peaks where each flute can make contact with opposed pleat surfaces, which generally also have flutes with peaks. The flute peaks will contact one another in some embodiments along some or all of the length of the flute, but in other implementations the flute peaks will not come in contact with other flutes or flute peaks.

The flute peaks are typically characterized by a sharp radius or a defined tip that reduces masking between pleats. As used herein, masking refers to the area of proximity between the media sheets where there is a lack of substantial pressure difference across the media. In general, masking is experienced at the location in the media where there is close proximity or contact to another media sheet or flow bounding surface. This close proximity can result in resistance to flow through the media at that location. As a result, masked media is not useful to the filtration performance of filtration media.

Accordingly, it is desirable to reduce masking so as to increase the amount of filtration media available for filtration. Reduction in masking increases the dust storage capacity of the filtration media pleat pack, increases the throughput of fluids through the filtration media for a given pressure drop, and/or decreases the pressure drop of the filtration media pleat pack for a given overall fluid flow rate. Flutes in the pleated media made in accordance with the teachings of the present invention allow for a reduction in masking of the media. This reduction in masking occurs in large part as a result of creating flute peaks, and changing their shape and location, as described herein. For example, in some embodiments of the invention the flute peaks have tips that extend beyond the general profile of the adjacent flute.

Specific further structural aspects of the flutes include, in some embodiments, ridges running along all or part of the lengths of the flutes. As used herein, a ridge is generally a defined bend, crease, or deformation in the media along some or all of the length of a flute. More specifically, a ridge can be a region of transition between substantially differently sloped media portions within the profile of a section of fluted media. The transition is typically relatively abrupt. Under normal usage, ridges do not contact ridges from other adjacent pleats. Under normal usage, ridges occur between peaks, but ridges are not peaks. Ridges promote efficiency of fluid flow and filtration through the media packs by allowing customization and optimization of the cross sectional area of the flutes, increases in the amount of media within a specific volume, and aiding in reduction of masking between flutes on opposed media surfaces. The use of ridges in the pleated media can actually result in increased amounts of effective or usable media while having reduced masking.

In certain embodiments the filtration media pleat packs are constructed with flutes that have different channel shapes and different open volumes on the upstream and downstream sides of the pleats in filtration media pleat packs, a property referred to herein as pleat pack volumetric asymmetry. This pleat pack volumetric asymmetry can, in some embodiments, promote contaminant material storage, flow and filtration. Pleat pack volumetric asymmetry can be particularly helpful for improving performance in filter configurations that have shallow pleat packs.

Specific implementations of the invention will now be described in greater detail. In some embodiments, pleated filtration media packs made in accordance with the invention include a first set of pleat folds that form a first face and a second set of pleat folds that form a second face. The pleated filtration media extends between the first face and the second face in a back and forth arrangement. At least a portion of the filtration media that extends between the first face and the second face includes flutes that extend at least part way from the first face to the second face. These flutes typically have defined flute peaks extending along part or all of the length of the flutes. Usually the flute peaks are relatively sharp, a characteristic that allows for reduced masking.

Although the peaks are sharp, in many implementations they still contain a tightly curved outer surface, sometimes approximating an arc or a bend with a radius. By providing relatively sharp peaks, the area of contact and/or proximity between media surfaces may be reduced, which results in a reduction in masking During filtration the filtration media will typically deflect under pressure, and the relatively sharp peaks can continue to reduce the contact between media surfaces, thus providing an ongoing advantage with regard to reduction of masking.

As noted above, in some embodiments many of the flutes in the pleated filtration media pack also comprise at least one ridge between adjacent flute peaks that extends along at least a portion of the flute length between the first set of pleat folds and the second set of pleat folds. Flute ridges made in accordance with the invention can be continuous or discontinuous along the flute(s). For example, in some implementations of the invention ridges will be present along the entire length of all of the flutes. Often it can be desirable to have two or more ridges running along the length of each flute, with one or more ridge on either side of a flute peak.

However, it is also possible to have suitable flutes with significantly fewer ridges or less extensive ridges. For example, in some implementations at least 25% of the flutes in the pleated filtration media pack have at least one ridge between adjacent flute peaks, the ridge extending along at least 25% of the flute length between the first set of pleat folds and the second set of pleat folds. Alternatively, in some implementations at least 25% of the flutes in the pleated filtration media pack comprise at least one ridge between adjacent flute peaks, the ridge extending along at least 50% of the flute length between the first set of pleat folds and the second set of pleat folds. It will be understood that in some implementations at least 50% of the flutes in the pleated filtration media pack comprise at least one ridge between adjacent flute peaks, the ridge extending along at least 50% of the flute length between the first set of pleat folds and the second set of pleat folds.

Alternative designs are also contemplated and within the scope of the present invention. For example, in some implementations at least 25% of the flutes in the pleated filtration media pack have ridges between adjacent flute peaks that extend along at least 10% of the flute length between the first set of pleat folds and the second set of pleat folds. In some implementations at least 50% of the flutes in the pleated filtration media pack have at least one ridge located between adjacent flute peaks and extending along at least 10% of the flute length between the first set of pleat folds and the second set of pleat folds. It will be understood that in some implementations at least 10% of the flutes in the pleated filtration media pack contain at least one ridge between adjacent flute peaks and extending along at least 10% of the flute length between the first set of pleat folds and the second set of pleat folds.

Alternatively, in some implementations less than 25% of the flutes in the pleated filtration media pack have at least one ridge between adjacent flute peaks, the ridges extending along less than 25% of the flute length between the first set of pleat folds and the second set of pleat folds. In some implementations less than 25% of the flutes in the pleated filtration media pack comprise at least one ridge between adjacent flute peaks, the ridges extending along less than 50% of the flute length between the first set of pleat folds and the second set of pleat folds. It will be understood that in some implementations less than 50% of the flutes in the pleated filtration media pack comprise at least one ridge between adjacent flute peaks, the ridges extending along less than 50% of the flute length between the first set of pleat folds and the second set of pleat folds.

One advantage of the present invention is that the flute geometries, typically including flute height, flute width, sharp flute peaks and optionally one or more ridges along the flutes, allow for greater amounts of overall media surface area to be included in filtration media pleat packs, and reduced overall masked surface area within pleat packs. This provides the capability to increase filter performance without increasing filter element size. The flute designs of the present invention allow for increases in media while actually reducing masking, a combination that produces excellent performance results.

In terms of flute geometry, in some embodiments at least a portion of the flutes extending from the first set of pleat folds to the second set of pleat folds comprises a D2/D1 value that is greater than 1.0, often at least 1.05, and frequently at least 1.1, wherein D2 (as shown for example in FIG. 5a) is the media surface length corresponding to one flute width and D1 is flute width (as shown for example in FIG. 5a). In some implementations D2/D1 is at least 1.15, and in other implementations at least 1.20. A higher D2/D1 value indicates increases in the amount of media provided along a given flute width. In some implementations D2/D1 is greater than 1.30, 1.40, or 1.50. Typical ranges for D2/D1 include, for example, from 1.05 to 2.0; from 1.10 to 1.75; and from 1.20 to 1.50.

The flutes formed in the media typically have a width (D1, as shown for example in FIG. 5a) greater than their height (J, as shown for example in FIG. 5a). This width to height aspect ratio can be characterized as (D1/J). In most implementations the width to height aspect ratio is at least about 2.0, generally a least 2.1, more typically at least 2.2, often at least 2.3, and optionally at least 3.0. In some implementations, the width height ratio is greater than 2.4. Generally suitable D1/J ratios will be less than 10, more typically less than 8, and often less than 6. Suitable D1/J ratios will be greater than 1, more often greater than 1.5, and usually greater than 2. Other suitable D1/J ratios include, in example implementations, greater than 4, greater than 6, or greater than 8. Thus, suitable ranges include, but are not limited to, D1/J ratios of 2 to 10, 4 to 8, and 5 to 7. However, in some implementations flutes with extremely low D1/J ratios can be used (although such flutes are generally more difficult to manufacture). For example, D1/J ratios of less than 1.0, less than 0.75, and less than 0.50 are possible (see, e.g. FIG. 4c). In some implementations, flutes containing very high or very low D1/J values have better performance than flutes containing D1/J near values of 1.15 to 2.0. Suitable ranges of such ratios for D1/J include 2 to 8 and 0.075 to 0.500.

The three dimensional structure of flutes defines open volumes upstream and downstream of the media for flow of fluid, as well as space for contaminants (such as dust) to accumulate. In some embodiments the filtration media exhibits a media volume asymmetry such that an open volume on one side of the media is greater than an open volume on the other side of the media. These volumes can extend from an upstream face to downstream face of the pleat pack.

Media volume asymmetry, as used herein, generally measures the media volume ratio of the larger media volume bounded by the flute peaks to the smaller media volume (see FIG. 9, discussed below). In some but not all implementations, the larger media volume corresponds to the upstream open media volume, and the smaller media volume corresponds to the downstream open media volume (during use the open volume may accumulate contaminants, such as dust). In some implementations media will demonstrate a media volume asymmetry of more than 1%, more than 3%, more than 5%, or more than 10%. Example media constructions demonstrate a media volume asymmetry of greater than 15%, greater than 20%, greater than 50%, greater than 75%, greater than 100%, greater than 150%, and greater than 200%. Suitable media volume asymmetry ranges includes, for example, 1% to 300%, 5% to 200%; 50% to 200%; 100% to 200%; and 100% to 150%.

In addition to media volume asymmetry, the media may also demonstrate media cross-sectional area asymmetry, which is calculated based upon a cross-section of the media. It will be understood that cross-sectional area asymmetry will often lead to differences in media volume asymmetry, but this is not always the case because cross sectional areas can be varied along the length of the pleat so as to have a cumulative effect that the total volume on each side of the media is equal.

The differences in cross sectional area are controlled by the geometry of the flute design. Often the presence, number, and shape of ridges along the flutes significantly impacts, and often determines, the amount of cross sectional area asymmetry. Flute geometry that results in differences in cross sectional area can significantly impact flow properties through the flutes. Changes in relative cross sectional area of flutes typically results in changes in the cross sectional area of the upstream and downstream portion of the media pack in that area. The present invention allows for customization of media volume asymmetry and cross-sectional area asymmetry to improve filter performance.

In some embodiments the media will have a cross-sectional area asymmetry such that one side of the media has cross sectional area at least 1 percent greater than the opposite side the same piece of media. Often the difference in cross-sectional area across the media will be more than 3%, more than 5%, or more than 10%. Example media constructions demonstrate a media cross sectional area asymmetry of greater than 15%, greater than 20%, greater than 50%, greater than 75%, greater than 100%, greater than 150%, and greater than 200%. Suitable media cross sectional area asymmetry ranges includes, for example, 1% to 300%, 5% to 200%; 50% to 200%; 100% to 200%; and 100% to 150%.

Another aspect of some implementations of the invention involves the cord length (CL) of the media to determine media-cord percentage. Cord length refers to the straight line distance from the center point of one peak and the center point of an adjacent peak (see, for example, adjacent peaks 101, 102 of FIG. 5a). In order to minimize the effect of the thickness of the media, the measurement for cord length is determined from a center point within the media. The media-cord percentage can be determined according to the following formula:

$$\text{media-cord percentage} = \frac{((1/2\,D2) - CL) \times 100}{CL}$$

By providing a single ridge or multiple ridges between adjacent peaks of the fluted media, the distance D2 can be increased relative to prior art media, resulting in increased media-cord percentage. As a result of the presence of a ridge or a plurality of ridges, it is possible to provide filtration media having more media available for filtration compared with, for example, pleated media not having the ridges. This is particularly valuable when combined with sharp flute peaks to reduce masking.

The measurement of media-cord percentage can be used to characterize the amount of media provided between adjacent peaks. In example embodiments the media-cord percentage is greater than 1%, alternatively greater than 2%, 3%, 4%, or 5%. In some implementations media cord percentage is greater than 7.5 percent, or greater than 10 percent. Suitable ranges for media cord percentage include, for example, from 0.1% to 15%, from 0.5% to 10%, and from 1% to 5%. The media cord-percentage will not always be the same along the entire length of a flute, thus in some implementations of the invention, at least 25% of the flutes exhibit a media-cord percentage of at least 1% along 50% of the flute length. In alternative implementations at least 25% of the flutes exhibit a media-cord percentage of at least 2%, 3%, 4% or 5% along 50% of the flute length.

As noted above, the flute peaks are typically characterized by a sharp radius or a defined tip that reduces masking between pleats. This defined tip can extend from the general profile of the flute to create a protrusion at the flute peak that substantially reduces masking of adjacent media. While it will be understood that a given flute peak will have some variation in shape, and not necessarily form a perfect arc, it is still possible in some implementations to identify and measure a distance that corresponds substantially to a radius at the flute peak. This radius is measured on the interior of the flute and is calculated as the effective inner radius. This effective inner radius can be measured in accordance with the disclosure provided below, and will generally be less than 4 millimeters, more often be less than 2 millimeters, frequently be less than 1 millimeter, and optionally less than 0.5 mm. Larger radii can also be used in some implementations, especially for large flutes. It will further be understood that flutes that fail to have a distinct or measurable radius still fall within the scope of the disclosure when they contain other characteristics described herein, such as the presence of ridges, media asymmetric volumes, etc.

The pleated filtration media pack can be used to filter a fluid that can be a gaseous or liquid substance. An exemplary gaseous substance that can be filtered using the filtration media is air, and exemplary liquid substances that can be filtered using the filtration media include water, oil, fuel, and hydraulic fluid. The filtration media pack can be used to separate or remove at least a portion of a component from a fluid to be filtered. The component can be a contaminant or another material targeted for removal or separation. Exemplary contaminants and materials targeted for removal include those characterized as solids, liquids, gases, or combinations thereof. The contaminants or materials targeted for removal can include particulates, non-particulates, or a mixture thereof. Materials targeted for removal can include chemical species that can be captured by the media. The reference to removal of components and contaminants should be understood to refer to the complete removal or separation or a partial removal or separation.

Filter elements are also provided according to the invention, the filter elements incorporating media having flutes. Filter elements are provided that can include a pleated filtration media pack and a seal arranged relative to the filtration media pack so that fluid to be filtered passes through the filtration media pack as a result of entering in through one face of the media pack and out the other face of the media pack. The seal can be attached directly to the pleated filtration media pack or indirectly via a seal support, and can be provided to engage a housing to provide a seal between the housing and the filter element. The seal can be provided as an axial seal, a radial seal, or a combination axial and radial seal. Crimp seals, pinch seals, and many other forms of seals are also possible.

A method of filtering a fluid is also provided according to the invention. The method includes a step of passing a fluid through a pleated filtration media pack provided as part of a filter element as a result of unfiltered fluid entering the first face or the second face of the pleated filtration media pack and out the other of the first face of the second face of the pleated filtration media pack. The flow of the fluid through the pleated filtration media pack can be characterized as straight through flow.

The above summary of the present invention is not intended to describe each disclosed embodiment of the present invention. This is the purpose of the detailed description and claims that follows.

BRIEF DESCRIPTION OF THE DRAWINGS

The invention may be more completely understood in consideration of the following detailed description of various embodiments of the invention in connection with the accompanying drawings, in which:

FIGS. 4a-c are enlarged, schematic, cross-sectional views of filtration media according to the principles of the invention.

FIGS. 5a-d are enlarged, schematic, cross-sectional views of filtration media according to the principles of the invention.

FIG. 15B is a perspective view of a second face of the pleated, panel filtration media pack of FIG. 15A.

Figure 1:
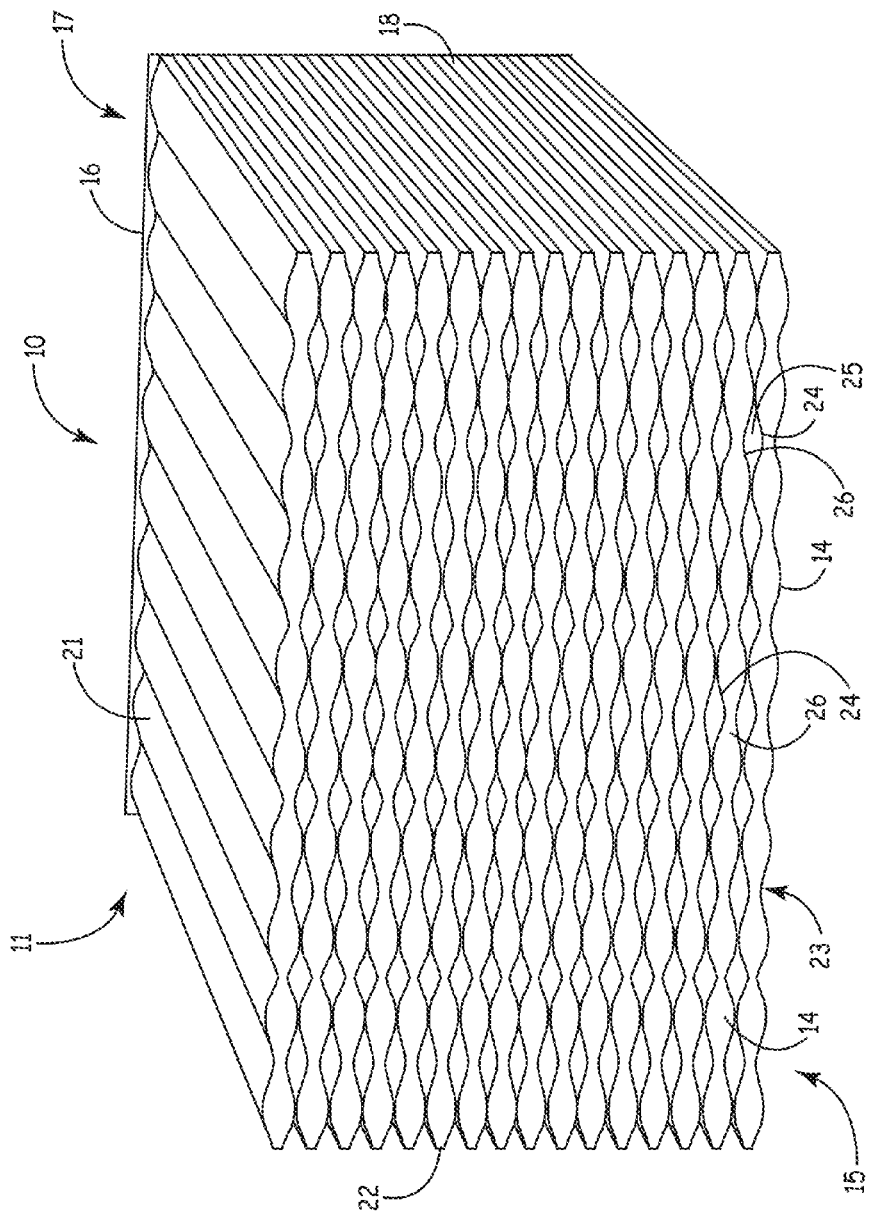
FIG. 1 is a perspective view of a prior art pleated filtration media pack.

These drawings are to be considered general representations of the invention, and it will be appreciated that they are not drawn to encompass all embodiments of the invention, nor are they always drawn to scale. It will also be understood that media made in accordance with the invention will generally exhibit variation.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

Pleated filtration media, pleated filtration media packs, filter elements containing pleated filtration media packs, and methods of filtering fluid are provided.

The phrase "pleated filtration media pack" refers to a media pack constructed or formed by folding, pleating, or otherwise forming filtration media into a three-dimensional network. A pleated filtration media pack can be referred to, more simply, as a media pack. Pleated filtration media packs can optionally be combined with other features found in filter elements including a seal and a seal support. In general, a pleated filtration media pack includes filtration media having a first set of pleat folds forming a first face, a second set of pleat folds forming a second face, and the filtration media extending between the first set of pleat folds and the second set of pleat folds in a back and forth arrangement. It will be understood that in certain embodiments the "face" described herein can be substantially uneven or irregular, and can be planer or non-planer.

The pleat folds are generally formed as a result of folding or pleating the filtration media. The folds are typically formed transverse to the machine direction of the media, but that is not a requirement. The folds can be formed at an angle that is different than an angle transverse to the machine direction. The machine direction of the media generally refers to the continuous direction of the media.

In example embodiments the pleated filtration media pack includes a first face formed as a result of a first set of pleat folds and a second face formed as a result of a second set of pleat folds, and flutes that extend directionally from the first face to the second face (or from the second face to the first face). The flutes are three dimensional structures formed in the filtration media that provide advantageous flow paths along the pleat surfaces, allow for advantageous flow of fluids through the media, and provide for efficient contaminant removal. Thus, the pleated media containing flutes is structured so as to provide improved filtration performance under certain conditions.

The first face is generally the inlet or outlet of the pleated filtration media, and the second face is the other of the inlet or outlet of the filtration media. For example, unfiltered fluid can enter the pleated filtration media pack via the first face, and filtered fluid can exit the pleated filtration media pack via the second face, or vice versa.

Flutes extending directionally from the first face to the second face, or directionally from the second face to the first face, of the filtration media generally refers to a direction that is not parallel to the first face or the second face. In many implementations the flutes extending directionally between the faces of the pleated media will be aligned perpendicular to the first or second face, or nearly perpendicular to the first or second face.

It may be advantageous to have the flutes extending at a non-perpendicular angle relative to the first flow face or the second flow face depending upon whether the fluid is flowing toward the first face or the second face at an angle that is non-perpendicular. By providing the flutes at a non-perpendicular angle relative to the first face or the second face of the pleated filtration media pack, it is possible to enhance the flow of the fluid into the pleated filtration media pack by adjusting the flute angle to better receive the fluid flow without the fluid having to make a turn before entering the pleated filtration media pack. The first face and the second face of the media pack can be parallel or non-parallel. The angle at which the flutes extend can be measured relative to the first face, the second face, or both the first face and the second face.

Thus, the flutes can be formed so that they extend perpendicular to the first face or the second face, or can be provided extending at an angle relative to the first face or the second face that is greater than 0 degrees but less than 180 degrees. If the flutes extend at an angle of 0 degrees or 180 degrees to a face, then it is difficult for fluid to enter the pleated filtration media pack via the flutes. In general, it is desirable for the fluid to enter the pleated filtration media pack by entering through the flutes.

In some implementations the flutes will extend from about 85 degrees to 95 degrees to a face, in other implementations from about 60 to 150 degrees to a face, and in yet other implementations from about 70 to 110 degrees to a face. Preferably, the flutes are provided extending at an angle that is within about 60 degrees of perpendicular to the first face or the second face. In general, this range corresponds to about 30 degrees to about 150 degrees relative to the first face or the second face. Furthermore, the flutes can be provided extending within about 5 degrees of perpendicular to the first face or the second face (corresponding to about 85 degrees to about 95 degrees relative to the first face or the second face). The flutes can desirably be provided extending perpendicular (90 degrees) relative to the first face or the second face.

During media formation, the limited dimension of the media is typically the width of the media because the machine on which the media is manufactured is limited in the width direction. The length of the media can be continuous until it is cut or until it ends. The continuous direction refers to the direction of the media along the length of the media. The transverse direction generally refers to the direction of the media across the width of the media. Pleated media generally includes pleats or folds formed transversely to the machine direction so that the number of pleats can be controlled, as desired. Pleats or folds are typically formed in the transverse direction such that the media folds back upon itself in an alternating fashion (e.g., a back and forth arrangement) to form a filter element having a first face, a second face, and an extension of media between the first face and the second face. In general, fluid to be filtered enters one of the first face and the second face of the filtration media pack, and exits the other of the first face and the second face.

Fluted media can be prepared by any technique that provides the desired flute shapes. Thus, the invention is not limited to specific methods of forming the flutes. However, depending upon the flute geometry and the media being fluted and pleated, certain methods will be more or less successful. Dry media with high cellulose content is relatively non-stretchable, and is subject to tearing if it is stretched beyond just a few percent. In contrast, media with a high synthetic content is often much more stretchable. Both types of media are suitable for use with the invention. Corrugation rollers can be used for forming flutes having a particular size and shape, generally relatively short and wide flutes. Media that is corrugated refers to media having a flute structure resulting from passing the media between two flute rollers, e.g., into a nip or bite between two rollers, each of which has surface features appropriate to create a flute in the resulting media.

When it is desirable to increase the height of the flutes, it may be desirable to use a method that essentially folds or pleats the media to form the flutes. In general, forming flutes by pleating (e.g., folding) can be referred to as micropleating because these pleats are far smaller than the larger pleats or folds that form the faces of the media pack. Thus, such micropleating methods to form flutes should not be confused with pleating or folding to form the pleat folds that result in the first and second faces of the pleated filtration media pack. An example technique for folding the media by micropleating to form flutes includes scoring and using pressure to create the fold. Accordingly, the filtration media can be micropleated to form the flutes, and subsequently pleated to form the pleated filtration media pack having a first face and a second face.

Figure 2:
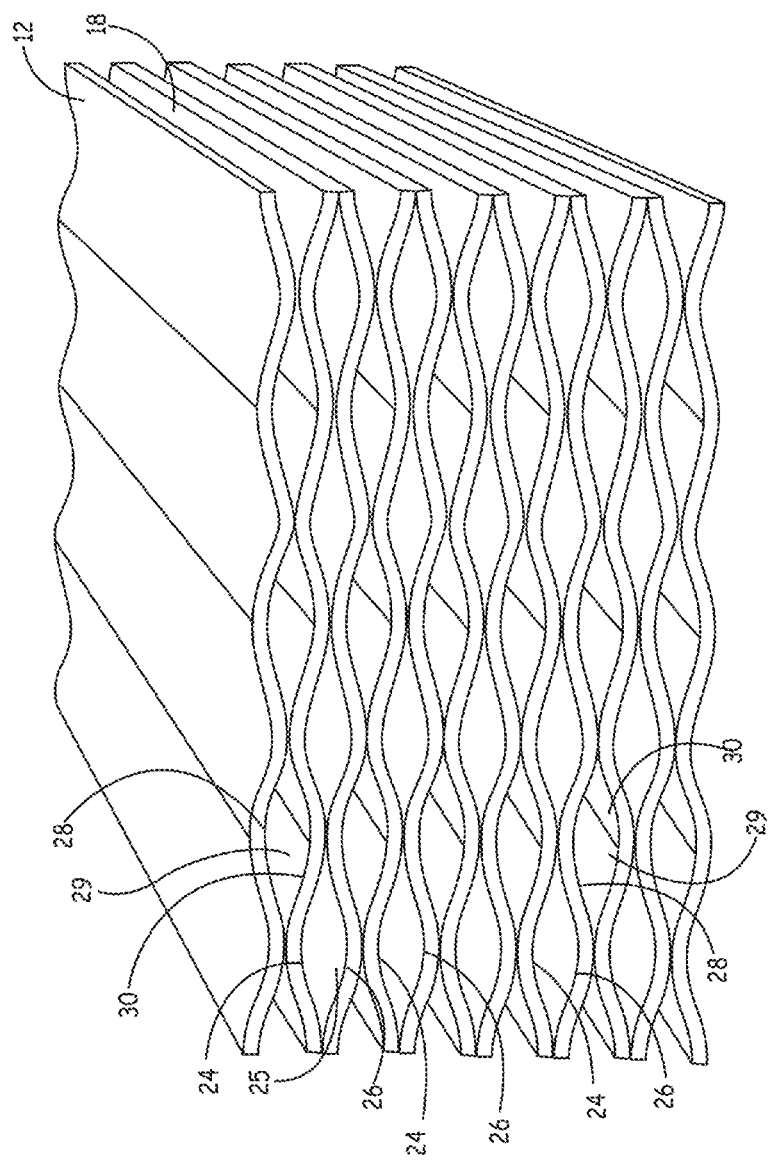
FIG. 2 is a partial, sectional, perspective view of a portion of the prior art pleated filtration media pack of FIG. 1.
Figure 3:
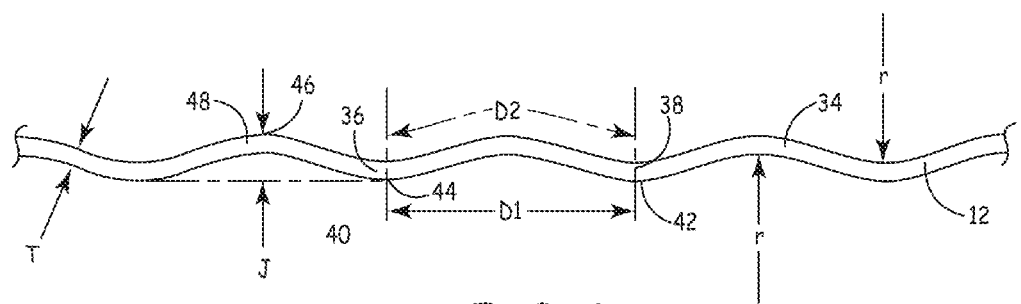
FIG. 3 is an enlarged, schematic, cross-sectional view of a portion of the prior art filtration media of the media pack of FIG. 1.

Referring to FIGS. 1-3, a generalized pleated filtration media pack according to the prior art is shown at reference number 10 of FIG. 1. The pleated filtration media pack 10 can be characterized as a pleated filtration media pack according to International Publication No. WO 2005/082484. The pleated filtration media pack 10 of FIG. 1 is provided as a three-dimension network 11 resulting from pleating the media 12 (see FIG. 2) to provide a first series of folds 14 forming a first face 15 and a second series of folds 16 forming a second face 17.

In general, the media is folded back upon itself (in a back and forth arrangement) to provide both the first series of folds 14 and the second series of folds 16. Extensions of media 18 are provided between the first series of folds 14 and the second series of folds 16. During use, the sides 20 and 22 can be sealed so that fluid flowing into one of the first face 15 or the second face 17 flows out the other of the first face 15 or the second face 17 or is otherwise filtered as a result of passing through the media before it leaves the filter element. The sides 21 and 23 (e.g., top and bottom) can also be sealed, if desired.

Although FIG. 1 shows the first face 15, the second face 17 looks similar to the first face 15 (except that media with asymmetric flute cross sectional areas will have distinct first and second faces 15, 17). In general, the first series of folds 14 and the second series of folds 16 can be referred to as pleat folds, and the first series of folds 14 and the second series of folds 16 can look about the same. Extending between the pleat folds 14 and 16 are extensions of media 18. Fluid flowing toward the first face 15 generally enters between opposed media surfaces 24 and 26. The area between the media surfaces 24 and 26 can be characterized as openings 25. The fluid then passes through the media 12 and exits out a downstream opening 29 between the media surfaces 28 and 30 (as shown in FIG. 2) and out the second face 17. The area between the media surfaces 28 and 30 can be referred to as the downstream opening 29.

The openings 25 and 29 are both shown in FIG. 2 which is an illustration of a portion of the pleated filtration media 12 without the pleat folds. It will be understood that FIGS. 1 to 3 shows generalized or stylized pleat folds 14, 16 without showing the actual shape of the pleat folds. Also, it will be understood that not all media surfaces 24, 26, 28, 30 are labeled, nor are all openings 25 and 29 labeled, but rather only examples of such surfaces and openings have been labeled.

It should be understood that the reference numbers 24 and 26 will correspond to one side of the media 12, such as the upstream side or the downstream side (wherein media surface 24 refers to the top surface, and media surface 26 refers to the bottom surface, as shown in FIG. 2). Similarly, reference numbers 28 and 30 refer to the other side of the media 12, such as the downstream side or the upstream side (wherein pleat surface or media surface 28 refers to the top surface, and media surface 30 refers to the bottom surface, as shown in FIG. 2). As the media 12 is pleated, one side of the media forms the upstream side and the other side of the media forms the downstream side. For example, reference numbers 24 and 26 might refer to the upstream side of the media, while reference numbers 28 and 30 refer to the downstream side of the media. Even though reference numbers 24 and 26 refer to different media surfaces, they are both either on the upstream or downstream side of the media. Similarly, even though reference numbers 28 and 30 refer to different media surfaces, they are both either on the upstream or downstream side of the media. While it is expected that most of the fluid flows between the media surfaces before being filtered, it is expected that some of the fluid may flow through the pleat folds.

Now referring further to FIG. 3, the media 12 is illustrated in a sectional view showing the raised area 34 delineating a repeating arc. In the context of the media 12, certain measurements can be taken to characterize repeating arcs 34. For example, the distance D1 defines the distance underneath a raised area defined by the repeating arcs 34. The distance D1 can be taken as the distance between the center points 36 and 38 of the media 12 of the same side arc peaks 40 and 42.

The distance D2 defines the media surface length for the raised area 34 over the same distance D1 between the center points 36 and 38 of the media 12 of the same side peaks 40 and 42. The distance J defines the height measured from the lowest point to the highest point of the media 12, and takes into account the thickness T of the media 12. The distance J is measured from the lowest point 44 of the peak 40 to the highest point 46 of an adjacent opposite side peak 48 perpendicular to the line defining D1.

The generalized pleated filtration media pack of FIGS. 1 to 3 can be characterized as having a symmetric media volume arrangement so that a volume on one side of the media pack is about the same as the volume on the other side of the media pack. This symmetric volume is typical of current production filter media. In general, a symmetric volume arrangement is illustrated in FIG. 2, wherein the cross-sectional area of the openings 25 are equal to the cross sectional area of the openings 29. As a result of a symmetric volume arrangement, one face of the media pack can look about the same as the other face of the media pack.

In order to enhance filter life, one technique is to increase the amount of filtration media in a pleated filtration media pack. In order to increase the amount of media in pleated media, one technique is to increase the number of pleats per given volume. As the number of pleats per given volume increases, the pleat sides come closer and closer to one another. Especially under the pressure of fluid flow, adjacent pleats tend to contact one another and thereby restrict fluid flow there between. This type of restriction decreases filter performance.

While the media 12 of FIGS. 1-3 provides for some separation of the media surfaces to allow fluid to enter and exit the pleated filtration media via the first face 15 and the second face 17, the media 12 suffers from masking as a result of the contact between the media surfaces 24 and 26 and/or the media surfaces 28 and 30. In general, masking is often characterized by the location in the media where there is proximity to another media sheet so that there is a resistance to flow through the media at that location. As a result, masked media is of limited usefulness for filtration, and masked media can be considered an effective loss of media. For the media 12 shown in FIG. 3, the peaks 40, 42, and 48 (for example) are relatively rounded, and as the media surfaces 24 and 26 and the media surfaces 28 and 30 touch, the areas of contact and those areas in sufficient proximity to the areas of contact tend to suffer from masking and do not contribute to media surface area available for filtration.

While the particular area subject to masking along a given flute may be relatively small, the total amount of masked media over an entire filter element can be substantial. It is possible to reduce the amount of masked media in a filter element while simultaneously modifying flute geometry to increase the amount of media available for filtration. By reducing masking, the performance or life of the filter element can be increased, or the size of the filter element can be reduced while maintaining the same performance or filter life. In general, enhancing the filter element life for a given filter element size or reducing the filter element size for a given filter element performance can be referred to as enhancing the filtration media performance.

Referring now to FIGS. 4a-c and 5a-d, various flute designs made in accordance with the invention are described, the flute designs provided to decrease masking and thereby enhance filtration media performance. In general, FIGS. 4a-c and 5a-d are schematic representations of example flute designs for filtration media that can be utilized to provide peaks configured to decrease masking.

By providing a relatively sharp peak, the area of contact between face sheets is reduced as a result of providing sharper potential contact points between media surfaces. It is expected that during filtration, the filtration media will deflect under pressure. By providing a relatively sharp peak, a smaller amount of media will mask as a result of deflection compared with less sharp peak during filtration.

Exemplary techniques for providing fluted media exhibiting relatively sharp peaks include bending, folding, or creasing the fluted media in a manner sufficient to provide a relatively sharp edge. The ability to provide a relatively sharp peak depends on a number of factors, including the composition of the media itself and the processing equipment used for providing the bend, fold, or crease. In general, the ability to provide a relatively sharp peak depends on the rupture strength and thickness of the media and whether the media contains fibers that stretch or resist tearing or cutting. It is desirable to avoid tearing, cutting, or otherwise damaging the filtration media during flute forming.

Figure 4C:
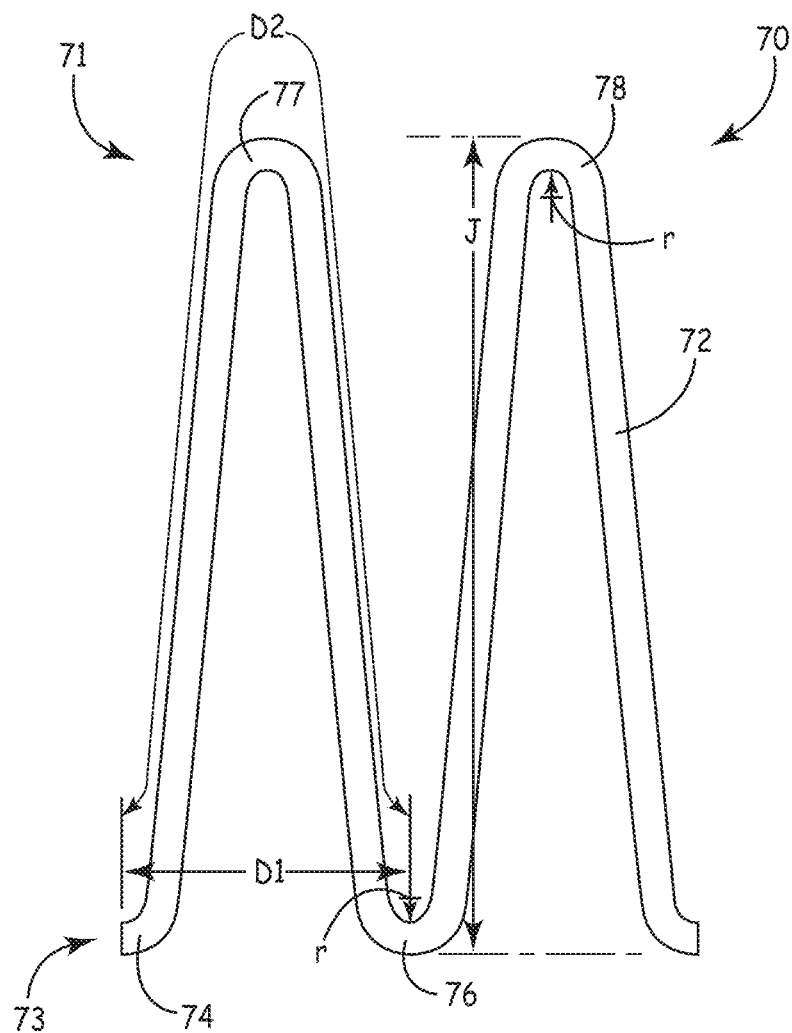

In FIGS. 4a-c exemplary cross-sectional views of fluted media 50, 60, and 70 are provided. The media 50, 60, and 70 include flutes 52, 62, and 72 that can be referred to as truss shaped. In general, D1 is the flute width. The flute width D1 for media 50 is characterized as the distance between the same side peaks 54 and 56. For the media 60, the flute width D1 is characterized as the distance between the same side peaks 64 and 66. For the media 70, the flute width D1 is the distance between same side peaks 74 and 76. The flute width D1 is measured from the center points across the thickness of the media 50, 60, and 70. The value D2 is the media length over the flute width measured from the same points as the value for D1.

The flute height J is measured as the elevation distance between the outer most points of adjacent peaks perpendicular to the line defining D1 for a given flute. For example, the flute height J for media 50 is measured from the outer most point of the peak 56 to the outer most point of the peak 58. The flute height J for media 60 is measured from the outer most point of the peak 66 to the outer most point peak 68. The flute height J for media 70 is measured from the outer most point of the peak 76 to the outer most point peak 78. For the media 50, the peaks 54, 56, 57, and 58 can be characterized as having a relatively sharp peak. Similarly, for media 60 and 70, the peaks 64, 66, 67, 68, 74, 76, 77, and 78 can be characterized as having a relatively sharp peak. While the opposing peaks for media 50, 60, and 70 can be characterized as being relatively sharp, it is not necessary for all the peaks to be relatively sharp to benefit from reduced masking. For example, reduced masking can be achieved by providing relatively sharp peaks on some or all flutes on only one side of the media.

For example, media 50 in FIG. 4a can be characterized as having a series of first peaks 51 and a series of opposite second peaks 53. The first peaks 51 or the second peak 53 can be relatively sharp to provide reduced masking benefits. Similarly, media 60 includes a first series of peaks 61 and second series of opposite peaks 63, and the media 70 includes a first series of peaks 71 and a second series of opposite peaks 73. In order to provide decreased masking, the media 60 and 70 can have a relatively sharp first set of peaks 61 and 71, at the second set of peaks 63 and 73, or at both. Preferably, reduced masking is achieved by providing a sharp peak at both the first set of peaks 51, 61, and 71 and the second set of peaks 53, 63, and 73.

Figure 5C:
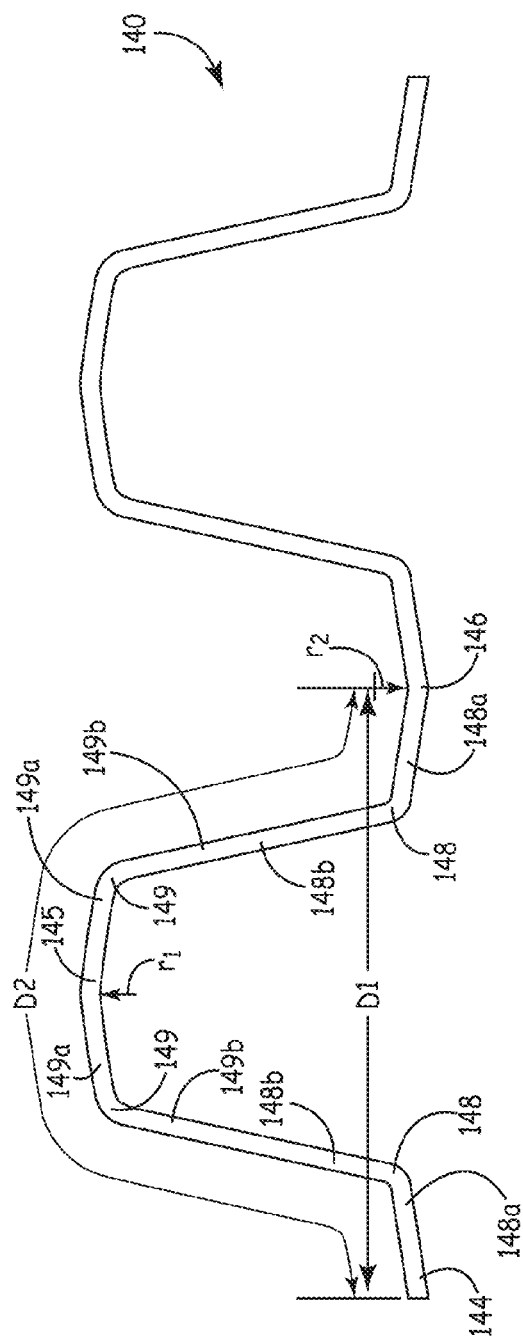

Now referring to FIGS. 5a-c, cross-sectional views of fluted media sheets 100, 120, and 140 are provided. It will be noted that FIGS. 5a-c are not intended to be scale drawings of all acceptable flute geometries, but rather merely show example implementations. In FIG. 5a, the flute width D1 is measured from the center point of the peak 102 to the center point of the peak 104. Alternatively, the flute width D1 can be measured from the center point of the peak 101 to the center point of the peak 103.

The fluted media 100 is shown having two ridges 108 for each flute width D1, or along the media length D2. The ridges 108 extend along at least a portion of the length of the flute. In general, each ridge 108 can be characterized as a general area where a relatively flatter portion of the fluted media 108a joins a relatively steeper portion of the fluted media 108b. The use of the term "ridge" is intended to characterize a portion of the media that is not considered a peak. That is, ridges can be provided between peaks, and ridges can be considered non-peaks. A ridge can be considered a line of intersection between differently sloped media portions. It is important to note that in some implementations the appearance of the ridge will be somewhat obscured by irregularities in the media itself. A ridge can be formed as a result of deformation of the media at that location. The media can be deformed at the ridge as a result of applying pressure to the media.

For the example fluted sheet 100, the relatively flatter portion of the fluted media 108a can be seen in FIG. 5a as the portion of the fluted media extending between the peak 101 and the ridge 108. The relatively steeper portion of the fluted media 108b can be characterized as that portion of the media extending from the peak 102 to the ridge 108. The ridge can be formed as a result of creasing, bending, folding, coining or otherwise manipulating the medial along a length of the fluted sheet during the formation of the fluted media. It may be desirable, but it is not necessary, during the step of forming the fluted media to take steps to set the ridge. For example, the ridge can be set by heat treatment or moisture treatment or a combination thereof. In addition, the ridge can exist as a result of creasing, bending, or folding without an additional step of setting the ridge.

The characterization of a ridge is not to be confused with the flute peaks. The characterization of a generally flatter portion 108a and a generally steeper portion 108b is intended as a way to characterize the presence of a ridge 108. In general, the flatter portion 108a and the steeper portion 108b may exhibit some curve. That is, it is expected that the flatter portion 108a and the steeper portion 108b will not be completely planar, particularly as fluids such as air or liquid flows through the media during filtration.

The presence of the ridge 108 of the media shown in FIG. 5a helps provide for reduced masking at the peaks 101 and 102. The ridge 108 exists as a result of the forming the fluted sheet 100 and, as a result, reduces the internal stress on the media at the peaks. Without the presence of the ridge 108, there would likely exist an increased level of internal tension in the fluted sheet 100 that would cause the fluted sheet to create a greater radius at the peaks. The presence of the ridge 108 helps increase the amount of media present between adjacent peaks (e.g., peaks 101 and 104) and helps sharpen the peaks 104 as a result of relieving, to a certain extent, the tension within the fluted sheet 100 that would cause it to expand or flatten out at the peaks in the absence of the ridge.

The presence of a ridge 108 can be detected by visual observation. While the presence of the ridge may not be particularly apparent from viewing the end of a flute, one can cut into the filter element and see the presence of a ridge extending along a length of a flute. Furthermore, the presence of a ridge can be confirmed by a technique where the filter element is loaded with dust, and the fluted sheet can be peeled away to reveal a cake of dust having a ridge corresponding to the ridge on the fluted media. The intersection of the two portions of the dust surface cake forms a ridge. In an example implementation, the dust that can be used to load the media to fill the flutes to provide a cake of dust within the flutes can be characterized as ISO Fine test dust.

Although the fluted sheet 100 can be provided having two ridges 108 along each length D2, the fluted sheet 100 can be provided having a single ridge along each period length D2, if desired, and can be provided having a configuration where some of the flutes exhibit at least one ridge, some flutes exhibit two ridges, and some flutes exhibit no ridge, or any combination thereof.

Referring again to FIG. 5a, the fluted sheet 100 includes two ridges 108 over the distance D2 where the distance D2 refers to the length of the fluted sheet 100 from the center point of the peak 102 to the center point of the peak 104, and wherein the ridges are not the peaks. Flute peaks 101 and 103 can be referred to as adjacent first side peaks, and the peaks 102 and 104 can be referred to as adjacent second side peaks. Of course, the characterization of certain peaks as first side peaks and other peaks as second side peaks is arbitrary, and can be reversed, if desired.

The peaks can simply be referred to as peaks, as same side peaks, as adjacent first side peaks, or as adjacent second side peaks. In general, the reference to "adjacent same side peaks" refers to peaks that can be used to define a period. The reference to "adjacent peaks" without the characterization of "same side" refers to peaks next to each other but facing in different directions. Adjacent peaks can be used to describe flute height. This characterization of the peaks is convenient for describing fluted media such as the media shown in the figures.

The fluted sheet can be characterized as having a repeating pattern of flutes when made by a process that repeats the flute pattern. A repeating pattern of flutes means that across the width of the media (e.g., in the transverse direction), the pattern of flutes repeats. For example, every flute may exhibit a ridge between adjacent peaks. There may be a pattern where every flute may exhibit two ridges between adjacent peaks. Furthermore, there may be a pattern where a ridge is present between adjacent peaks of some flutes but not between adjacent peaks of other flutes. For example, a period may exhibit a single ridge or two ridges, and a subsequent period may exhibit no ridge, a single, or two ridges, and a subsequent flute may exhibit no ridge, one ridge, or two ridge, etc. At some point, the pattern typically repeats itself. In some such periods there may be three or more ridges.

The characterization of the presence of a ridge should be understood to mean that the ridge is present along a length of the flute. In general, the ridge can be provided along the flute for a length sufficient to provide the resulting media with the desired performance. While the ridge may extend the entire length of the flute, it is possible that the ridge will not extend the entire length of the flute (100% of the flute length) as a result of, for example, influences at the ends of the flute such as pleating or folding.

Preferably, the ridge extends at least 10% of the flute length, more typically 25% of the flute length. By way of example, the ridge can extend at least 30% of the flute length, at least 40% of the flute length, at least 50% of the flute length, at least 60% of the flute length, or at least 80% of the flute length. Such ridges can extend in a continuous or discontinuous fashion along the length of the flutes. Also, the ridges can be uniformly distributed along flutes, or can be non-uniformly positioned along the length of the flutes. For example, in certain embodiments in may be desirable to have the flutes distributed such that they have more or fewer ridges near either the upstream or downstream face of a media pack.

There is no requirement, however, that a ridge or two ridges are present between every adjacent peak, or that there is a repeating pattern. Benefits of the invention can be obtained by providing flutes, wherein at least some of the flute exhibit at least one ridge between adjacent peaks. In some implementations, at least 25% of the flutes exhibit at least one ridge between adjacent peaks in order to achieve the benefits of the presence of the ridge. Even more preferably, at least 50% of the flutes, and more preferably 100% of the flutes, exhibit at least one ridge between each adjacent peak of the flute.

Referring to FIG. 5b, the fluted media 120 includes two ridges 128 and 129 between adjacent peaks 124 and 125. Along the length D2, the media 120 includes four ridges 128 and 129. A single period length of the media includes four ridges in the depicted embodiment. It should be understood that the ridges 128 and 129 are not the peaks 124, 125, or 126. The media 120 can be provided so that between adjacent peaks (e.g., peaks 125 and 126) there are two ridges 128 and 129. Again, a pattern can be provided. In the pattern shown in FIG. 5b, there are two ridges between each adjacent peak, and there are four ridges provided in each period. In an alternative repeating pattern, there may be any number (for example, 0, 1, 2, or more) ridges between adjacent peaks as long as the pattern includes the occurrence of at least one ridge between adjacent peaks somewhere in the pattern. In a desired embodiment shown in FIG. 5b, there are two ridges between each adjacent peak. The ridge 128 can be characterized as the area where a relatively flatter portion of the media 128a joins a relatively steeper portion of the fluted media 128b.

The ridge 129 can be provided as a result of the intersection of the relatively flatter portion of the fluted media 129a and the relatively steeper portion of the fluted media 129b. The relatively steeper portion of the fluted media 129b can be characterized as that portion of the fluted media extending between the ridge 129 and the peak 125 and can be characterized (for example) as having an angle between the ridge 129 and the peak 125. Peak 125 extends above the flatter portions of the fluted media 129a. Thus, the peak 125 shows a defined protrusion from the adjacent flute media 129a.

Now referring to FIG. 5c, the fluted media 140 includes at least two ridges 148 and 149 between the adjacent peaks 144 and 145. Along the length D2, the media 140 includes four ridges 148 and 149. A single period length of media can include four ridges. It should be understood that the ridges 148 and 149 are not the peaks 144, 145, and 146. The media 140 can be provided so that between adjacent peaks (e.g., peaks 144 and 145) there are two ridges 148 and 149. In addition, the fluted sheet 140 can be provided so that between other adjacent peaks, there is one ridge, two ridges, or no ridge.

There is no requirement that between each adjacent peak there are two ridges. There can be an absence of ridges between peaks if it is desirable to have the presence of ridges alternate or provided at intervals between adjacent peaks. In general, a pattern of flutes can be provided where the pattern of flutes repeats and includes the presence of ridges between adjacent peaks.

The ridges 148 and 149 can be characterized as the areas where a relatively flatter portion of the fluted sheet joins a relatively steeper portion of the fluted sheet. In the case of the ridge 148, a relatively flatter portion of the fluted sheet 148a joins a relatively steeper portion of the fluted sheet 148b. In the case of the ridge 149, a relatively flatter portion of the fluted sheet 149a joins a relatively steeper portion of the fluted sheet 149b. The fluted media 140 thus has sharp peak peaks 145 and 146.

The fluted sheets 110, 120, and 140 are shown as relatively symmetrical from peak to peak. That is, for the media 110, 120, and 140, the flutes repeat having the same number of ridges between adjacent peaks. Adjacent peaks refer to the peaks next to each other along a length of fluted media. For example, for the fluted media 110, peaks 101 and 102 are considered adjacent peaks, and peaks 102 and 104 can be considered adjacent same side peaks. A period of media, however, need not have the same number of ridges between adjacent peaks, and the media can be characterized as asymmetrical in this manner. That is, the media can be prepared having a ridge on one half of the period and not having a ridge on the other half of the period.

Another advantage to providing for the presence of the ridges (e.g., 108, 128, 129, 148 and 149) is that these ridges help reduce stress on the media to provide a sharper peaks. In general, without the ridges being formed, a greater amount of tension or memory in the media may cause the peaks to become wider, and thereby exhibit a greater level of masking. By introducing the ridges into the filtration media when fluting the filtration media, it becomes easier to create and help maintain relatively sharp peaks to reduce masking.

Another technique for reducing masking, or for providing pleated media with a relatively low level of masking, while maintaining filtration media area, is to decrease the potential number of contacts between the pleated faces for a given volume. In general, potential contacts refer to the potential contacts between flute peaks on one media surface and the corresponding flute peaks on an adjacent media surface. One technique for doing this is to increase or decrease the flute width height ratio. The flute open channel width height ratio is the ratio of the flute period length D1 to the flute height J. The flute width height ratio can be expressed by the following formula:

$$\text{flute width height ratio} = D1/J$$

Measured distances such as flute period length D1 and flute height J can be characterized as average values for the filtration media along the flute length excluding 20% of the flute length at each end (due to distortions in the flutes as a result of forming the pleat folds). Thus, the distances D1 and J can be measured away from the ends of the flutes because the ends of the flutes are typically deformed as a result of pleating. The flute width height ratio calculated at a pleat fold would likely not represent the flute width height ratio of the flute away from the pleat fold. Accordingly, the measure of flute width height ratio can be provided as an average value over the flute length with the exception of the last 20% of the flute length near the ends of the flutes. For "regular" media, such as, media having non-tapered flutes, it is expected that the flute period length D1 and the flute height J can be relatively constant along the flute length. By relatively constant, it is meant that the flute width height ratio can vary within about 10% over the length of the flute excluding the 20% length at each end where the pleat folds may affect the width height ratio.

In the case of a "non-regular" media, such as, media having tapered flutes, the flute width height ratio can vary or remain about the same over the length of the flute. Another example of non-regular media includes media wherein at least a portion of the flutes have a flute height (J) that changes over the flute length. An advantage of providing a flute wherein the flute height or flute width varies over the length of the flute is the ability to reduce potential contact between adjacent media surfaces and thereby reduce masking.

Now referring to FIGS. 4a-c, the media 50, 60, and 70 show various flute width height ratios. If considered as drawn to scale, the flute width height ratio of media 50 is about 2.5, the flute width height ratio of media 60 is about 5.8, and the flute width height ratio of media 70 is about 0.34. In general, preferred flutes exhibit a width height ratio of about 1 to about 8, preferably about 1.5 to about 7.5, and more preferably about 2 to about 5. In order to enhance the life of the media pack, a flute width height ratio of greater than 2, greater than about 2.5, or greater than 3 is desirable. In some implementations the flute width height ratio is greater than 4.

Another property similar to flute width height ratio that can provide a meaningful way to understand the flutes is "open channel width height ratio." In general, open channel width height ratio can be determined according to the formula:

$$\text{open channel width height ratio} = D1/C$$

In this formula, C is the open channel flute height which is the flute height (J) minus the media thickness (T). The open channel width height ratio is an advantageous property because it is not based upon the media thickness. In the case of the media 50, 60, and 70 of FIGS. 4a-c, the open channel width height ratios can be calculated as 2.82, 5.83, and 0.36, respectively. In the case of truss shaped flutes, it is often desirable for the flutes to exhibit an open channel width height ratio of greater than 2. In order to enhance media performance, it is generally desirable to provide open channel width height ratio greater than about 2.25, greater than about 2.5, greater than about 2.75, or greater than about 3. The open channel width height ratio is preferably less than about 10, less than about 9.5, less than about 9, less than about 8.5, less than about 8, less than about 7.5, or less than about 6. In example implementations the open channel width height ratio is from 2 to 7, is from 3 to 6, or from 4 to 5.

Figure 5D:
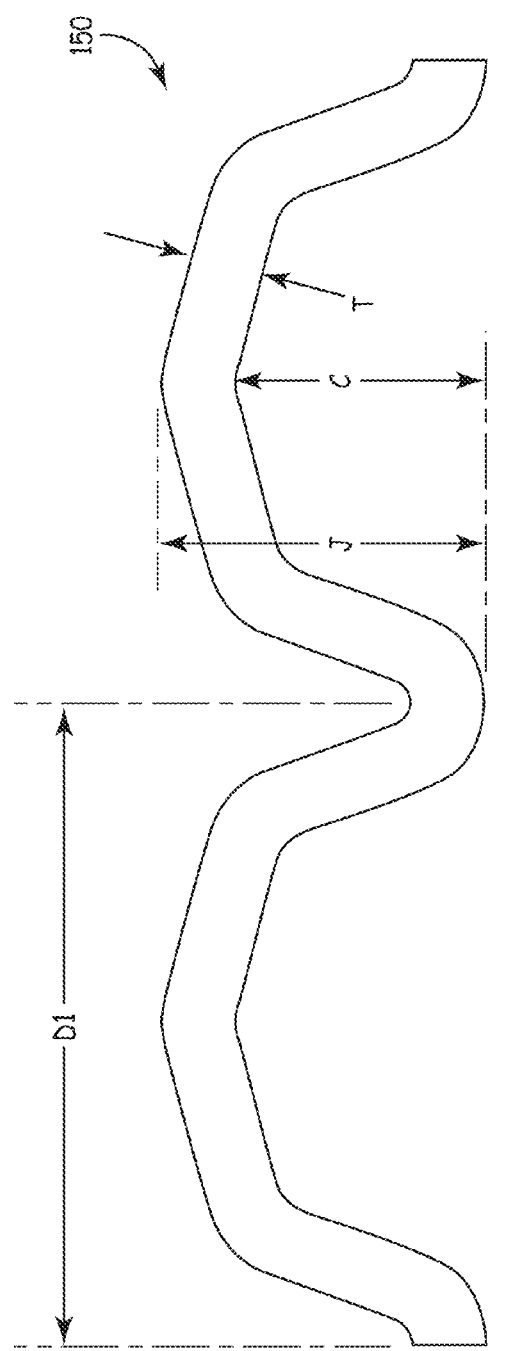

In order to show the effect that media thickness has on the width height ratio and the open channel width height ratio, attention is directed to FIG. 5*d*. For the media 150 shown in FIG. 5*d*, the width height ratio can be calculated to be 2.1, and the open channel width height ratio can be calculated to be 2.75.

While reducing masking is desirable in order to enhance filtration media performance, another technique to enhance filtration media performance is to increase the amount of media area available for filtration in a given volume. The media configurations shown in FIGS. 5*a-c* show techniques for enhancing the amount of media surface area present in a given volume. The media-cord percentage can help measure how a flute configuration can provide a filtration media pack with enhanced media surface area in a given volume. The media-cord percentage requires a measurement of the cord length (CL).

The relationship between the cord length CL and the media length D2 can be characterized as a media-cord percentage. The media-cord percentage can be determined according to the following formula:

$$\text{media-cord percentage} = \frac{((1/2\,D2) - CL) \times 100}{CL}$$

By providing a single ridge or multiple ridges between adjacent peaks of the fluted media, the distance D2 can be increased relative to prior art media. As a result of the presence of a ridge or a plurality of ridges, it is possible to provide filtration media having more media available for filtration compared with, for example, pleated media not having the ridges. The measurement of media-cord percentage can be used to characterize the amount of media provided between adjacent peaks. The length D2 is defined as the length of the fluted sheet 100, 120, and 140 for a period of the fluted sheet 100, 120, and 140. In the case of the fluted sheet 100, the distance D2 is the length of the fluted sheet from the peak 102 to the peak 104. This distance includes two ridges 108. In the case of the fluted sheet 120, the length D2 is the distance of the fluted sheet 120 from the peak 124 to the peak 126. This distance includes four ridges 128 and 129. In the case of the fluted sheet 140, the length D2 is the distance of the fluted sheet 140 from the peak 144 to the peak 146. This distance includes four ridges 148 and 149.

The existence of increased filtration media between adjacent peaks as a result of providing one or more ridges between adjacent peaks can be characterized by the media-cord percentage. By way of example, pleated media according to the prior art (e.g., the media shown in FIG. 1-3) typically exhibits a media-cord percentage of about 0.09% to about 0.89%. For the flutes made in accordance with the present invention, the media-cord percentage can be greater than about 1%, greater than about 1.5%, and greater than about 2%. In some implementations the media-cord percentage is greater than 3%, and optionally greater than 4%. The media cord percentage can exceed 5% in some implementations. The media-cord percentage is generally less than about 25%, more typically less than about 20%.

Another technique for increasing the amount of filtration media available for filtration includes increasing the flute density of the media pack. The flute density refers to the number of flutes per cross-sectional area of filtration media in a filtration media pack. The flute density depends on a number of factors including the flute height J, the flute period D1, and the media thickness T. The flute density can be referred to as a media pack flute density, and is determined at pleat count maximum (PCMax). PCMax is the maximum pleat count concentration at which the panel can be manufactured without deforming the flutes. In general, PCMax refers to the maximum number of pleats that can be placed in a given volume before performance suffers as a result of deformation of the flutes. This implies that in a panel configuration modeled, flute peaks on adjacent media faces will touch along substantially their entire length. For panel filters, PCMax pleat concentration is equal to 1/(2J). The equation for calculating the media pack flute density ($\rho$) for a filter element is:

$$\rho = \frac{1}{2} \frac{\text{number of flutes(open and closed)}}{\text{media pack cross sectional area}}$$

The flute density of a filter element can be calculated by counting the number of flutes including those flutes that are open and those flutes that are closed in a cross sectional area of the filter element, and dividing that by two times the cross sectional area of the filter element at the location where the number of flutes was determined. In general, for regular media it is expected that the flute density will remain relatively constant across the length of the filter element from the inlet face to the outlet face, or vice versa.

It should be understood that the media cross sectional area refers to the cross sectional area of the media and not necessarily to the cross sectional area of the filter element. The filter element may have a sheath or a seal intended to engage a housing that would provide the filter element with a cross-sectional area that is greater than the cross-sectional area of the media. Furthermore, the cross-sectional area of the media refers to the effective area of the media pack, and does not include portions of the media pack not useful for filtration (such as areas obscured by the seal).

In general, providing a media pack having increased flute density has a tendency to increase the surface area of media within a volume of the media and, therefore, has a tendency to increase the loading capacity of the filtration media. Accordingly, increasing the flute density of media can have the effect of enhancing the loading capacity of the media. However, increasing the flute density of media can have the effect of increasing the pressure drop through the media assuming other factors remain constant.

Increasing the flute density of filtration media can have the effect of decreasing the flute height (J) or the flute period length (D1), or both. As a result, the size of the flute (the size of the flute refers to cross sectional area of the flute) tends to decrease as flute density increases. As a result, smaller flute sizes can have the effect of increasing the pressure drop across the filtration media pack. The reference to a pressure drop across the media pack refers to the pressure differential determined at a first face of the media pack relative to the pressure measured at a second face of the media pack, wherein the first face and the second face are provided at generally opposite side of the media pack. The pressure drop across the media pack depends, in part, on the flute density and the flute length.

The ratio D2/D1 can also be relied upon for demonstrating the presence of more filtration media compared with, for example, pleated media according to FIGS. 1-3. In general, prior art pleated media according to FIGS. 1-3 can be considered to exhibit a D2/D1 ratio from 1.004 to 1.035. A media pack according to the invention can be provided having a D2/D1 ratio greater than 1.04. For a filtration media pack wherein the flutes are provided having a truss shape, the ratio of D2/D1 can be 1.05 to 1.35, and preferably 1.1 to 1.3. In some implementations the ratio of D2/D1 can be from 1.05 to 1.50.

Figure 6:
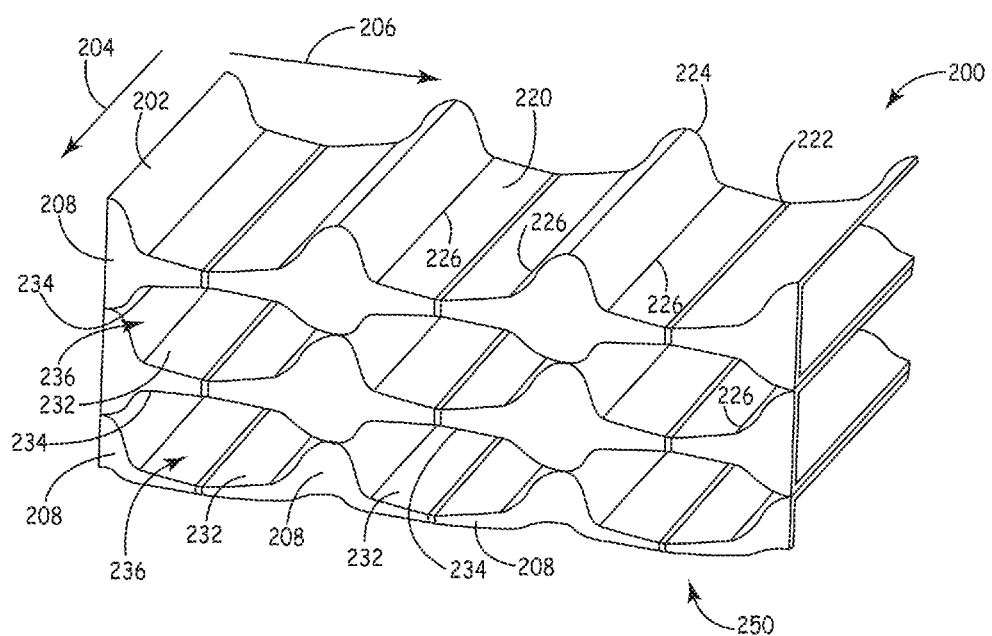
FIG. 6 is a perspective end view of a portion of a pleated filtration media pack according to the principles of the invention.
Figure 7:
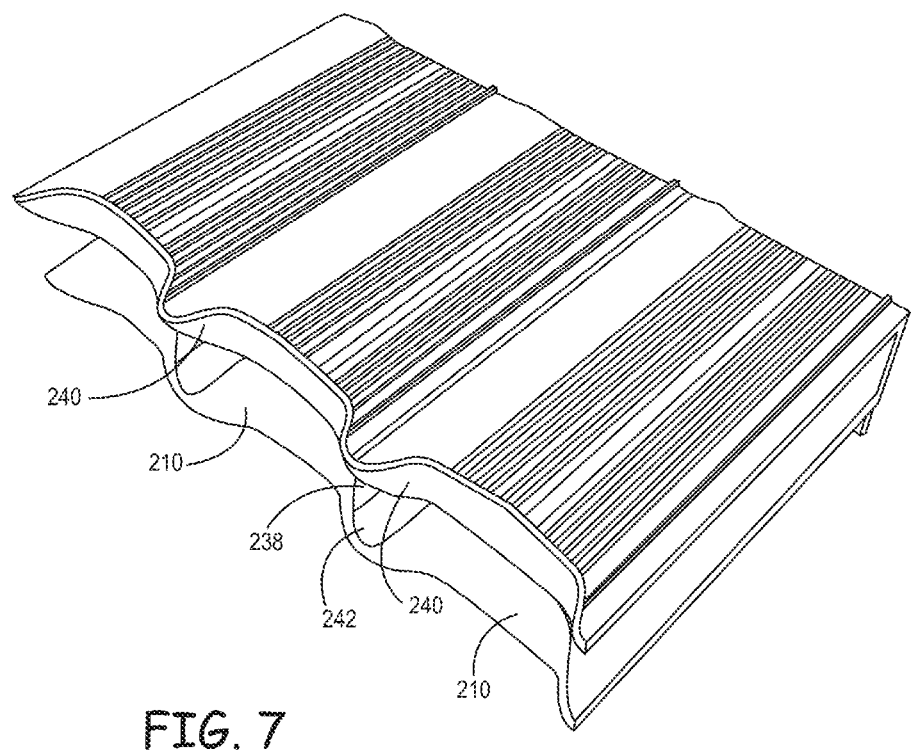
FIG. 7 is an opposite perspective view of a portion of the filtration media pack of FIG. 6.
Figure 8:
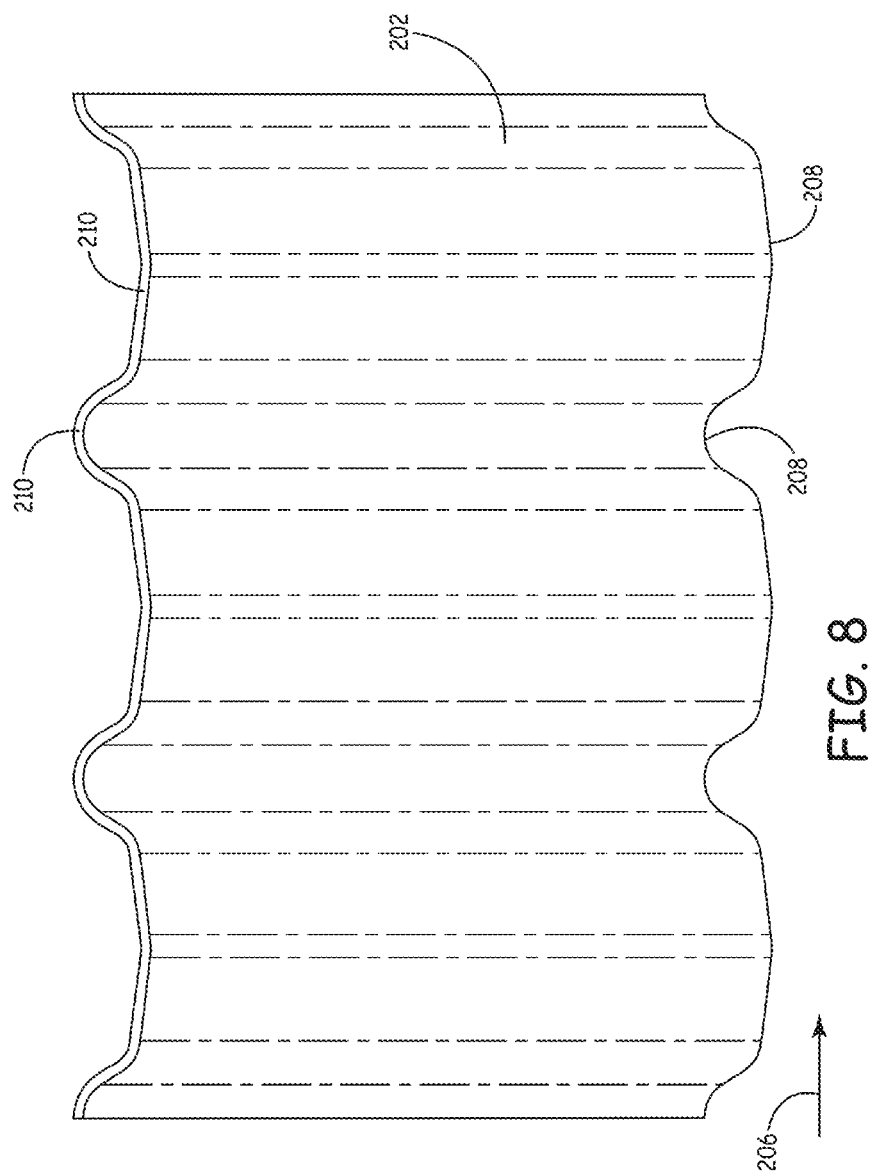
FIG. 8 is a top, plan sectional view of the filtration media pack of FIG. 7.

Now referring to FIGS. 6-8, a pleated filtration media pack where the media has the flute shape shown in FIG. 5a is shown at reference number 200. The pleated filtration media pack 200 includes media 202 having a machine direction 204 and a transverse direction 206. The media is folded to provide a first series of pleat folds 208 and a second series of pleat folds 210 (see FIG. 8), wherein the media 202 extends in a back and forth arrangement between the first set of pleat folds 208 and a second set of pleat folds 210. The media 202 includes flutes 220. The flutes 220 include a relatively sharp peaks 222 and 224. In addition, the flutes 220 include ridges 226 provided between adjacent peaks (e.g., peak 222 and 224).

The pleated filtration media pack 200 includes media surfaces 232 and 234 that form openings 236 there between, and media surfaces 238 and 240 that form openings 242 there between. The pleated filtration media pack 200 can be characterized as having a first face 250 that includes the first set of pleat folds 208 and the openings 236. In addition, the pleated filtration media pack 200 can be characterized as having a second face 252 that includes the second set of pleat folds 210 and the openings 242. Accordingly, air can flow into the pleated filtration media pack 200 via the openings 236 in the first face 250, pass through the media 202 to provide filtration, and then flow out of the pleated filtration media pack 200 via the openings 242 in the second face 252. In certain circumstances, it may be advantageous to have the fluid flow into the pleated filtration media pack via the second face 252 and out of the pleated filtration media pack 200 via the first face 250.

There are a number of advantages resulting from the pleated filtration media pack 200 compared with, for example, the pleated filtration media pack according to FIGS. 1-3. For example, the pleated filtration media pack 200 exhibits a desirable width height ratio that contributes to limiting the number of potential contacts between media surfaces. By limiting or reducing the number of potential contacts between media surfaces, there exists the ability to reduce masking and thereby provide for the presence of more media available for filtration in a given volume. Furthermore, the pleated filtration media pack 200 provides a flute shape consistent with the flute shape shown in FIG. 5a. That is, the flute shape provides for the presence of ridges 226. By providing for ridges 226, the flutes have relatively high media-cord percentages. By increasing the media-cord percentage, more media can be provided in a given volume compared with, for example, the pleated filtration media pack shown in FIGS. 1-3. Furthermore, by providing the pleated filtration media pack 200 with a flute shape consistent with the flute shape shown in FIG. 5a, the peaks (or at least a portion of the peaks) can be relatively sharp. As a result of the relatively sharp radius, masking caused by contact between media surfaces can be reduced. In addition, the pleated filtration media pack 200 provides for media volume asymmetry (also referred to as media asymmetric volume) and media cross-sectional area asymmetry.

It can be appreciated that the existence of media volume asymmetry or media area asymmetry represent a flute shape that deviates from the truss shape shown in FIGS. 4a-c and the prior art pleated media shown in FIGS. 1-3. The flute shapes shown in FIGS. 5a-c are exemplary flutes that can provide for media volume asymmetry and media area asymmetry.

Another advantage of the pleated filtration media pack 200 according to FIGS. 6-8 is that it can utilize media that can only handle a relatively small amount of strain because the pleat folds are formed to keep overall media length relatively constant and reduce strain. In general, media that can tolerate only a relatively small amount of strain includes media that has tendency to rupture when the strain is greater than as little as 3%, such as is often the case for media that has a high cellulose content and is cold and dry. Even wet, warm media will often have a tendency to rupture when the strain is greater than about 8% with some media, and about 10% in other media, or occasionally greater than about 12%. Thus, the flute designs of the present invention can be used, in some implementations, with media that has high cellulose content. In some embodiments the cellulose content is at, or near, 100%. In other implementations the cellulose content is greater than 90%, 80%, 70%, 60% or 50%.

As shown in FIG. 8, the machine direction distance between the first set of pleat folds 208 and the second set of pleat folds 210 is constant across the transverse direction 206. This allows for a pleat fold configuration that results in an overall strain on the media that is relatively small. Accordingly, the media that can be used in the filtration media pack can be characterized as media not capable of withstanding strain of greater than about 8% in some implementations, 10% in other implementations, or greater than about 12% in yet other implementations. However, it will be understood that media able to withstand high levels of strain can also be used with various implementations of the invention.

In general, media volume asymmetry refers to the volume asymmetry between an upstream side and a downstream side of a pleated filtration media pack wherein the volume asymmetry is calculated based upon the volume asymmetry caused by the media fluting arrangement rather than by the packing arrangement within a media pack. Media cross-sectional area asymmetry is calculated in a similar way except that it is based upon a cross-section of the media taken at a point along the length of a flute.

Figure 9:
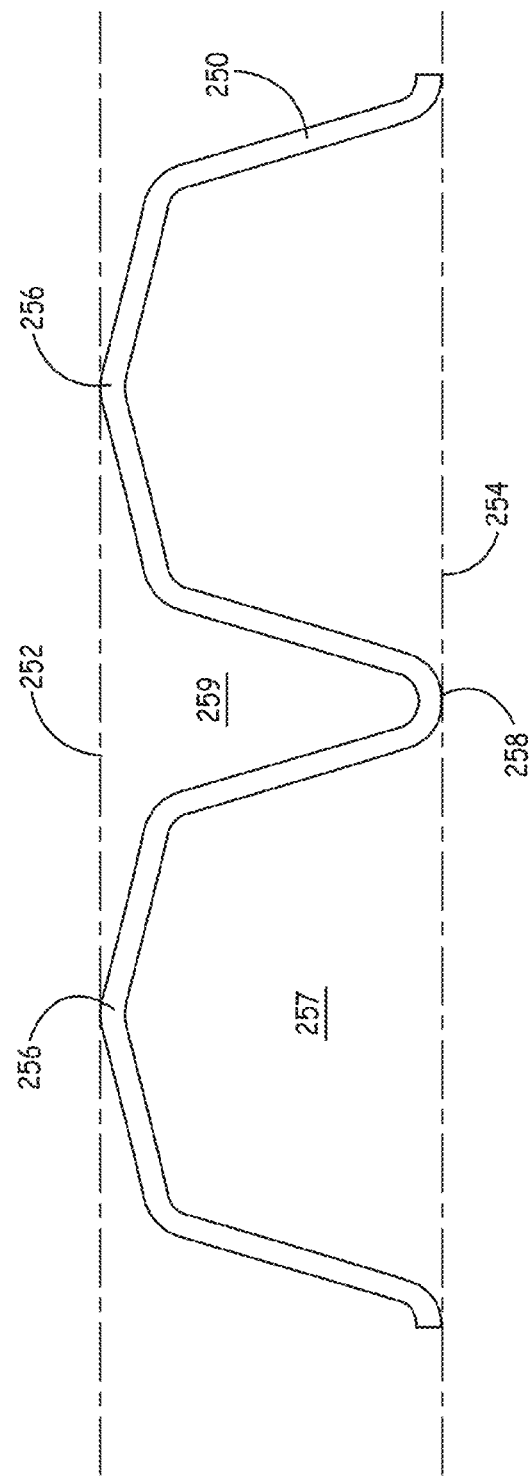
FIG. 9 is an enlarged, schematic, cross-sectional view of filtration media according to the principles of the invention.
Figure 10A:
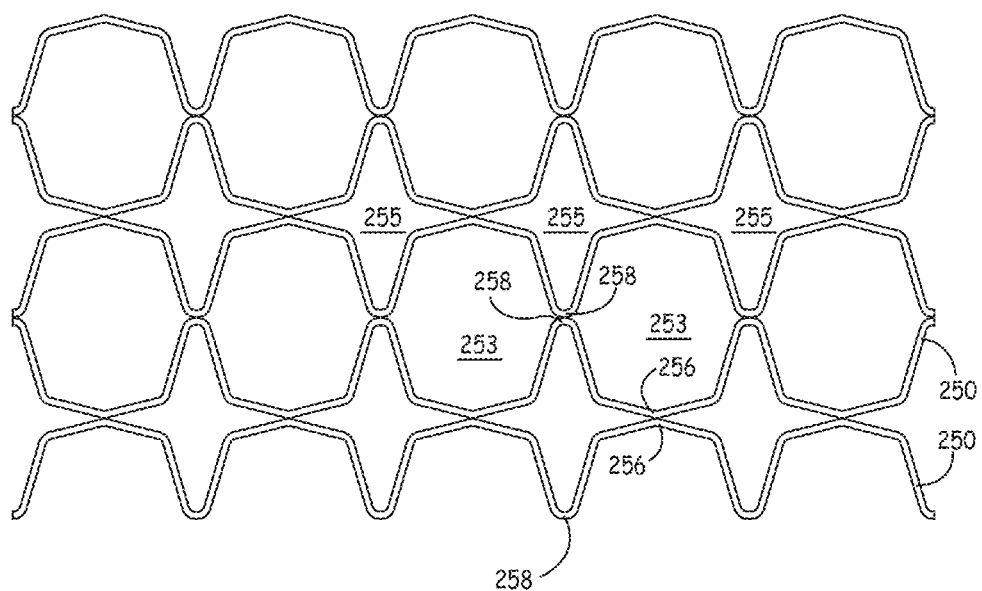
FIG. 10a is an enlarged, schematic, cross-sectional view of a portion of a filtration media pack containing filtration media according to FIG. 9.
Figure 10B:
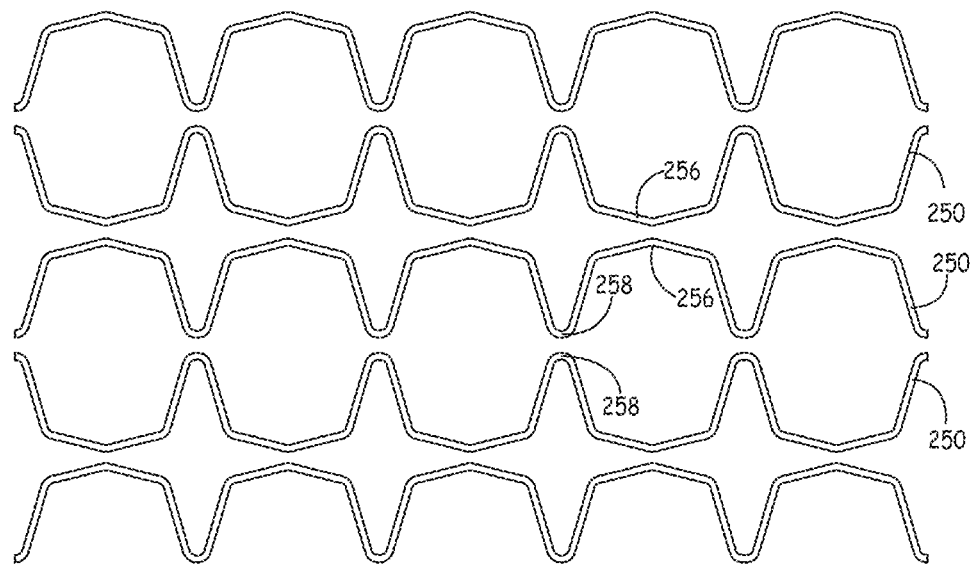
FIG. 10b is an enlarged, schematic, cross-sectional view of a portion of a filtration media pack containing filtration media according to FIG. 9.

In order to further understand what is meant by the phrase, "media volume asymmetry," reference is made to FIGS. 9-10b. In the case of FIG. 9, the media 250 is shown fluctuating between a first theoretical plane 252 and a second theoretical plane 254. The media volume asymmetry refers to the volume differential on one side of the media 250 compared with the other side of the media 250 between the theoretical planes 252 and 254 for the media pack. One way to characterize the theoretical planes 252 and 254 is to consider that the media 250 is pleated and sufficiently packed so that the peaks 256 and 258 contact opposing media surfaces as shown in FIG. 10a.

The media volume asymmetry is caused by the media fluting arrangement rather than by the packing arrangement within a media pack. An open cross-sectional area on one side of the media (FIG. 9, area 257) may be seen to be extending from one surface of the media, to a line defined by flute peaks on the same side of the media. This area is greater than an open cross-sectional area on the other side of the media (FIG. 9, area 259) bounded by the opposite surface of the media, and a line defined by opposing flute peaks. These cross-sectional areas define media cross-sectional area asymmetry for a given cross-section of media.

Extending cross-sectional area asymmetry from the upstream face to the downstream face of the pleat pack then characterizes upstream volumes and downstream volumes and in turn, media volume asymmetry. For a pleat pack, for cases where flute peaks do or do not extend from pleat fold to pleat fold, where the media between pleat folds shows little curvature and is substantially flat (where the centroids of sections of flutes in media between pleat folds substantially fall on a planar surface), the upstream media volume can be seen to be the volume enclosed by the upstream media surface, the contiguous surface at the pleat folds, and a convex hull formed over the flute peaks to center line of the pleat folds. The downstream media volume can be seen to be the volume enclosed by the downstream media surface, the contiguous surface at the pleat folds, and a convex hull formed over the flute peaks to center line of the pleat folds. Media volume ratio is the ratio of this upstream media volume to the downstream media volume.

The pleat packing arrangement shown in FIG. 10a can be characterized as pleat count maximum (PCMax) since it represents the largest number of pleats in a given volume wherein the flutes do not distort each other. In FIG. 10a, a sectional view of the media 250 is shown where the media 250 is pleated back and forth upon itself. Based upon this calculation of media volume asymmetry, the value of media volume asymmetry for the media arrangement shown in FIG. 10a is the same as the media volume asymmetry for the media arrangement shown in FIG. 10b. In FIG. 10b, the media 250 is pleated but the peaks 256 and 258 do not touch. Accordingly, the definition of media volume asymmetry takes into account the potential separation between media surfaces that may exist when a media is pleated and formed into a pleated filtration media pack.

The theoretical planes 252 and 254 are determined based upon a statistical maximum peak value. Aberrations are discarded from the calculation. For example, there may be an occasional peak that is either too high or too low and that does not significantly affect the packing density of the filtration media. Those peaks are not considered for purposes of calculating the theoretical planes 252 and 254. Furthermore, it should be understood that there may be occasions where peaks are skipped or formed at a height significantly below the average flute height in order to enhance volume asymmetry. In those cases, the reduced pleat height would not affect the packing density calculation. In general, the packing density refers to the number of pleats available in a given volume with just the peaks of media surfaces touching as shown in FIG. 10a.

An advantage of calculating a "media volume asymmetry" is that the volume of the media (the upstream volume and the downstream volume) can be calculated based upon the media and the results can be different than the actual upstream and downstream volume of a filter element. For example, the media can be arranged as a panel where the peaks essentially just touch each other. In that case, the upstream volume and downstream volume of a filter element should be consistent with the "media volume asymmetry" calculation.

Alternatively, however, the media can be arranged in a configuration where the peaks do not touch each other. For example, the media surfaces can be sufficiently separated from each other in a panel filter element, or can be separated from each other as is the typical case in a cylindrical filter element. In those cases, the volume asymmetry in the filter element is expected to be different from the "media volume asymmetry" calculation. Accordingly, the use of the "media volume asymmetry" calculation is a technique for normalizing the calculation of volume asymmetry (or volume symmetry) for a filtration media pack based upon the media itself and irrespective of how the media is arranged or packed in a filter element. Another calculation that can have value is the actual volume asymmetry in a filter element. The actual volume asymmetry for a filter element refers to the volume asymmetry resulting from a difference in volume between an upstream side of the element and a downstream side of the element. The arrangement of the media (e.g., panel or cylinder) can affect this value.

Media cross-sectional area asymmetry can also be calculated by examination of a filter element, but the cross-sectional area is desirably measured away from the pleat folds. Thus, for example, the media cross-sectional area can be taken along a flute length over a distance that excludes three times the flute height from the pleat fold. The reason that the media cross-sectional area asymmetry is calculated away from the pleat folds is to avoid the influence of the pleat folds on the media cross-sectional area asymmetry calculation. Furthermore, it should be understood that the media cross-sectional area asymmetry may vary along a flute length. This variation can be a result of a flute taper.

With regard to media cross-sectional area asymmetry, the cross-sectional area of media will typically demonstrate asymmetry on each side of the media. As shown in FIG. 10A, a cross section shows an asymmetry in cross sectional area 253 with cross sectional area 255.

The three dimensional structure of flutes defines an open volume for flow of fluid, as well as space for contaminants (such as dust) to accumulate. In some embodiments the filtration media exhibits a media volume asymmetry such that a volume on one side of the media is greater than a volume on the other side of the media. In general, media volume asymmetry refers to the volume asymmetry between an upstream side and a downstream side of pleated filtration media containing flutes. The media volume asymmetry is caused by the media fluting arrangement rather than by the packing arrangement within a media pack.

Figure 11A:
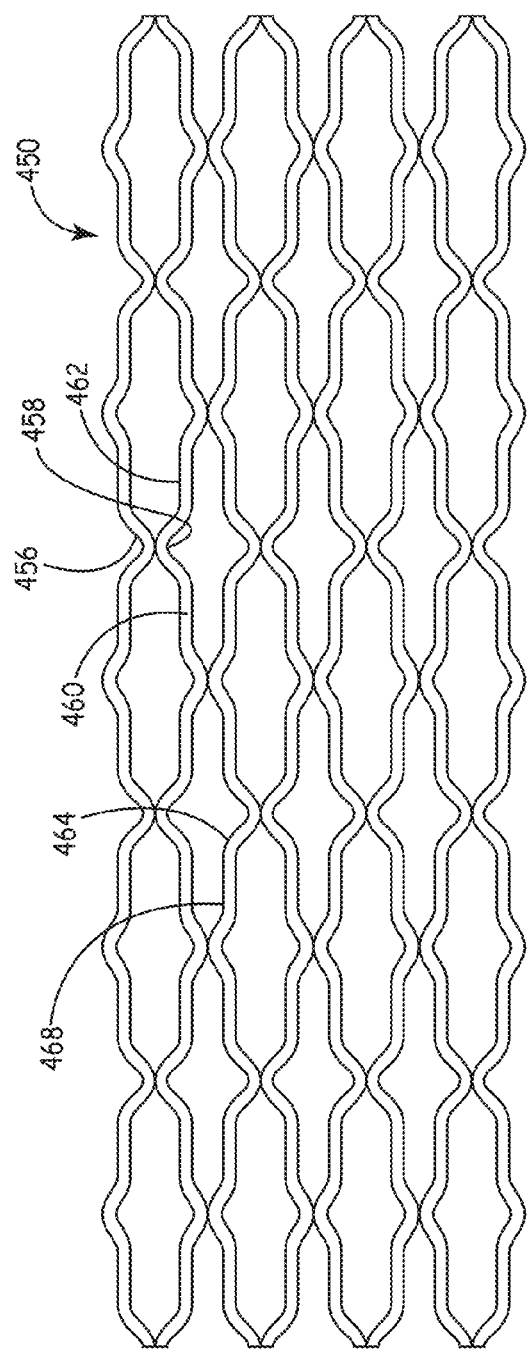
FIG. 11a is an enlarged, schematic cross-sectional view of a portion of a filtration media pack according to principles of the invention.
Figure 11B:
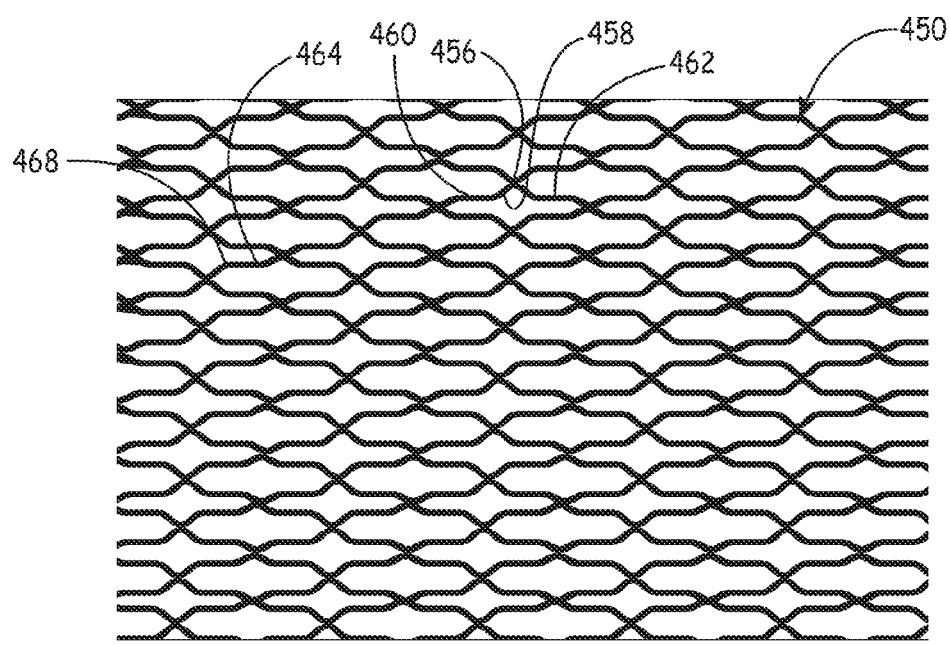
FIG. 11b is an enlarged scanned cross-sectional image of a portion of a filtration media pack manufactured according to principles of the invention.

Now referring to FIGS. 11A and 11B, a schematic cross-section view of a portion of a filtration media pack is shown in FIG. 11A, along with a scanned cross sectional image in FIG. 11B. In FIG. 11A, a cross-sectional view of the media 450 is shown where the media 450 is pleated back and forth upon itself. The peaks 456 and 458 touch in the depicted embodiment. Each peak 456, 458 extends from the adjacent portions of the flute 460, 462. In the depicted embodiment, each flute contains ridges 464, 468. It will be observed in FIG. 11B that the peaks 456 and 458 comprise tips that extend beyond the general profile of the surrounding flute. In the embodiment depicted, the general profile of the flute is characterized by the portions 460, 462, with the peak 462 projecting upward from that general profile. It will be observed, for example, that the prior art media of FIGS. 1 to 3 does not have peaks that project above the adjacent media in the manner depicted in (for example, and without limitation) FIGS. 5B, 11A, and 11B.

A cross sectional scanned photograph of media constructed in accordance with the invention is shown in FIG. 11B, and it also shows a cross-sectional view of the media 450 pleated back and forth upon itself. The peaks 456 and 458 touch in the depicted embodiment. In the depicted embodiment, each flute contains ridges 464, 468. It will be observed from FIG. 11B that a media pack can show variability without deviating from the scope of the invention. Thus, the media pack of FIG. 11B shows an actual implementation of the media pack drawn in FIG. 11A.

Figure 12:
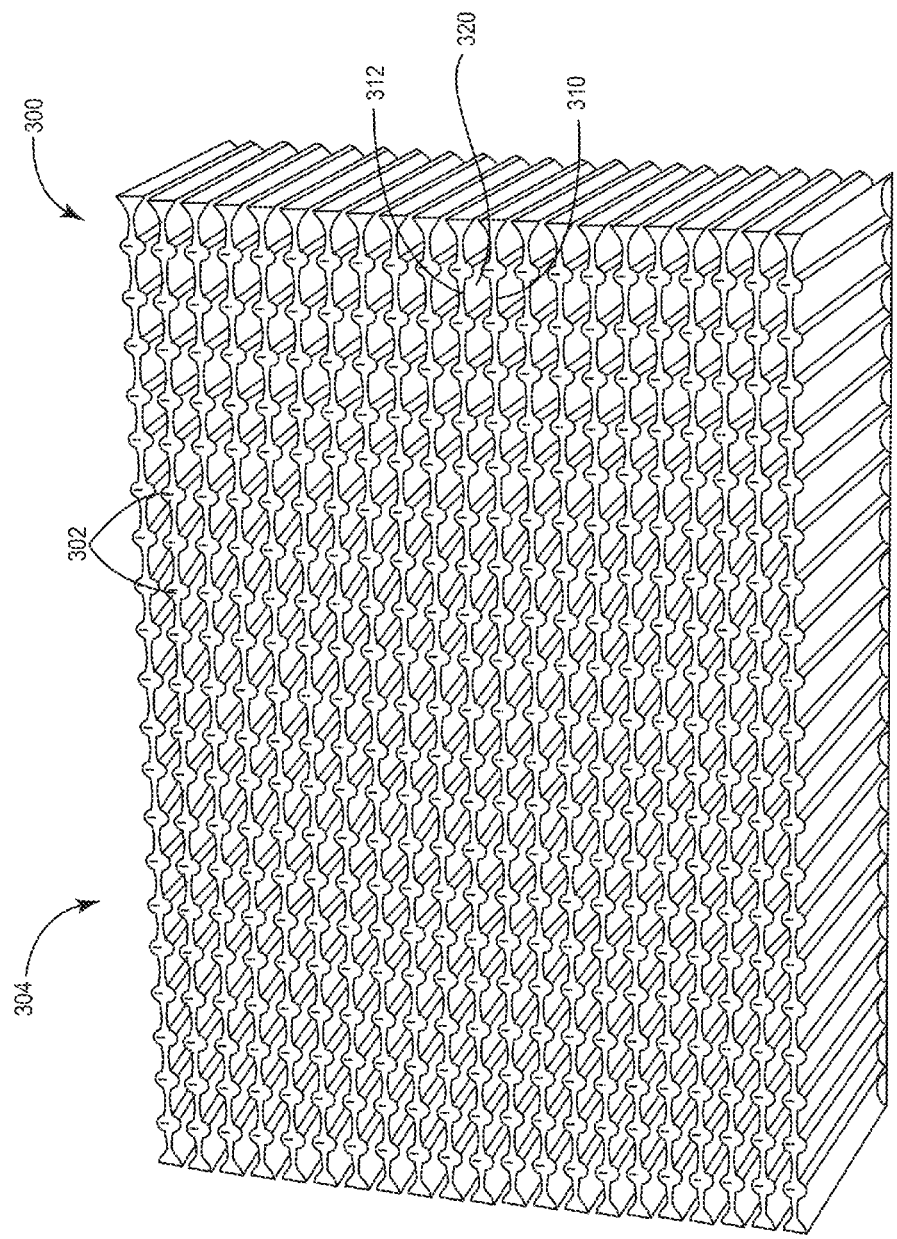
FIG. 12 is a perspective view of a first face of a pleated, panel filtration media pack according to the principles of the invention.
Figure 13:
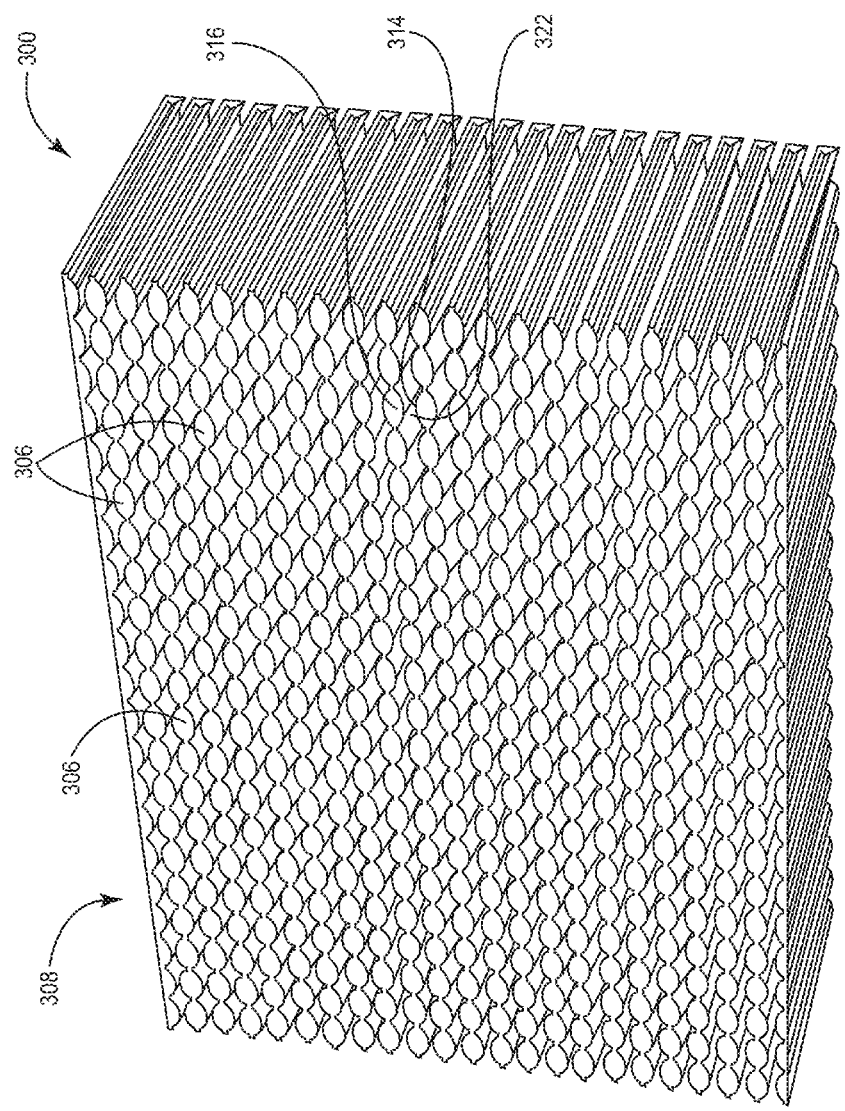
FIG. 13 is a perspective view of a second face of the pleated, panel filtration media pack of FIG. 12.
Figure 14:
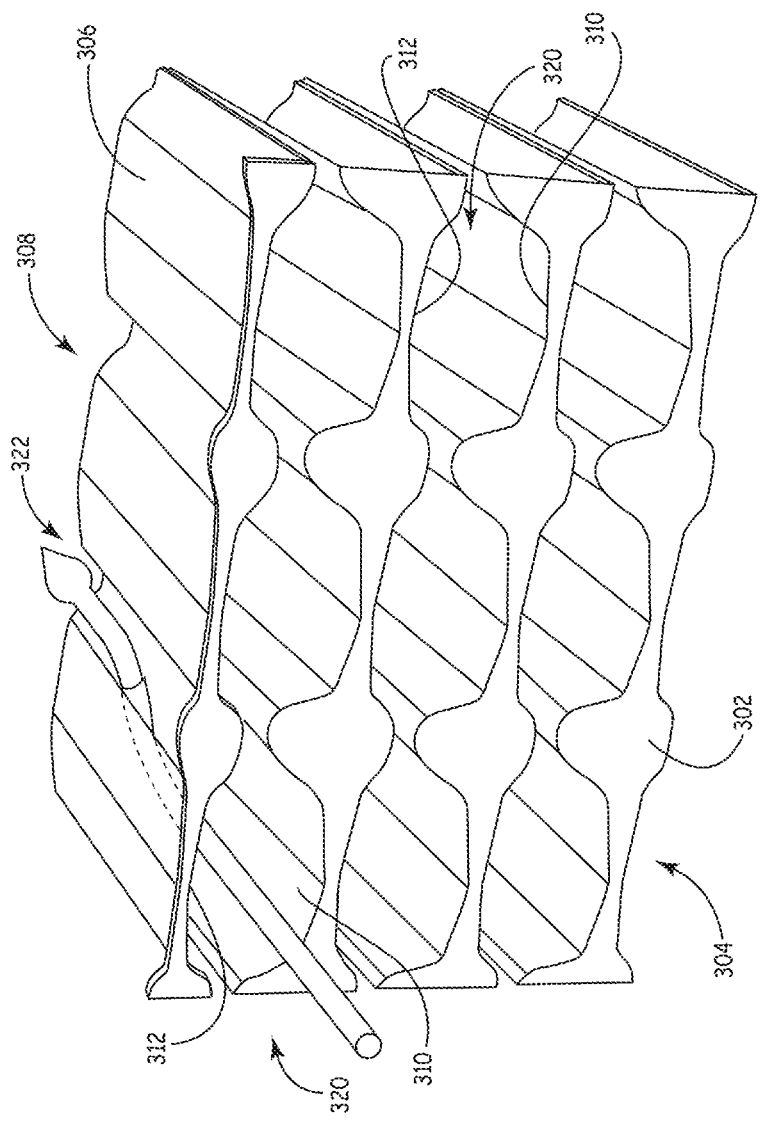
FIG. 14 is a perspective view of a portion of the filtration media pack of FIG. 12 showing the flow of fluid through the filtration media pack.

Now referring to FIGS. 12-14, a filtration media pack is shown at reference number 300. The filtration media pack includes pleat folds 302 that form a first face 304 (see FIG. 12), and pleat folds 306 that form a second face 308 (see FIG. 13). The media surfaces 310 and 312 are separated from each other so that they do not touch, and the media surfaces 314 and 316 are separated from each other so they do not touch. Openings 320 are provided between media surfaces 310 and 312, and openings 322 are provided between media surfaces 314 and 316. As shown in FIG. 14, fluid flow through an opening 320 in the first face 304 passes through the media to provide filtration of the fluid and then exists through another opening 322 in the second face 308.

A filter element or filter cartridge can be provided as a serviceable filter element. The term "serviceable" in this context is meant to refer to a filter element containing filtration media where the filter element can be periodically removed and replaced from a corresponding air cleaner. An air cleaner that includes a serviceable filter element or filter cartridge is constructed to provide for the removal and replacement of the filter element or filter cartridge. In general, the air cleaner can include a housing and an access cover wherein the access cover provides for the removal of a spent filter element and the insertion of a new or cleaned (reconditioned) filter element.

A pleated filtration media pack formed into a panel can be referred to as a "straight through flow configuration" or by variants thereof when the faces on the pleated filtration media are parallel. For example, a filter element provided in the form of a panel generally can have an inlet flow face and an exit flow face, with flow entering and exiting the filter element in generally the same straight through direction. In some instances, each of faces can be generally flat or planar, with the two parallel to one another. However, variations from this, for example non-planar faces, are possible in some applications.

Alternatively, the inlet and outlet flow faces can be provided at an angle relative to each other so that the faces are not parallel. In addition, a filter element can include a filtration media pack having a non-planar face, and a non-planar face can be considered non-parallel to another face. An exemplary non-planar face for a filtration media pack includes a face that forms the interior surface or the exterior surface of a filtration media pack formed in a cylindrical arrangement or in a conical arrangement. Another exemplary non-planar face for a filtration media pack includes a filtration media pack wherein the media surfaces have an inconsistent or irregular pleat depth (e.g., the pleat depth of one pleat is different from the pleat depth of another pleat). The inlet flow face (sometimes referred to as "end") can be referred to as either the first face or the second face, and the outlet flow face (sometimes referred to as "end") can be referred to as the other of the first face or the second face.

A straight through flow configuration found in filter elements containing pleated filtration media formed into a panel is, for example, in contrast to cylindrical filter elements containing pleated filtration media arranged in a cylindrical configuration of the type shown in U.S. Pat. No. 6,039,778, in which the flow generally makes a substantial turn as its passes through the filter element. That is, in a filter element according to U.S. Pat. No. 6,039,778, the flow enters the cylindrical filter cartridge through a cylindrical side, and then turns to exit through a cylindrical filter end in a forward-flow system. In a reverse-flow system, the flow enters the cylindrical filter cartridge through an end and then turns to exit through a side of the cylindrical filter cartridge. An example of such a reverse-flow system is shown in U.S. Pat. No. 5,613,992. Another type of filter element containing pleated filtration media can be referred to as a conical filter element because the filtration media pack is arranged in a conical form.

Figure 15A:
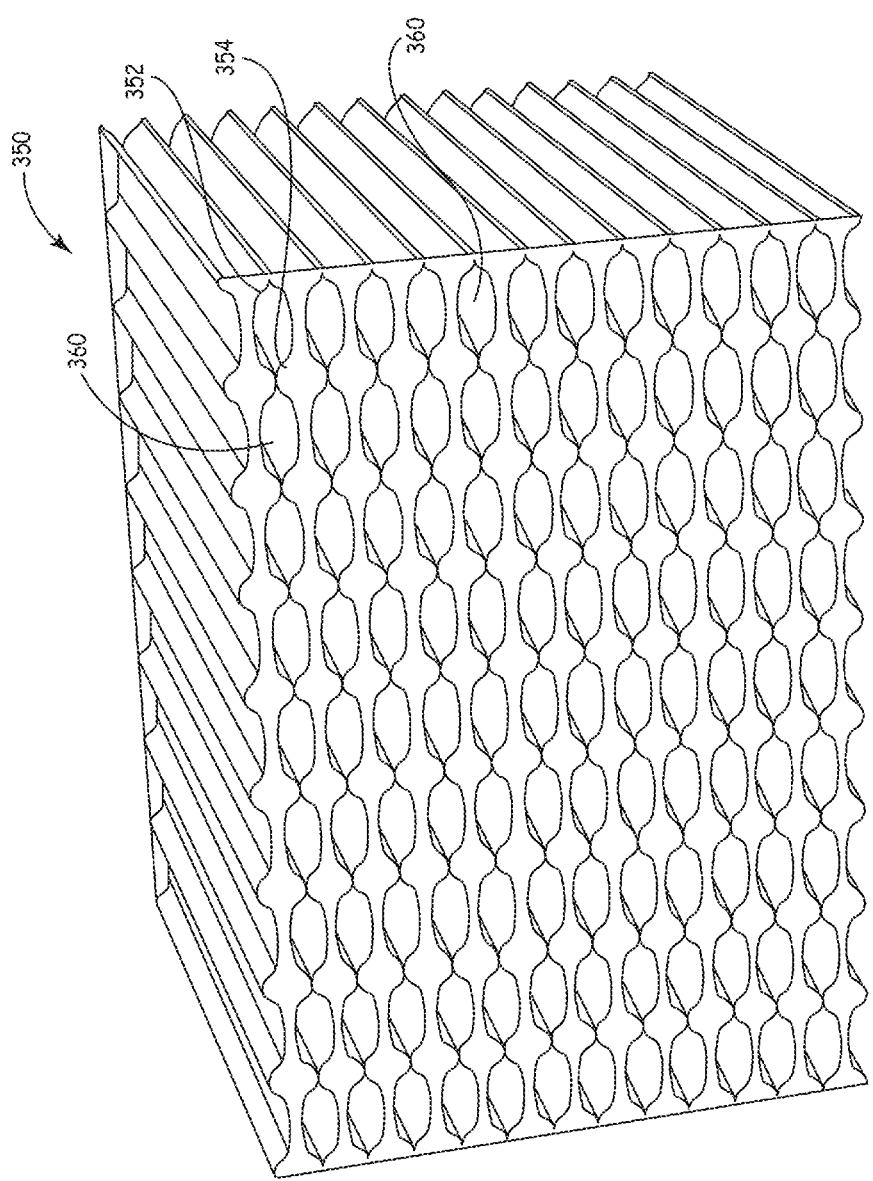
FIG. 15A is a perspective view of a first face of pleated, panel filtration media pack according to the principles of the invention.

Now referring to FIGS. 15a and 15b, a pleated filtration media pack is shown at reference number 350 wherein the media surfaces 352 and 354 are touching, and media surfaces 356 and 358 are touching. It will be noted that the pleat folds of the filtration media pack 350 are depicted in a generalized manner without showing the actual structure of the folds. More detailed depictions of the actual structure of the pleat folds is shown (by way of example), in such places as FIG. 14.

In general, the pleated filtration media pack 350 of FIG. 15a is shown in an example form where the pleat density is at a theoretical maximum (PCMax) where the peaks of the flutes on opposing pleats touch along their entire depth. This maximizes the number of pleats in a given volume and thereby maximizes the amount of media in a given volume. As illustrated in FIGS. 15a and 15b, the media surfaces 352 and 354 show openings 360, and media surfaces 356 and 358 show openings 362 that illustrate both a media volume asymmetry and a media cross-sectional area asymmetry. An advantage to providing volume asymmetry is that the greater volume can be provided as the dirty side volume or as the clean side, as desired. When the greater volume is provided on the dirty side, the filter element can have a longer life when provided as a panel filter. The media on the dirty side volume or the upstream side is generally the portion of the media that becomes caked with particulates. By increasing the volume on the upstream side, such as by creating volume asymmetry, it is possible to enhance media pack performance by increasing life.

As noted above, flute peaks are typically characterized by a sharp radius or a defined tip that reduces masking between pleats. While it will be understood that flute peaks will have some variation in shape, and not necessarily form a perfect arc, it is still possible in some implementations to identify and measure a distance that corresponds substantially to a radius. This radius (local effective inner radius), which can be measured in accordance with the disclosure provided below, will generally be less than 4 millimeters, more often be less than 2 millimeters, frequently be less than 1 millimeter, and optionally less than 0.5 mm. Larger radii can be suitable for large flutes. It will further be understood that flutes that fail to have a distinct or measurable radius still fall within the scope of the disclosure when they contain other characteristics described herein, such as the presence of ridges, media asymmetric volumes, etc.

Example radius r of a prior art media is shown in FIG. 3. With regard to the present invention, radius r is shown in FIGS. 4a, 4b, 4c, 5a, 5b, and 5c for various alternate embodiments. Referring specifically to FIG. 5c, the fluted media 140 can be provided having a radius $r_1$ at the peak 145 that can be considered a relatively sharp radius, and can be provided with a radius $r_2$ at the peak 146 that can be considered a relatively sharp radius. The radius $r_1$ and the radius $r_2$ can be the same or different. Furthermore, the benefits of reduced masking can be achieved by providing only one of $r_1$ or $r_2$ with a relatively sharp radius.

Figure 16A:
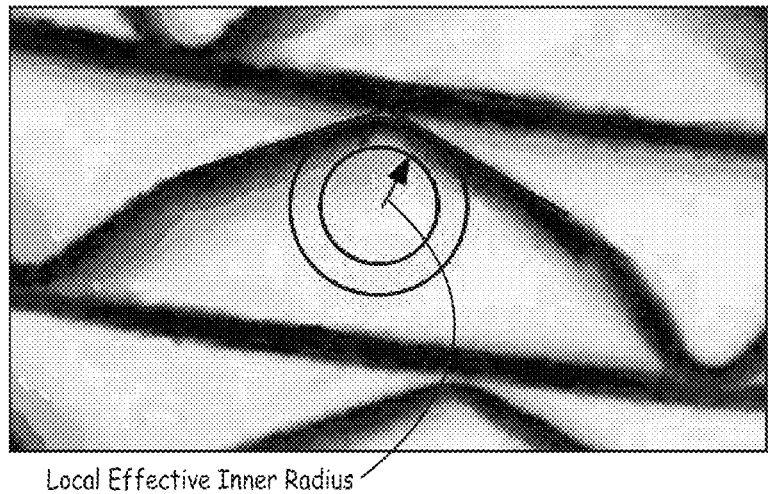
FIG. 16a is an enlarged scanned cross-sectional image of a flute according to principles of the invention, showing a method to measure the effective inner radius of a flute.
Figure 16B:
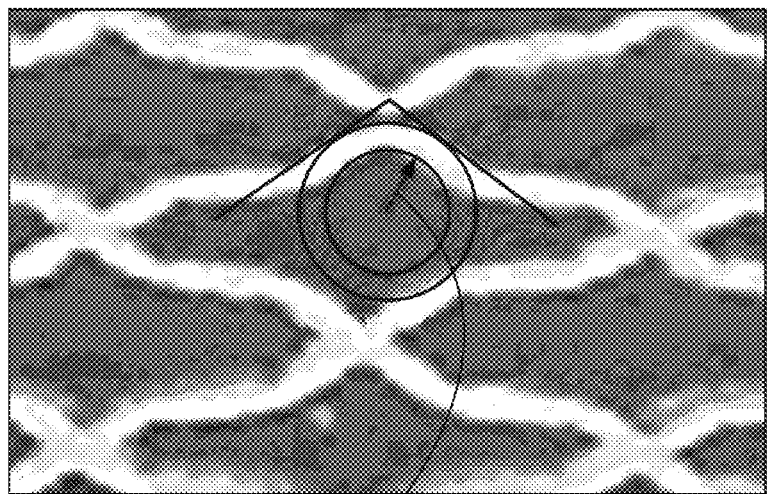
FIG. 16b is an enlarged scanned cross-sectional image of a portion of a filtration media pack according to principles of the invention, showing a method to measure the effective inner radius of a flute.

FIGS. 16a and 16b show examples of radii determined on actual filter media. Radius can be measured, for example, by a methodology that uses a measure called the local effective inner radius. Local effective inner radius is defined as the minimum outer radius of curvature at a given flute tip, peak, or ridge, minus the average media thickness of the flute. The minimum outer radius of curvature is the smallest radius of curvature of an osculating circle fitting the curve formed by following the outermost surface of a cross section of a given flute tip, peak, or ridge. For reference, the osculating circle of a sufficiently smooth plane curve at a given point on the curve is the circle whose center lies on the inner normal line and whose curvature is the same as that of the given curve at that point. Graphical examples of measures of local effective inner radius are shown in FIGS. 16a and 16b.

In the alternative, a formula that can be used to describe an acceptable radius (for certain embodiments) is based on flute width (D1) and media thickness (T). An example formula that can be used to describe the radius at the peak that can be characterized as a relatively sharp radius is (D1−2T)/8 wherein the flute width D1 is greater than about 1 mm and less than about 4 cm, and the thickness (T) is greater than about 0.127 mm (0.005 inch) and less than one half of D1. Preferably, a relatively sharp radius has a radius of less than about (D1−2T)/16.

Figure 17:
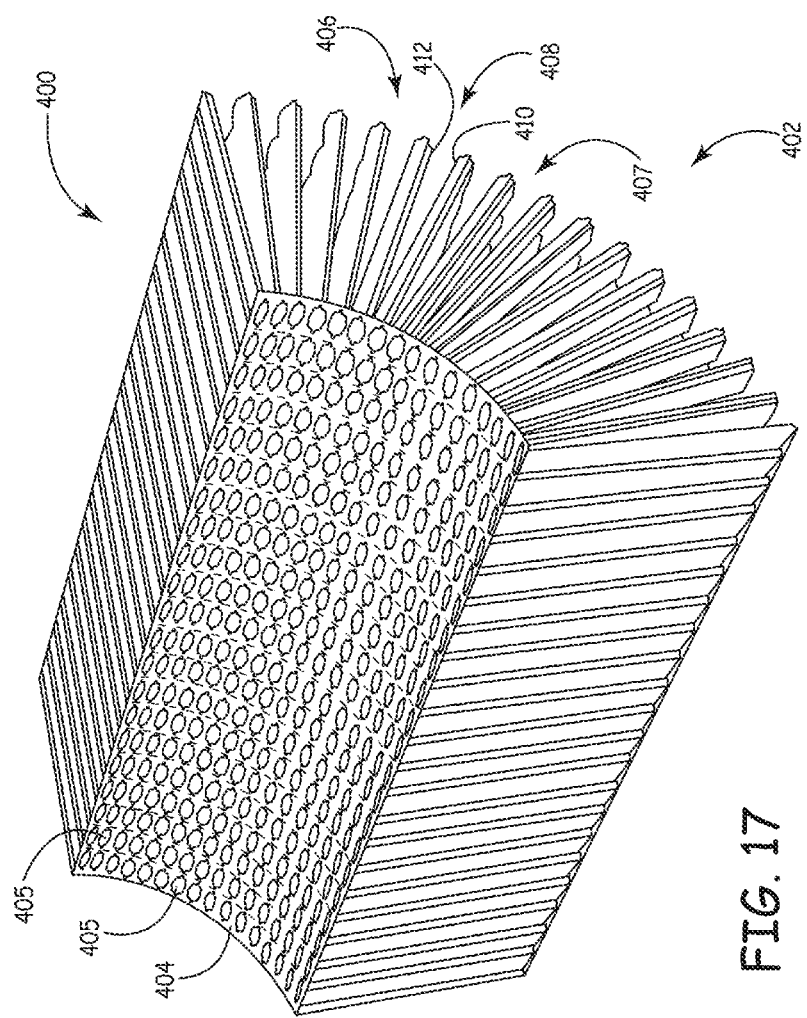
FIG. 17 is a perspective view of a portion of a cylindrical filtration media pack according to the principles of the invention.
Figure 18:
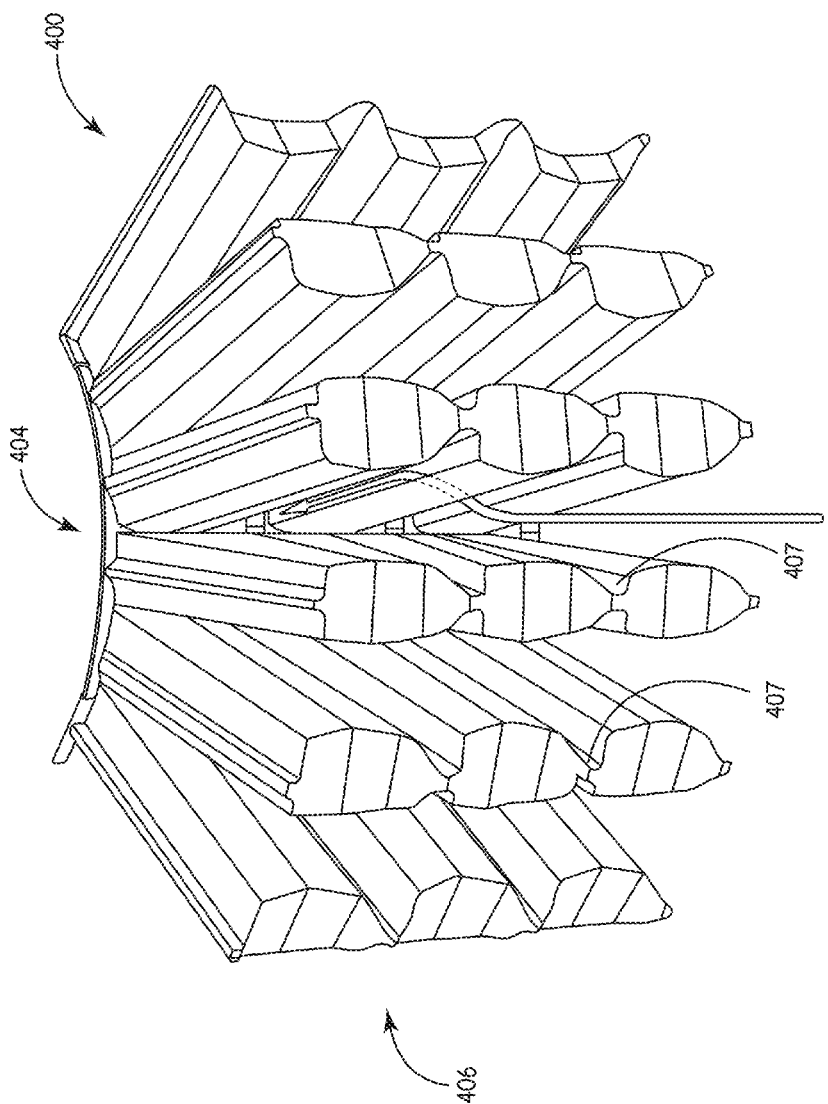
FIG. 18 is a perspective view of a portion of the cylindrical filtration media pack according to FIG. 17 and showing flow of fluid through the filtration media pack.

Now referring to FIGS. 17 and 18, a portion of a filtration media pack is shown at reference number 400 in a cylindrical arrangement 402. The filtration media pack includes a first face 404 and a second face 406. For the cylindrical arrangement 402, the first face 404 can be considered the inner surface of the cylindrical arrangement, and the second face 406 can be considered the outer surface of the cylindrical arrangement. The first face 404 can be provided having the relatively large openings 405 and the second face 406 can be provided having the relatively small openings 407. When the filtration media pack 402 is fanned, enhanced spacing is provided between the pleats at the second face 406. As a result, the arrangement shown in FIGS. 17 and 18 can be advantageous when dirty air flows into the filtration media pack via the second flow face 406 and exits the filtration media pack via the first flow face 404.

By fanning the filtration media pack, enhanced separation between the media surfaces and enhanced media area (as a result of a lack of masking) can be provided for receiving the dirty air, and a relatively large volume can be provided as the downstream or clean side volume so that the fluid can flow out of the filtration media pack with reduced restriction. As a result of the cylindrical arrangement 402, the relatively larger volume (calculated as media asymmetric volume) can be provided on the side open to the inner surface, and the relatively smaller volume can be provided on the side open to the outer surface Filtration Media The filtration media can be provided as a relatively flexible media, including a non-woven fibrous material containing cellulose fibers, synthetic fibers, glass fibers, or combinations thereof, often including a resin therein, and sometimes treated with additional materials. An example filtration media can be characterized as a cellulosic filtration media that can tolerate about up to twelve percent (12%) strain without tearing when wet and warm, but which will rupture at lower percent strain when dry and cold (as low as 3% with some media). The filtration media can be fluted into various fluted shapes or patterns without unacceptable media damage and can be pleated to form pleated filtration media. In addition, the filtration media is desirably of a nature such that it will maintain its fluted configuration, during use. While some filtration media is available that can tolerate greater than about twelve percent (12%) strain, and such media can be used according to the invention, that type of media is typically more expensive because of the need to incorporate relatively large amounts of synthetic fibers.

In the fluting process, an inelastic deformation is caused to the media. This prevents the media from returning to its original shape. However, once the forming displacements are released, the flutes will sometimes tend to spring partially back, recovering only a portion of the stretch and bending that has occurred. Also, the media can contain a resin. During the fluting process, the media can be heated to soften the resin. When the resin cools, it will help to maintain the fluted shapes.

The filtration media can be provided with a fine fiber material on one or both sides thereof, for example, in accord with U.S. Pat. Nos. 6,955,775, 6,673,136, and 7,270,693, incorporated herein by reference in their entirety. In general, fine fiber can be referred to as polymer fine fiber (microfiber and nanofiber) and can be provided on the media to improve filtration performance. As a result of the presence of fine fiber on the media, it can be possible to provide media having a reduced weight or thickness while obtaining desired filtration properties. Accordingly, the presence of fine fiber on media can provide enhanced filtration properties, provide for the use of thinner media, or both. Fiber characterized as fine fiber can have a diameter of about 0.001 micron to about 10 microns, about 0.005 micron to about 5 microns, or about 0.01 micron to about 0.5 micron. Exemplary materials that can be used to form the fine fibers include polyvinylidene chloride, polyvinyl alcohol polymers, polyurethane, and co-polymers comprising various nylons such as nylon 6, nylon 4,6, nylon 6,6, nylon 6,10, and co-polymers thereof, polyvinyl chloride, PVDC, polystyrene, polyacrylonitrile, PMMA, PVDF, polyamides, and mixtures thereof.

Several techniques can be relied upon for enhancing the performance of pleated filtration media. The technique can be applied to pleated filtration media used in panel filter arrangements and for pleated filtration media used in cylindrical or conical filter arrangements. Depending on whether the pleated filtration media is intended to be used in a panel filter arrangement or a cylindrical or conical filter arrangement, alternative preferences can be provided. In view of this disclosure, one would understand when certain preferences are more desirable for a panel filter arrangement and when certain preferences are more desirable for a cylindrical filter arrangement.

Accordingly, it should be understood that the identification of a preference is not intended to reflect a preference for both panel filter arrangements and cylindrical filter arrangements. Furthermore, it should be understood that the preferences may change as a result of whether the cylindrical filter arrangement is intended to be an arrangement that can be characterized as a forward flow arrangement (where dirty air flows into the filter media pack from the exterior cylindrical surface) or a reverse flow filtration media pack (where dirty flows into the filtration media pack from the inner surface of the filtration media pack).

Filter Elements

Figure 19:
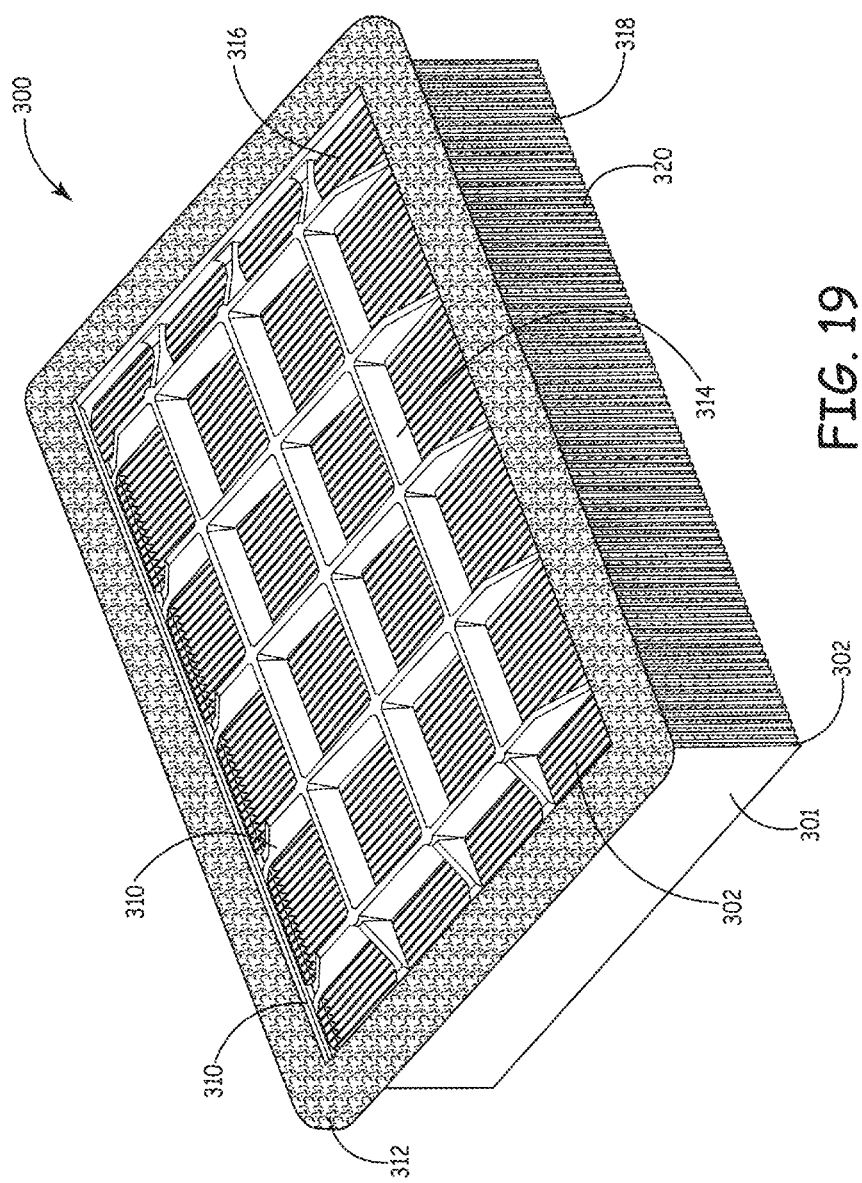
FIG. 19 is a schematic, perspective view of one type of a panel filter element.

The following filter elements are provided as examples constructed in accordance with the present invention, and are not intended to be all inclusive of element designs made in accordance with the teachings herein. Rather, one of skill in the art will appreciate that various alternative elements can be constructed while still within the scope of the disclosure and claims. In FIG. 19, a panel filter 300 is depicted. The panel filter 300 comprises media 301, pleated in a configuration comprising pleat folds 302. The panel 300 depicted includes a frame construction 310 having a seal arrangement 312 thereon. The seal arrangement 312 is generally configured to form a seal with a housing or other structure in which the panel filter 10 is positioned. The panel filter 300 also includes a support grid 314, across one surface of the panel filter arrangement 300.

While there are variations in panel filters from those shown in FIG. 19, in general the features are analogous, comprising: a plurality of parallel pleats; a seal arrangement secured within the panel filter; and, a rectangular configuration with one set of pleat folds 316 in a plane and the second set of pleat folds 318 in a separate plane. (Ends or opposite edges 320 of the pleats can be closed by sealant, or by being encased in a mold or frame, if desired.) Although not depicted in FIG. 19, flutes in the pleated media will often run substantially perpendicular to pleat folds 316 and 318 (although other non-perpendicular directions are also envisioned). Thus, the flutes can extend in a direction from pleat folds 316 to pleat folds 318.

Figure 20:
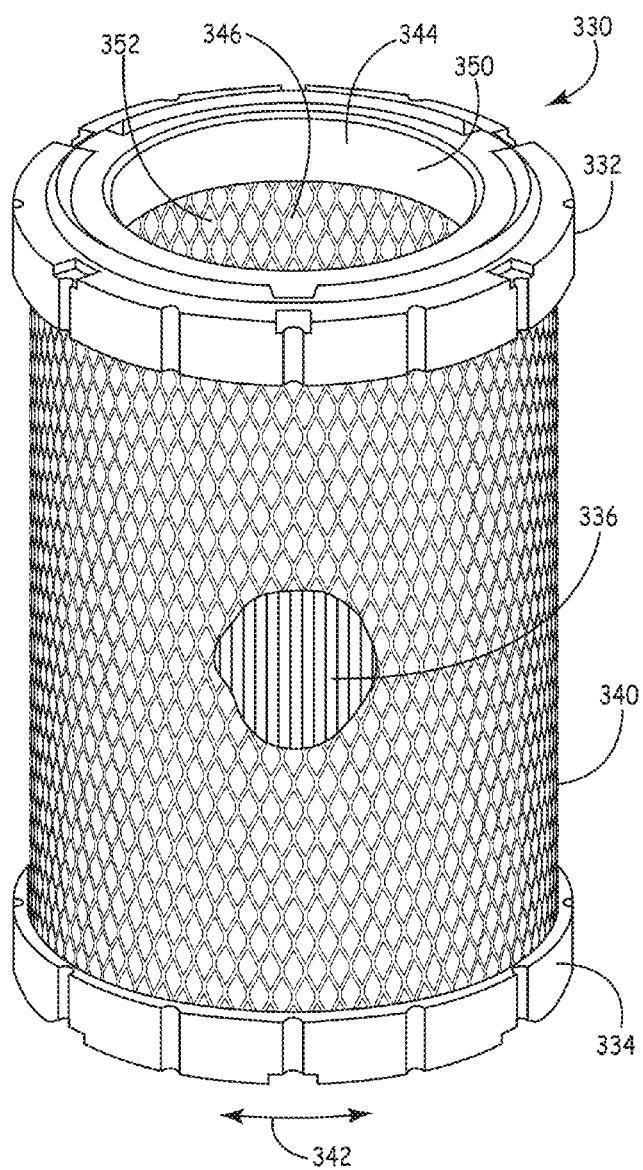
FIG. 20 is a schematic, perspective view of one type of a cylindrical filter element, with a portion broken away.
Figure 21:
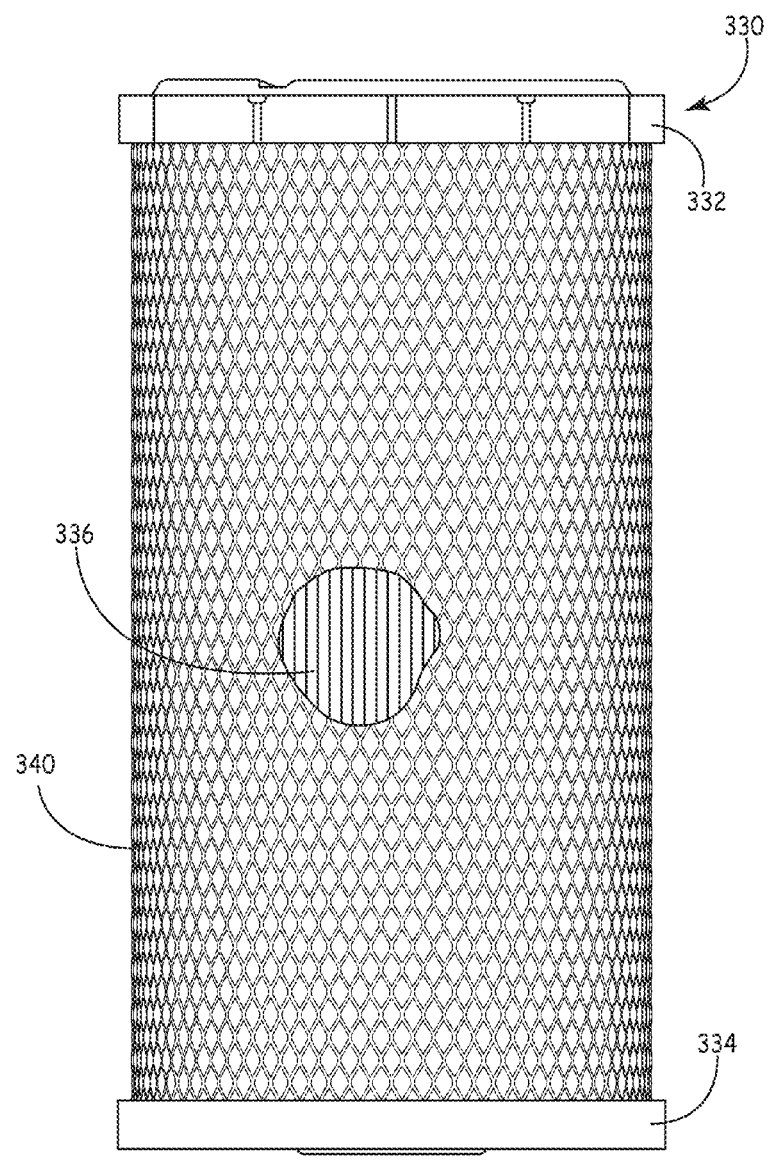
FIG. 21 is a side elevation view of the filter element of FIG. 20, with a portion broken away.

In other arrangements, the pleated media is configured or arranged around an open central area. An example of such a filter arrangement is depicted in FIGS. 20 and 21. Referring to FIG. 20, a filter arrangement 330 is depicted. The filter arrangement 330 comprises first and second end caps 332 and 334 having pleated media 336 extending therebetweeen. The pleats of the pleated media 336 generally extend in a direction between the end caps 332 and 334. The particular filter arrangement 330 of FIG. 20 has an outer liner 340, shown broken away at one location, for viewing pleats. (Typically, although pleats can be viewed through the liner 340, the arrangement 330 is simply not drawn that way, for convenience.) The outer liner 340 shown comprises expanded metal, although a variety of alternative outer liners, including plastic ones, can be used. In some instances, an outer liner is simply not used. Attention is also directed to FIG. 21, which is a side elevational view of arrangement 330, showing end caps 332 and 334. Pleat folds 336 are shown, as is outer liner 340. For the particular arrangement 330 of FIG. 20, a direction perpendicular to the pleat direction is generally a circumference of the filter arrangement 330, indicated by the double headed arrow 342.

The particular filter arrangement 330 depicted is generally cylindrical, although alternatives are possible. Typically, such elements as element 330 have an open end cap, in this instance corresponding to end cap 332, and a closed end cap, in this instance corresponding to end cap 334, although alternatives are possible. The term "open" when used in reference to an end cap, is meant to refer to an end cap which has an open central aperture 344 to allow air flow between an interior space 346 of the filter arrangement 330 and the exterior, without passage through the media 336. A closed end cap, by comparison, is an end cap which has no aperture therein. Although not depicted, flutes will typically be arranged in a direction from outer pleat folds of the pleated media 336 perpendicularly (or near perpendicularly) into the interior of the element toward the inner volume 346. However, it will be understood that the flutes do not have to run perpendicular to the outer pleat folds.

A variety of arrangements have been developed for end caps 332 and 334. The end caps may comprise polymeric material molded to the media. Alternatively they may comprise metal end caps or other preformed end caps secured to the media, with an appropriate adhesive or potting agent. The particular depicted end caps 332 and 334 are molded end caps, each comprising compressible foamed polyurethane. End cap 332 is shown with a housing seal 350, for sealing the element 330 in a housing during use. The depicted seal 350 is an inside radial seal, although outside radial seals and axial seals are also possible.

It is noted that the element may include an inner liner 352 extending between end caps 332 and 334 along an inside of the media 330 as shown in FIG. 20, although in some arrangements such liners are optional. The inside liner, if used, can be metal, such as expanded metal or perforated metal, or it can be plastic.

The distance between the outside cylindrical surface and the inside cylindrical surface, defined by outer and inner pleat folds, is generally referenced as the pleat depth. (An analogous distance is pleat depth in panel filters, FIG. 19, or in conical filters, FIG. 20.)

Figure 22:
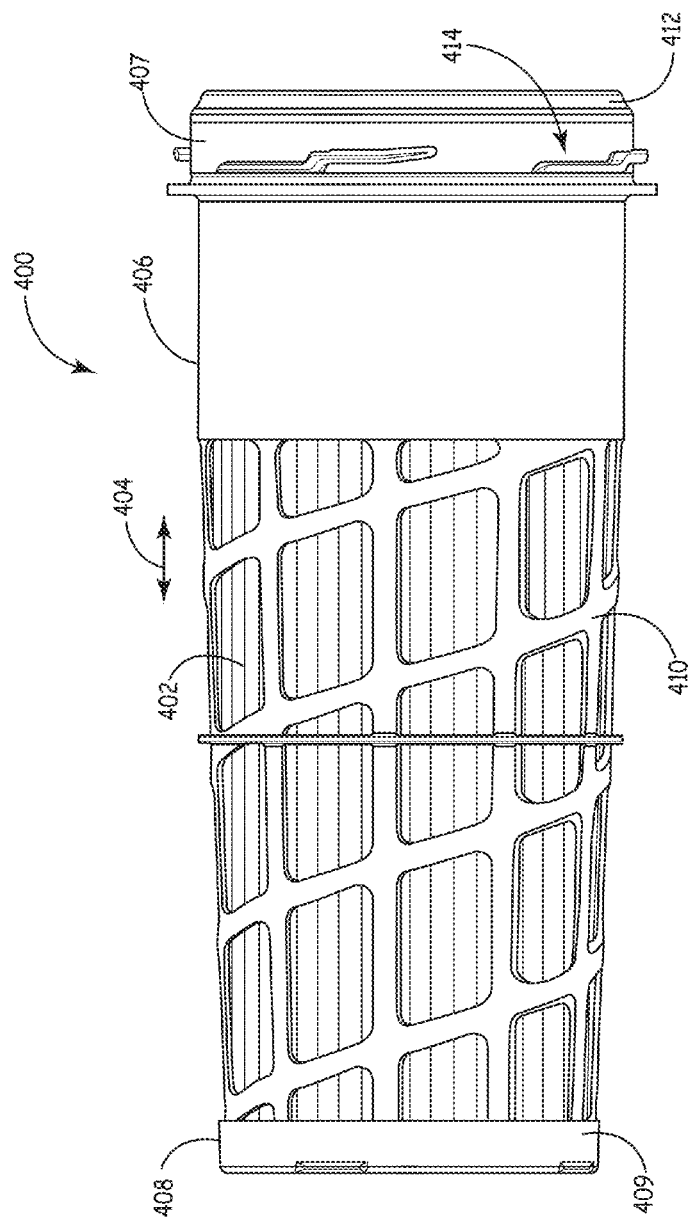
FIG. 22 is a schematic side elevation view of one type of a conical filter element.

An arrangement such as that depicted in FIGS. 20 and 21 are sometimes referenced herein as a "cylindrical arrangement," using "cylindrically configured" media, or by similar characterizations. Not all filter arrangements that utilize a tubular media are configured as cylinders. An example of this is illustrated in FIG. 22. Referring to FIG. 22, a filter arrangement 400 comprises extension of media 402 which is pleated, with pleat direction extending in the directions of arrow 404. Filter arrangement 400 is somewhat conical having a wide end 406 and a narrow end 408. At wide end 406 is positioned an end cap 407, and at narrow end 408 is positioned an end cap 409. As with the cylindrical arrangement, a variety of open and closed end caps can be used. For the specific example depicted, end cap 407 is open and end cap 408 is closed.

Filter arrangement 400 includes outer support screen 410 extending between end cap 407 and 409. The particular arrangement 400 includes no inner support screen although one could be used. The filter element 400 includes a seal arrangement 412, in this instance an axial seal, although an inside or outside radial seal is possible. Element 400 includes a non-continuously threaded mounting arrangement, 414, for mounting a housing. The arrangement 400 is generally described in detail in PCT/US2003/33952 filed Oct. 23, 2003, incorporated herein by reference.

Figure 23:
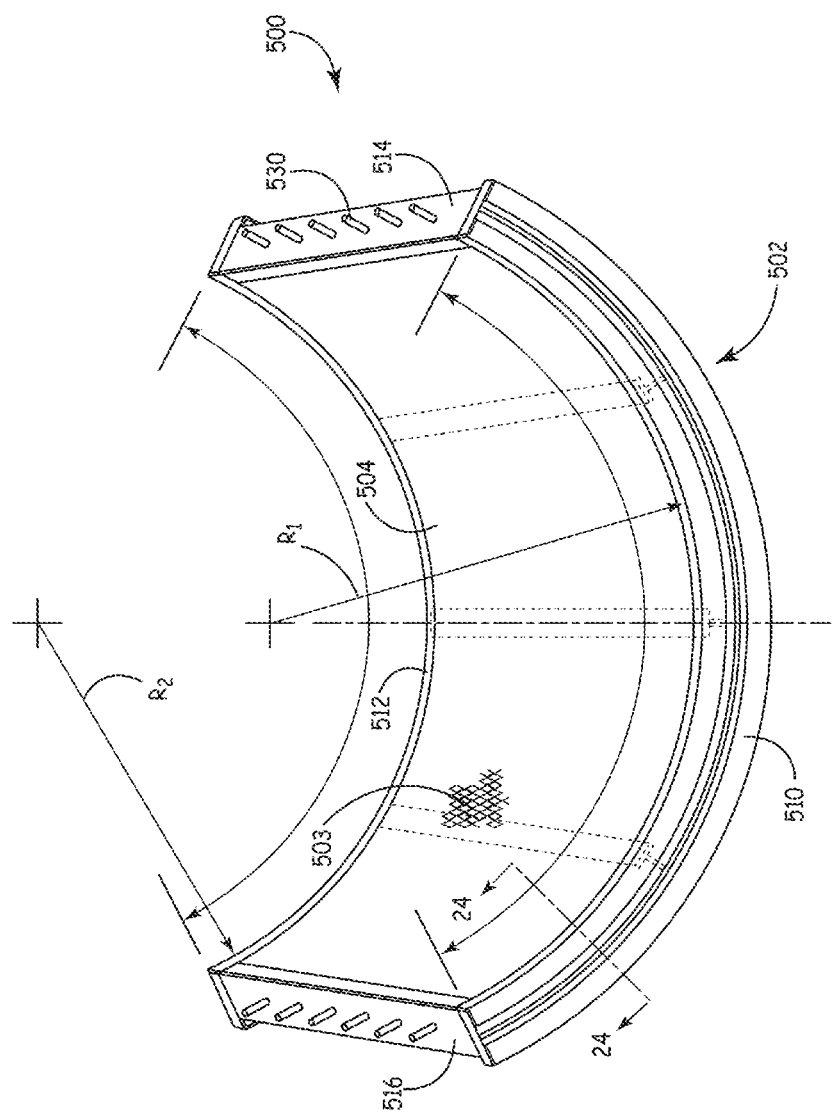
FIG. 23 is a schematic, perspective view of one type of a partial conical or bowed panel filter element.
Figure 24:
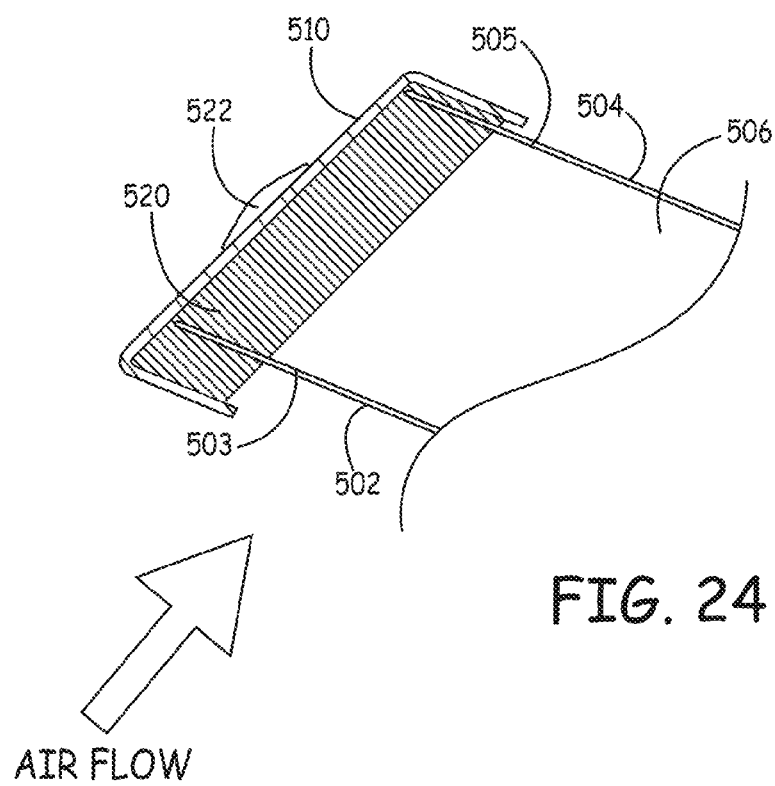
FIG. 24 is a sectional view of the filter element of FIG. 23 taken along lines 24-24.

Now referring to FIGS. 23 and 24, a filter arrangement is shown as reference number 500. The filter arrangement 500 can be considered to be a type of conical filter element and/or a type of panel filter element. The filter element 500 is shown having a first face 502 and a second face 504, with pleated media 506 extending between the first face 502 and the second face 504. Flutes constructed in accordance with the discussion herein will typically be arranged directionally between the first and second faces 502, 504. The first face 502 includes a screen 503, and the second face 504 includes a screen 505. The filter element 500 includes a first side 510, second side 512, first end 514, and second end 516. The first side 510 and the second side 512 include a potting material 520 that help seals the sides of the pleated media 506, and a seal 522 that prevents fluid from bypassing the media 506 when the element 500 is arranged in an air cleaner. The first end 514 and the second end 516 seal the ends of the pleated media faces, and include guide pins 530 that help align the element 500 within the air cleaner.

The filter element 500 shown can be considered conical because the radius R1 is different than the radius R2. In general, the radius R1 refers to the radius at the first side 510 and the radius R2 refers to the radius at the second side 512. Although the filter element 500 is shown having a conical structure, it is possible for the radiuses R1 and R2 to be the same so that the filter element more closely resembles a partial cylindrical arrangement or, alternatively, as a bowed panel arrangement.

The filter elements can be utilized in various housing arrangements, and the filter elements can be replaced or cleaned or refurbished periodically, as desired. In the case of air filtration, the housing can be provided as part of an air cleaner for various air cleaning or processing applications including engine air intake, turbine intake, dust collection, and heating and air conditioning. In the case of liquid filtration, the housing can be part of a liquid cleaner for cleaning or processing, for example, water, oil, fuel, and hydraulic fluid.

EXAMPLES

The following examples are provided to help illustrate the disclosure, and should not be considered as limiting with respect to the disclosure.

Filter elements having pleated media were compared using filter performance modeling software. The filter elements were not constructed and tested for the depicted examples. Instead, variables such as the dimensions of the filter elements and the filter element components, the properties and characteristics of the filter elements and the filter element components, the conditions of use, and the characteristics of the air being filtered were input into a computer program that models filter performance. The filter performance modeling software is expected to provide guidance with respect to relative filter element design performance, but it is expected that actual filter performance will vary.

For each example, the variables used for input into the computer program are identified. In the context of air filters for removing particulates for engine air intake, two of many parameters are typically considered when evaluating potential performance. These are initial pressure drop and system life. System life is the capacity of a filter element to hold dust to a given limit pressure drop (e.g., grams capacity to a final pressure drop of 25 inches of water column height). It will be appreciated that although dust is used as the contaminant for the examples described herein, filter elements made in accordance with the present teachings will typically remove numerous contaminants besides dust, and therefore dust is used only as an example contaminant for demonstrative and comparative purposes.

The examples compare the performance of one filter element design to another filter element design, wherein the filter element designs were modeled, holding the design parameters in the filter element constant, and then varying one design parameter at a time.

For the following examples, the pleated panel filter elements that were modeled had a dimension of 10 inches wide by 10 inches wide by 1.5 inches deep. The media was held constant as a typical production cellulose media found on many pleated media engine air filter applications of Donaldson Company, Inc., headquartered in Bloomington, Minn. The media was characterized as having a thickness (T) of 0.0132 inch. In addition, the volume flow rate of air to the modeled filter element was held constant, and the dust type fed to the modeled filter element was ISO Fine. In the various examples, several parameters were held constant and other parameters were varied as identified.

It should be understood that media pack performance changes depending on test conditions selected and the media and arrangement selected.

Example 1

Figure 25:
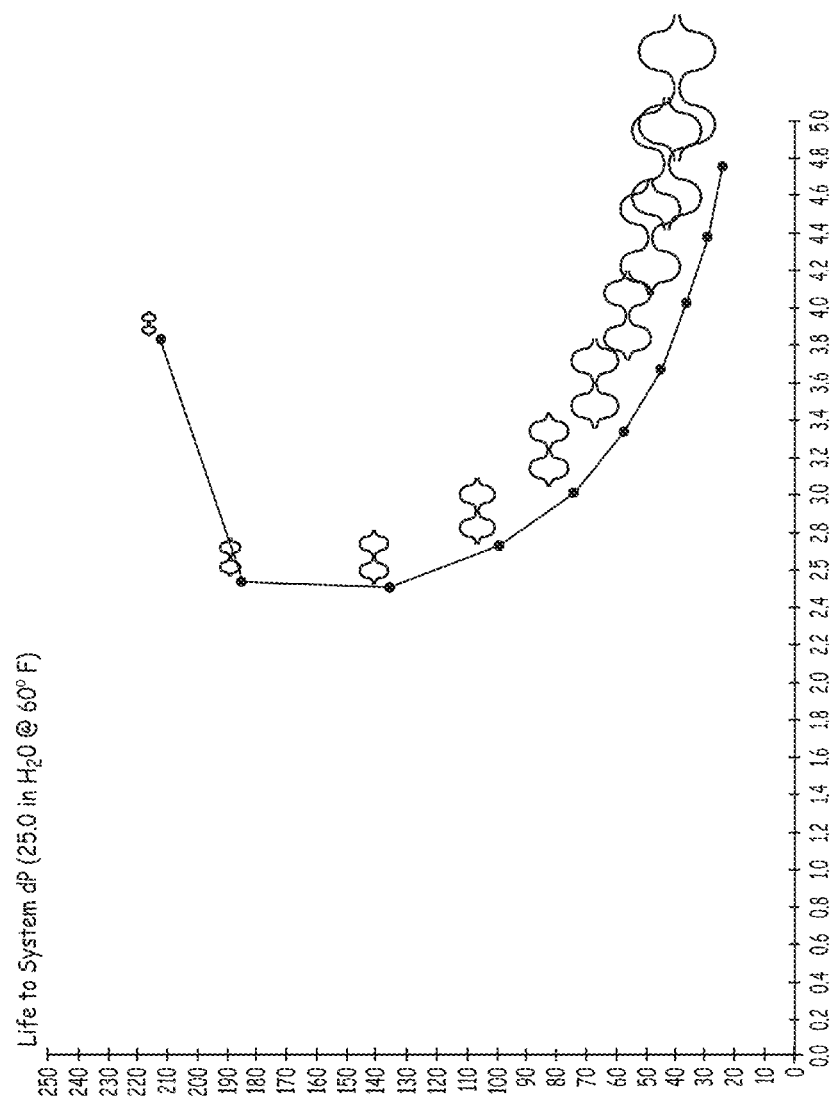
FIG. 25-28 are graphs showing the data reported in the examples.

This example was modeled to evaluate the effect of flute packing density on initial filter pressure drop and filter life for a specified flute shape. The flutes are formed from successive 180 degree linked arcs of filter media as shown in FIG. 25. For this example:

T is the media thickness (selected as 0.0132 inch);
J is the flute height;
D1 is the flute width;
D2 is the media length corresponding to the flute width
C is the flute depth (J minus T);
R is the inner radius of the flute (the radius is the same for adjacent peaks), which is metric for evaluating flute shape;

Again, PCMax is the maximum pleat count concentration at which the panel can be manufactured without deforming the flutes. In general, PCMax refers to the maximum number of pleats that can be placed in a given volume before performance suffers as a result of deformation of the flutes. This implies that in a panel configuration modeled, flute peaks on adjacent media faces will touch along substantially their entire length. For panel filters, PCMax pleat concentration is equal to 1/(2J). This implies that for a fixed volume flow rate of air to the filter, as J changes, the pleat count will change and the media area and the media face velocity (the average velocity of airflow through the filter media) will change.

This example was modeled at PCMax, at a filter element volume flow rate of 489.7 cubic feet per minute (cfm), and wherein the upstream (dirty side) media pack volume equals the downstream (clean side) media pack volume. The flutes are assumed to have a shape that can be characterized as a 180° arc-arc flute, which means that as the media curves from one peak it then curves into another adjacent peak without a straight section between the curves. The radius (R) can be referred to as the maximum radius that maintains the arc-arc flute shape. The results are reported in Table 1 and are graphically represented in FIG. 25 as solid circles. In addition, small scale representations of the flute shapes are shown in FIG. 25 along corresponding solid circles.

As is evident from Table 1 and FIG. 25, as radius decreases, J decreases, D1 also decreases, PcMax increases. For the media and conditions modeled, one of the best filter lives with a low initial pressure drop is provided when the J value is 0.064 inch and R is 0.019 inches. Thus, a lower R value corresponds generally to favorable initial pressure drop and filter life.

TABLE 1

| J (in) | D1 (in) | PcMax (1/in) | R (in) | Initial Pressure Drop (in H2O @ 60° F.) | Life to 25 in H2O (gm) |
|---|---|---|---|---|---|
| 0.045 | 0.06 | 11.00 | 0.010 | 3.82 | 213 |
| 0.064 | 0.10 | 7.80 | 0.019 | 2.53 | 185 |
| 0.083 | 0.14 | 6.04 | 0.028 | 2.51 | 136 |
| 0.101 | 0.18 | 4.93 | 0.037 | 2.72 | 100 |
| 0.120 | 0.21 | 4.17 | 0.047 | 3.01 | 74 |
| 0.139 | 0.25 | 3.60 | 0.056 | 3.33 | 57 |
| 0.157 | 0.29 | 3.18 | 0.065 | 3.68 | 45 |
| 0.176 | 0.36 | 2.84 | 0.075 | 4.03 | 36 |
| 0.195 | 0.36 | 2.57 | 0.084 | 4.39 | 30 |
| 0.213 | 0.40 | 2.35 | 0.093 | 4.76 | 25 |

Example 2

This example is introduced to show the effect of altering the radius (R) at fixed flute height (J) and flute width (D1).

Figure 26:
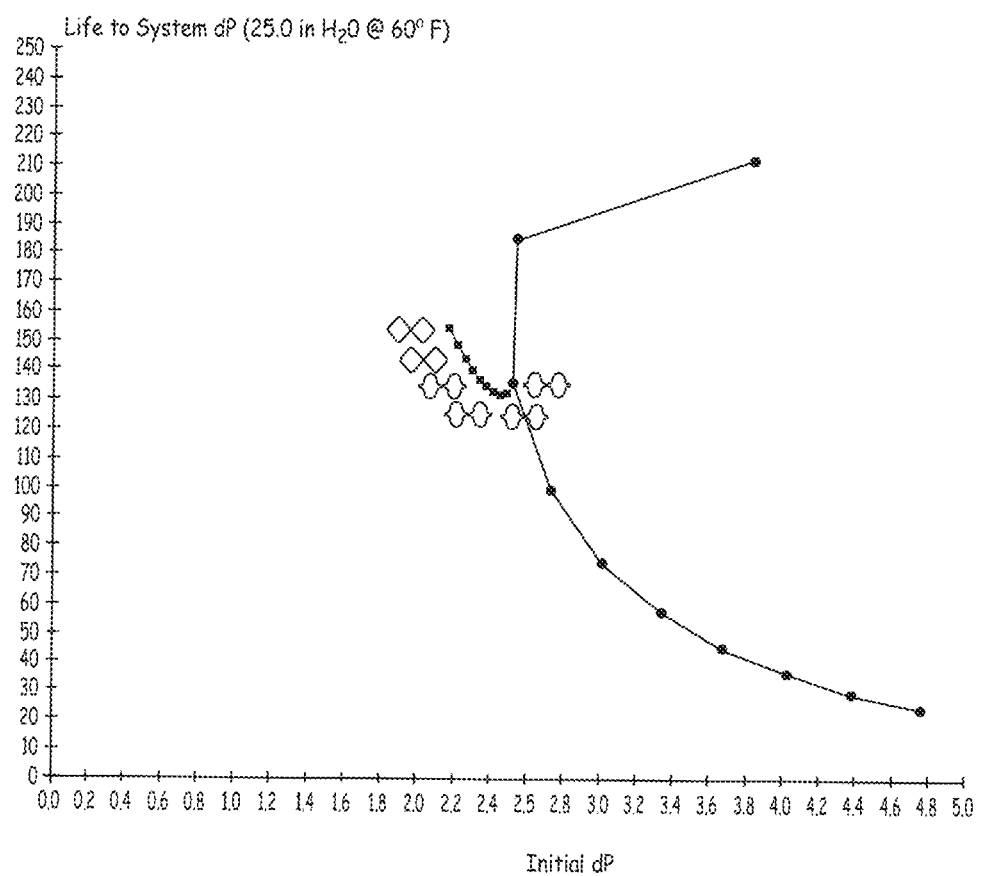

In this example, J was held constant at 0.083 inch and D1 was held constant at 0.14 inch, PCMax was thus held constant and the dirty side volume was equal to the clean side volume (i.e. there was no media volumetric asymmetry). A first flute shape was selected based upon one of the designs presented in Example 1. As the radius varied, the flute design moved away from the arc-arc shape reported in Example 1 and toward an arc-flat-arc shape characterized by two arcs separated by a flat area of media with successively sharper flute peaks. The radius on adjacent flute peaks was modeled to be the same. The results of this example are reported in Table 2 and graphically represented in FIG. 26 as solid diamonds. In addition, small scale representations of the flute shapes are shown in FIG. 26 along corresponding solid diamonds.

As the radius (R) decreases, initial pressure drop decreases, and life increases. In general, a smaller radius is preferred. This example shows the value of sharp flute peaks and reduced media masking

TABLE 2

| R (in) | D2/D1 | Media Cord Percentage (%) | Initial Pressure Drop (in H2O @ 60° F.) | Life to 25 in H2O (gm) |
|---|---|---|---|---|
| 0.001 | 1.43 | 1.3 | 2.16 | 154 |
| 0.004 | 1.44 | 1.9 | 2.20 | 149 |
| 0.007 | 1.45 | 2.6 | 2.25 | 144 |

TABLE 2-continued

| R (in) | D2/D1 | Media Cord Percentage (%) | Initial Pressure Drop (in H2O @ 60° F.) | Life to 25 in H2O (gm) |
|---|---|---|---|---|
| 0.010 | 1.46 | 3.3 | 2.29 | 140 |
| 0.013 | 1.47 | 4.1 | 2.33 | 137 |
| 0.016 | 1.48 | 5.0 | 2.37 | 134 |
| 0.019 | 1.50 | 6.0 | 2.40 | 133 |
| 0.022 | 1.52 | 7.2 | 2.44 | 132 |
| 0.025 | 1.54 | 8.8 | 2.47 | 132 |
| 0.028 | 1.57 | 10.9 | 2.51 | 135 |

Example 3

Figure 27:
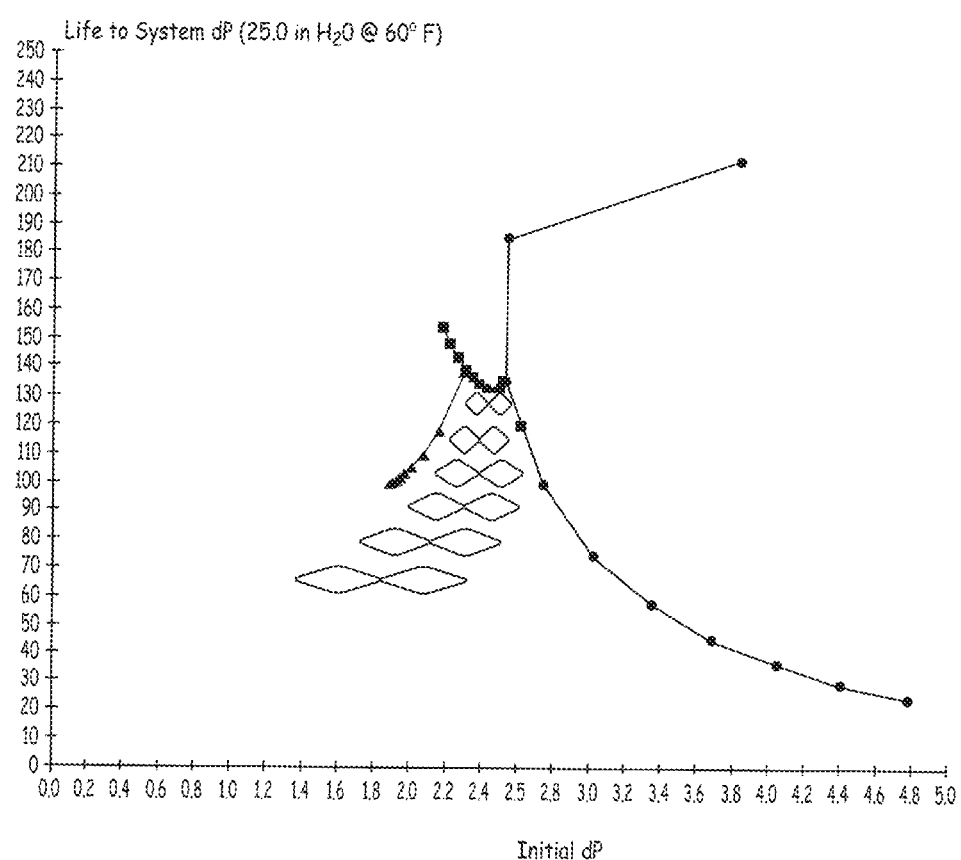

This example is presented to show the effect of varying the flute width (D1). The flute shape begins with the flute shape from Table 2 reported having a flute height (J) of 0.083 inch, a radius (R) of 0.010 inch, and a flute width (D1) of 0.14 inch. While flute height and radii were held constant, the flute width was allowed to vary. The results of this example are reported in Table 3 and graphically represented in FIG. 27 as solid triangles. In addition, simplified cross sections of the flute shapes are illustrated in FIG. 27.

In general, in this example, as the flute width (D1) increases, initial pressure drop decreases, life decreases, and the ratio D2/D1 decreases. Increasing the flute width (D1) relative to the flute height and radius is valuable to provide a low initial pressure drop. However, in this example, filter life was shown to decrease.

TABLE 3

| D1 (in) | D2/D1 (%) | Media Cord Percentage (%) | Initial Pressure Drop (in H2O @ 60° F.) | Life to 25 in H2O (gm) |
|---|---|---|---|---|
| 0.14 | 1.46 | 3.2 | 2.28 | 139 |
| 0.18 | 1.28 | 1.6 | 2.14 | 118 |
| 0.22 | 1.19 | 0.8 | 2.05 | 109 |
| 0.26 | 1.14 | 0.5 | 1.99 | 105 |
| 0.3 | 1.11 | 0.3 | 1.95 | 103 |
| 0.34 | 1.08 | 0.2 | 1.92 | 102 |
| 0.38 | 1.07 | 0.1 | 1.90 | 101 |
| 0.42 | 1.05 | 0.1 | 1.88 | 100 |
| 0.46 | 1.05 | 0.1 | 1.87 | 99 |
| 0.50 | 1.03 | 0 | 1.86 | 99 |

Example 4

This example shows the effect of media volume asymmetry. The flute shape changed from an arc-flat-arc flute shape to a flute shape similar to that shown in FIG. 5A. In general, the flute height (J), the flute length (D1), and the peak radius (R) were held constant. J was held constant at 0.083 inch, D1 was held constant at 0.14 inch, and R was held constant at 0.01. The media pack was maintained at PCMax which was 6.04 l/inch. In addition, the value L was held constant at 0.03 inch. As can be seen in FIG. 5a, for a shape according to one of the implementations of this invention defined mathematically by arcs and flats, L is the flute length distance parallel to the line defined by D1, from the outside surface of the media at the peak 103 to the tangent of the ridge 108, and the value H refers to the height difference between the locations used to measure L. In this example, H was varied.

Figure 28:
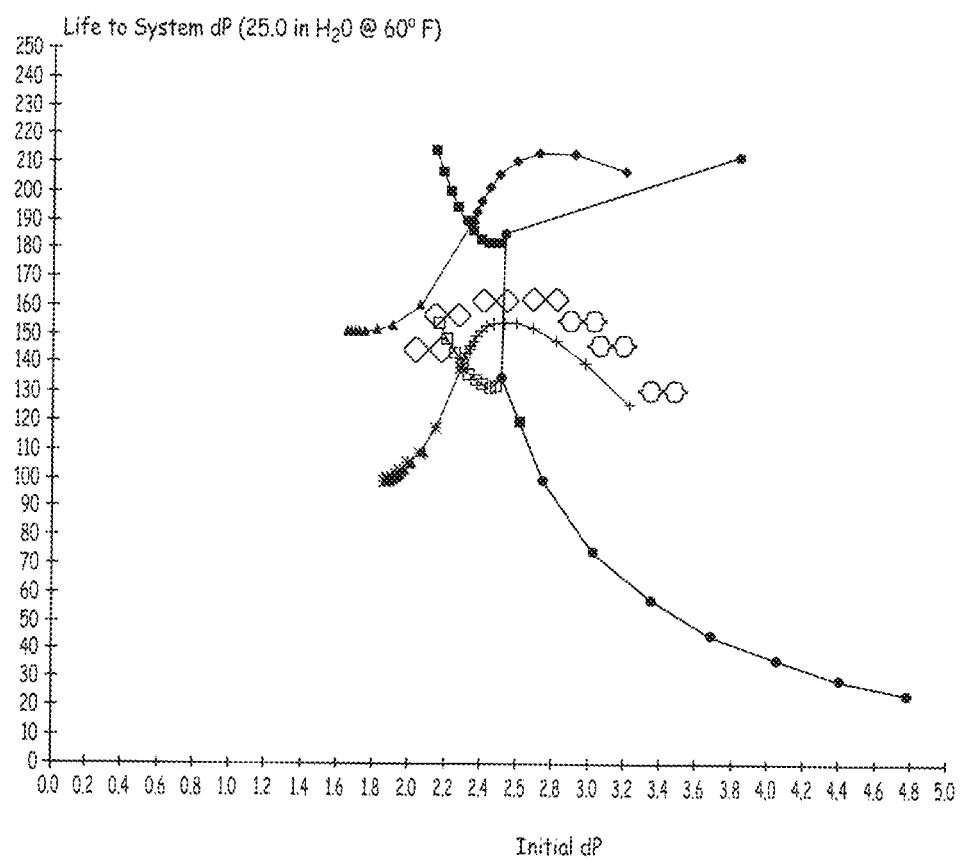

The results are shown in Table 4 and are graphically represented in FIG. 28 as plus signs. In addition, the flute shapes are also shown. As media volume asymmetry varied, filter life also varied, with the best modeled filter life occurring with media having a media volume asymmetry of 157% to 174%. It will be understood that different media configurations will have different results, but also that media volume asymmetry can be an important mechanism for improving filter life.

TABLE 4

| H (in) | Media Volume Asymmetry (%) | D2/D1 | Media Cord Percentage (%) | Initial Pressure Drop (in H2O @ 60° F.) | Life to 25 in H2O (gm) |
|---|---|---|---|---|---|
| 0.004 | 221 | 1.63 | 14.9 | 3.23 | 126 |
| 0.005 | 207 | 1.61 | 13.6 | 2.98 | 140 |
| 0.006 | 194 | 1.59 | 12.3 | 2.81 | 148 |
| 0.007 | 183 | 1.57 | 11.2 | 2.69 | 152 |
| 0.008 | 174 | 1.56 | 10.1 | 2.60 | 154 |
| 0.009 | 165 | 1.54 | 9.1 | 2.53 | 154 |
| 0.010 | 157 | 1.53 | 8.2 | 2.47 | 154 |
| 0.011 | 150 | 1.52 | 7.4 | 2.43 | 153 |
| 0.012 | 143 | 1.51 | 6.7 | 2.40 | 151 |
| 0.013 | 137 | 1.50 | 6.1 | 2.37 | 150 |
| 0.014 | 132 | 1.49 | 5.5 | 2.35 | 148 |
| 0.015 | 127 | 1.49 | 5.0 | 2.34 | 146 |
| 0.016 | 123 | 1.48 | 4.6 | 2.33 | 145 |
| 0.017 | 119 | 1.48 | 4.3 | 2.32 | 144 |
| 0.018 | 116 | 1.47 | 4.0 | 2.31 | 143 |
| 0.019 | 112 | 1.47 | 3.8 | 2.30 | 142 |
| 0.020 | 109 | 1.47 | 3.6 | 2.30 | 141 |
| 0.021 | 107 | 1.46 | 3.5 | 2.30 | 141 |
| 0.022 | 104 | 1.46 | 3.4 | 2.29 | 140 |
| 0.023 | 102 | 1.46 | 3.3 | 2.29 | 140 |
| 0.024 | 100 | 1.46 | 3.3 | 2.29 | 140 |
| 0.025 | 98 | 1.46 | 3.3 | 2.29 | 140 |
| 0.026 | 96 | 1.46 | 3.3 | 2.29 | 140 |
| 0.027 | 94 | 1.46 | 3.4 | 2.29 | 140 |
| 0.028 | 92 | 1.46 | 3.5 | 2.29 | 141 |

Example 5

This example repeats Example 2 except that it begins at a different point. Again, this example is to show the effect of altering the radius (R) at fixed flute height (J) and flute width (D1). For this example, the flute height (J) is 0.064 inch, the flute period length (D1) is 0.10 inch, and PCMax is 7.80 l/inch.

The results of this example are reported in Table 5 and also graphically represented in FIG. 28 as solid squares. For comparative purposes, the results of Example 2 are plotted as hollow squares. This example shows increases in filter life as radius is decreased. This example again shows the value of sharp flute peaks and reduced media masking

TABLE 5

| R (in) | D2/D1 | Media Cord Percentage (%) | Initial Pressure Drop (in H2O @ 60° F.) | Life to 25 in H2O (gm) |
|---|---|---|---|---|
| 0.001 | 1.44 | 1.9 | 2.14 | 214 |
| 0.003 | 1.45 | 2.5 | 2.18 | 207 |
| 0.005 | 1.46 | 3.1 | 2.23 | 200 |
| 0.007 | 1.47 | 3.8 | 2.27 | 194 |
| 0.009 | 1.48 | 4.6 | 2.31 | 190 |
| 0.011 | 1.49 | 5.4 | 2.35 | 186 |
| 0.013 | 1.50 | 6.4 | 2.39 | 183 |
| 0.015 | 1.52 | 7.6 | 2.44 | 182 |
| 0.017 | 1.54 | 9.0 | 2.48 | 182 |
| 0.019 | 1.57 | 11.0 | 2.53 | 185 |

Example 6

This example was carried out according to Example 3, except that the flute height (J) is 0.064 inch, R is 0.01 inch, PCMax is 7.80 l/inch. Again, this example is presented to show the effect of varying the flute width (D1).

The results of this example are reported in Table 6 and also graphically represented in FIG. 28 as solid triangles. For comparative purposes, the results of Example 3 are plotted as eight-pointed "stars". This example again shows decreases in filter life and initial pressure drop as flute width increased.

TABLE 6

| D (in) | D2/D1 | Media Cord Percentage (%) | Initial Pressure Drop (in H2O @ 60° F.) | Life to 25 in H2O (gm) |
|---|---|---|---|---|
| 0.10 | 1.50 | 5.3 | 2.36 | 190 |
| 0.13 | 1.29 | 2.2 | 2.06 | 161 |
| 0.17 | 1.18 | 1.1 | 1.91 | 153 |
| 0.20 | 1.13 | 0.6 | 1.81 | 152 |
| 0.23 | 1.09 | 0.3 | 1.76 | 152 |
| 0.27 | 1.07 | 0.2 | 1.72 | 151 |
| 0.30 | 1.06 | 0.1 | 1.69 | 151 |
| 0.33 | 1.05 | 0.1 | 1.67 | 151 |
| 0.37 | 1.04 | 0.1 | 1.66 | 151 |

Example 7

This example was carried out according to Example 4 except that the flute height (J) is 0.064089 inch, the flute length (D1) is 0.1018 inch, PCMax is 7.801651 l/inch, R is 0.01 inch, and L is 0.023 inch. H was allowed to vary. Again, the flute shape changed from an arc-flat-arc flute shape to a flute shape similar to that shown in FIG. 5A.

The results of this example are reported in Table 7 and graphically represented in FIG. 28 as solid diamonds. For comparative purposes, the results of Example 4 are plotted as "plus signs". This example again shows that media volume asymmetry can be an important mechanism for improving filter life.

TABLE 7

| H (in) | Media Volume Asymmetry (%) | D2/D1 | Initial Pressure Drop (in H2O @ 60° F.) | Life to 25 in H2O (gm) |
|---|---|---|---|---|
| 0.005 | 192.67 | 1.64 | 3.20 | 207 |
| 0.006 | 175.02 | 1.61 | 2.92 | 213 |
| 0.007 | 160.34 | 1.58 | 2.72 | 213 |
| 0.008 | 148.09 | 1.56 | 2.59 | 210 |
| 0.009 | 137.63 | 1.54 | 2.50 | 206 |
| 0.010 | 128.85 | 1.52 | 2.44 | 201 |
| 0.011 | 121.45 | 1.51 | 2.40 | 196 |
| 0.012 | 115.24 | 1.50 | 2.37 | 193 |
| 0.013 | 110.10 | 1.49 | 2.35 | 190 |
| 0.014 | 105.91 | 1.49 | 2.34 | 189 |
| 0.015 | 102.60 | 1.49 | 2.34 | 188 |
| 0.016 | 100.13 | 1.49 | 2.33 | 187 |
| 0.017 | 97.98 | 1.49 | 2.33 | 188 |
| 0.018 | 95.55 | 1.49 | 2.33 | 188 |

Figure 29:
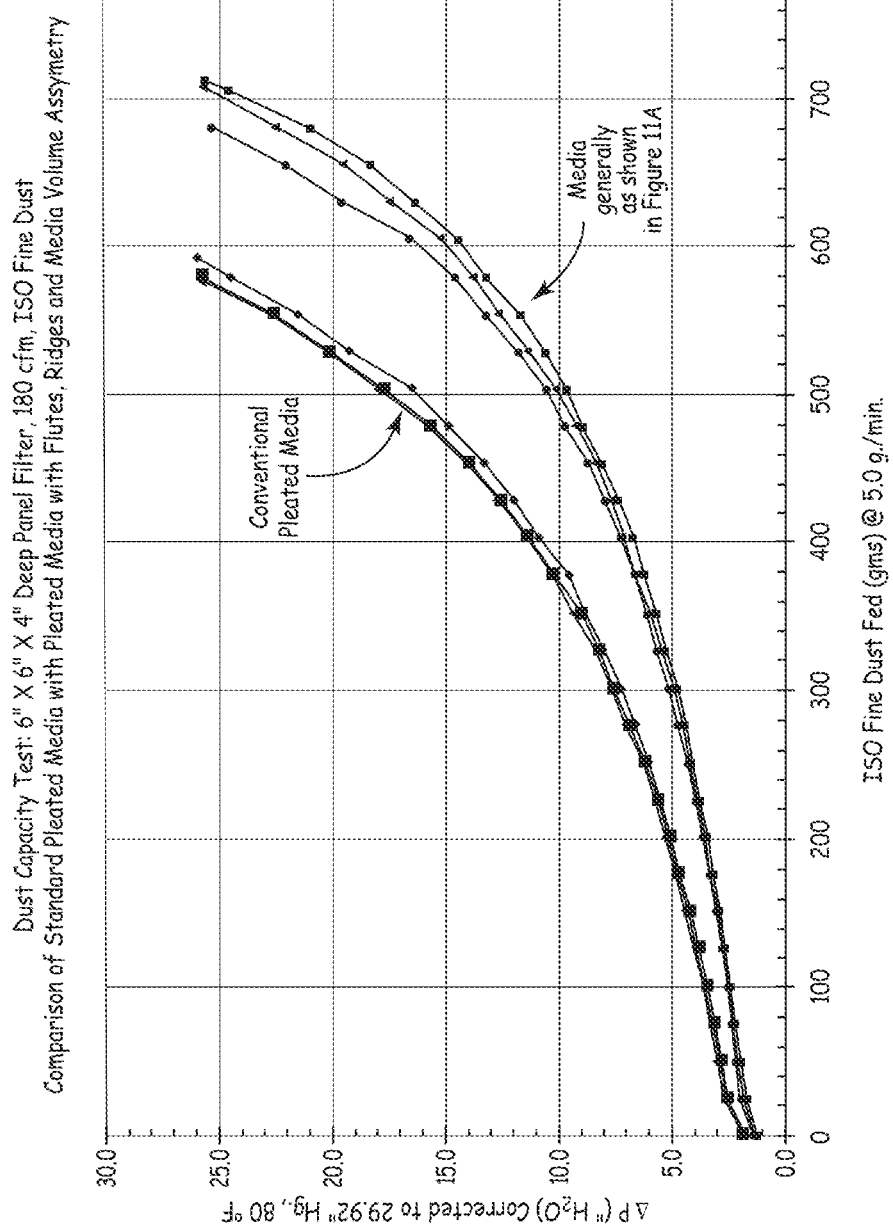
FIG. 29 is a graph showing relative performance of various panel filters.

In reference now to FIG. 29, dust loading performance data from tests of two example configurations of media are depicted, with dust loading (grams of Iso Fine) plotted against pressure differential across the element. Element 1 was constructed with the best of our current traditionally corrugated media, while Element 2 was constructed using fluted media constructed in accordance with the invention. As is evident from FIG. 29, the media constructed in accordance with the invention demonstrated a significant improvement in dust loading.

The above specification provides a complete description of the present invention. Since many embodiments of the invention can be made without departing from the spirit and scope of the invention, the invention resides in the claims hereinafter appended.

I claim:

1. A pleated filtration media pack comprising:
   (a) filtration media having a first set of pleat folds forming a first face, a second set of pleat folds forming a second face, and wherein the filtration media extends between the first set of pleat folds and the second set of pleat folds in a back and forth arrangement such that the first and second faces are substantially parallel;
   (b) at least a portion of the filtration media extending between the first set of pleat folds and the second set of pleat folds comprises flutes forming first flute peaks and second flute peaks,
       i) wherein the flutes extend directionally from the first set of pleat folds toward the second set of pleat folds, and
       ii) wherein at least 25% of the flutes in the pleated filtration media pack comprise at least one ridge between adjacent flute peaks, the ridges extending along at least 25% of the flute length between the first set of pleat folds and the second set of pleat folds, wherein each ridge is a line of intersection between differently-sloped media portions;
   (c) at least a portion of the flutes extending from the first set of pleat folds to the second set of pleat folds comprise a D2/D1 value of at least 1.05, wherein D2 is the media length corresponding to the flute width, and D1 is the flute width; and
   (d) wherein the flutes exhibit width to height aspect ratio (D1/J) of at least about 2.0.

2. A pleated filtration media pack according to claim 1, wherein at least 25% of the flutes in the pleated filtration media pack comprise at least two ridges between adjacent flute peaks and extending along at least 25% of the flute length between the first set of pleat folds and the second set of pleat folds.

3. A pleated filtration media pack according to claim 1, wherein the filtration media has at least one cross section wherein the flutes have a media cross-sectional area asymmetry of at least 10%.

4. A pleated filtration media pack according to claim 1, wherein the flutes exhibit a D2/D1 value of at least 1.1.

5. A pleated filtration media pack according to claim 1, wherein the flutes exhibit a D2/D1 value of at least 1.2.

6. A pleated filtration media pack according to claim 1, wherein the flutes exhibit a width to height aspect ratio of at least 3.0.

7. A pleated filtration media pack according to claim 1, wherein the filtration media exhibits a media volume asymmetry of at least 10%.

8. A pleated filtration media pack according to claim 1, wherein the filtration media exhibits a media volume asymmetry of at least 50%.

9. A pleated filtration media pack according to claim 1, wherein the flutes extend at an angle of about 60 degrees to about 150 degrees relative to one of the first face or the second face.

10. A pleated filtration media pack comprising:
    (a) filtration media having a first set of pleat folds forming a first face, a second set of pleat folds forming a second face, and wherein the filtration media extends between the first set of pleat folds and the second set of pleat folds in a back and forth arrangement to form a plurality of pleats, the pleats having a substantially uniform depth;

(b) at least a portion of the filtration media extending between the first set of pleat folds and the second set of pleat folds comprises flutes forming first flute peaks and second flute peaks, wherein the flutes extend directionally from the first set of pleat folds toward the second set of pleat folds, and (c) wherein the filtration media exhibits a media asymmetric volume arrangement so that a volume on one side of the media is greater than a volume on the other side of the media by at least 10%;

(d) at least one of the first flute peaks or the second flute peaks have a radius of less than 2 millimeters; and (e) at least a portion of the flutes extending from the first set of pleat folds to the second set of pleat folds comprise a D2/D1 value of at least 1.05, wherein D1 is the flute width and D2 is the media length corresponding to the flute width.

11. A pleated filtration media pack according to claim 10, wherein the flutes exhibit a width to height aspect ratio of at least 2.0.

12. A pleated filtration media pack according to claim 10, wherein the flutes exhibit an open channel width height ratio of greater than 2.0.

13. A pleated filtration media pack according to claim 10, wherein at least 25% of the flutes in the pleated filtration media pack comprise at least one ridge between adjacent flute peaks that extends along at least 25% of the flute length between the first set of pleat folds and the second set of pleat folds, wherein each ridge is a line of intersection between differently-sloped media portions.

14. A pleated filtration media pack according to claim 10, wherein the flutes exhibit a width to height aspect ratio range of 4 to 8.

15. A pleated filtration media pack according to claim 10, wherein the flutes extend at an angle of about 60 degrees to about 150 degrees relative to one of the first face or the second face.

16. Pleated filtration media pack comprising:

(a) filtration media having a first set of pleat folds forming a first face, a second set of pleat folds forming a second face, and wherein the filtration media extends between the first set of pleat folds and the second set of pleat folds in a back and forth arrangement such that the first and second faces are substantially parallel;

(b) at least a portion of the filtration media extending between the first set of pleat folds and the second set of pleat folds comprises flutes forming a first set of flute peaks and a second set of flute peaks, wherein the flutes extend directionally from the first set of pleat folds to the second set of pleat folds;

(c) wherein at least 25% of the flutes in the pleated filtration media pack comprise at least one ridge between adjacent flute peaks and extending along at least 25% of the flute length between the first set of pleat folds and the second set of pleat folds, wherein each ridge is a discontinuity in the curvature of the flute; and (d) at least a portion of the flutes extending from the first set of pleat folds to the second set of pleat folds comprise a D2/D1 value of at least 1.05, wherein D1 is the flute width and D2 is the media length corresponding to the flute width.

17. A pleated filtration media pack according to claim 16, wherein at least 25% of the flutes in the pleated filtration media pack comprise at least two ridges between adjacent flute peaks and extending along at least 25% of the flute length between the first set of pleat folds and the second set of pleat folds.

18. A pleated filtration media pack according to claim 16, wherein the filtration media has at least one cross section wherein the flutes have a media cross-sectional area asymmetry of at least 10%.

19. A pleated filtration media pack according to claim 16, wherein the flutes extend at an angle of about 60 degrees to about 150 degrees relative to one of the first face or the second face.

20. A pleated filtration media pack according to claim 16, wherein the flutes exhibit a width to height aspect ratio range of 4 to 8.

* * * * *